(12) United States Patent
Hines et al.

(10) Patent No.: US 12,351,261 B2
(45) Date of Patent: Jul. 8, 2025

(54) BICYCLE SYSTEM

(71) Applicants: George Hines, San Francisco, CA (US); Steven Fragassi, Kenosha, WI (US); Gilberto Cavada, Wauconda, IL (US); Tom O'Connor, Chicago, IL (US); Richard Page, Lake Villa, IL (US); Sharwari Kulkarni, Bartlett, IL (US); George J. Guffy, Volo, IL (US); Will Capellaro, Chicago, IL (US); Michael Carrier, Round Lake, IL (US); David Carlson, Lake Zurich, IL (US); Corry Daus, Libertyville, IL (US); Lee Kunvichet, St. Charles, IL (US); Stephen Lingle, McHenry, IL (US); Andrew Last, Suffolk (GB); Stanislav Dmitriyev, Chervonograd (UA); Reginald K. S. Ammons, Alma, AZ (US)

(72) Inventors: George Hines, San Francisco, CA (US); Steven Fragassi, Kenosha, WI (US); Gilberto Cavada, Wauconda, IL (US); Tom O'Connor, Chicago, IL (US); Richard Page, Lake Villa, IL (US); Sharwari Kulkarni, Bartlett, IL (US);

(Continued)

(73) Assignee: KONNECTRONIX, INC., Gurnee, IL (US)

( * ) Notice: Subject to any disclaimer, the term of this patent is extended or adjusted under 35 U.S.C. 154(b) by 854 days.

(21) Appl. No.: 17/181,487

(22) Filed: Feb. 22, 2021

(65) Prior Publication Data

US 2021/0291922 A1 Sep. 23, 2021

Related U.S. Application Data

(63) Continuation of application No. 15/902,585, filed on Feb. 22, 2018, now Pat. No. 10,926,824, which is a (Continued)

(30) Foreign Application Priority Data

Jun. 20, 2013 (GB) .................................. 13110010

(51) Int. Cl.
*B62H 5/00* (2006.01)
*B62H 5/10* (2006.01)

(Continued)

(52) U.S. Cl.
CPC .................. *B62H 5/00* (2013.01); *B62H 5/10* (2013.01); *B62H 5/20* (2013.01); *B62J 3/10* (2020.02);

(Continued)

(58) Field of Classification Search
CPC .... B62H 5/00; B62H 5/20; B62J 45/20; B62J 50/21; B62J 43/30
See application file for complete search history.

(56) References Cited

U.S. PATENT DOCUMENTS 6,204,752 B1 * 3/2001 Kishimoto ............... B62J 50/22
340/432
8,878,658 B2 * 11/2014 Hara ........................ B62J 50/21
340/432

(Continued)

*Primary Examiner* — James A English
*Assistant Examiner* — Michael R Stabley
(74) *Attorney, Agent, or Firm* — Vitale, Vickrey, Niro, Solon & Gasey LLP

(57) ABSTRACT

The field of the invention relates to bicycle systems, especially to bicycle systems adapted for use with smartphones, to smartphones configured for use with bicycle systems, and to methods and to computer software for use with such (Continued)

bicycle systems or smartphones, and to servers configured to communicate with such bicycle systems or smartphones. According to a first aspect of the invention, there is provided a bicycle system including a bicycle, the bicycle system including a processor integral to the bicycle, the bicycle system further including a battery integral to the bicycle, wherein the processor is powerable by the battery, the bicycle system including a smartphone holder configurable to receive a smartphone and to connect the smartphone to the processor, wherein in use the smartphone holder is attachable to, and detachable from, the smartphone. Advantages include that the smartphone can be charged by the battery, the smartphone can communicate with the processor so as to receive various information such as maintenance-related information of the bicycle system, the bicycle system can investigate the smartphone identity to check for unauthorized use of the bicycle system, the smartphone is held during bicycle system travel which reduces the risk of damage to the smartphone, and the bicycle system shape is more aerodynamic than that of a bicycle to which a processor and/or a battery has merely been bolted-on.

5 Claims, 72 Drawing Sheets

(72) Inventors: George J. Guffy, Volo, IL (US); Will Capellaro, Chicago, IL (US); Michael Carrier, Round Lake, IL (US); David Carlson, Lake Zurich, IL (US); Corry Daus, Libertyville, IL (US); Lee Kunvichet, St. Charles, IL (US); Stephen Lingle, McHenry, IL (US); Andrew Last, Suffolk (GB); Stanislav Dmitriyev, Chervonograd (UA); Reginald K. S. Ammons, Alma, AZ (US)

Related U.S. Application Data continuation of application No. 14/899,501, filed as application No. PCT/US2014/043405 on Jun. 20, 2014, now Pat. No. 10,093,379, which is a continuation of application No. 29/489,808, filed on May 2, 2014, now Pat. No. Des. 721,013.

(51) Int. Cl.
| | | |
|---|---|---|
| *B62H 5/20* | (2006.01) | |
| *B62J 3/10* | (2020.01) | |
| *B62J 6/056* | (2020.01) | |
| *B62J 6/16* | (2020.01) | |
| *B62J 43/20* | (2020.01) | |
| *B62J 43/30* | (2020.01) | |
| *B62J 45/20* | (2020.01) | |
| *B62J 45/414* | (2020.01) | |
| *B62J 50/21* | (2020.01) | |
| *B62K 21/12* | (2006.01) | |
| *B62K 23/02* | (2006.01) | |
| *H04M 1/72409* | (2021.01) | |

(52) U.S. Cl.
CPC ............... *B62J 6/056* (2020.02); *B62J 6/16* (2013.01); *B62J 43/20* (2020.02); *B62J 43/30* (2020.02); *B62J 45/20* (2020.02); *B62J 45/414* (2020.02); *B62J 50/21* (2020.02); *B62K 21/12* (2013.01); *B62K 23/02* (2013.01); *H04M 1/724098* (2022.02)

(56) References Cited

U.S. PATENT DOCUMENTS

| | | | |
|---|---|---|---|
| 8,897,835 B2* | 11/2014 | Yuen | A61B 5/222 |
| | | | 455/556.1 |
| 9,248,341 B2* | 2/2016 | Tuulari | A63B 24/0062 |
| 2004/0189722 A1* | 9/2004 | Acres | G01C 22/002 |
| | | | 715/866 |
| 2005/0280244 A1* | 12/2005 | Watarai | B62M 25/08 |
| | | | 280/288.4 |
| 2011/0254673 A1* | 10/2011 | Jean | B62M 6/45 |
| | | | 340/432 |
| 2012/0252530 A1* | 10/2012 | Yuen | G01C 22/00 |
| | | | 455/557 |
| 2013/0150028 A1* | 6/2013 | Akins | H04W 4/029 |
| | | | 455/456.3 |
| 2016/0059920 A1* | 3/2016 | Takanashi | B62K 19/40 |
| | | | 74/551.8 |
| 2016/0221627 A1* | 8/2016 | Hines | B62J 6/056 |
| 2017/0021897 A1* | 1/2017 | Bortolozzo | B62J 50/22 |
| 2018/0222473 A1* | 8/2018 | Shami | B60W 50/14 |
| 2018/0334216 A1* | 11/2018 | Montez | B62J 50/225 |
| 2019/0149645 A1* | 5/2019 | Montez | B62J 43/30 |
| | | | 455/556.1 |
| 2019/0244284 A1* | 8/2019 | Miwa | G07F 15/005 |

* cited by examiner

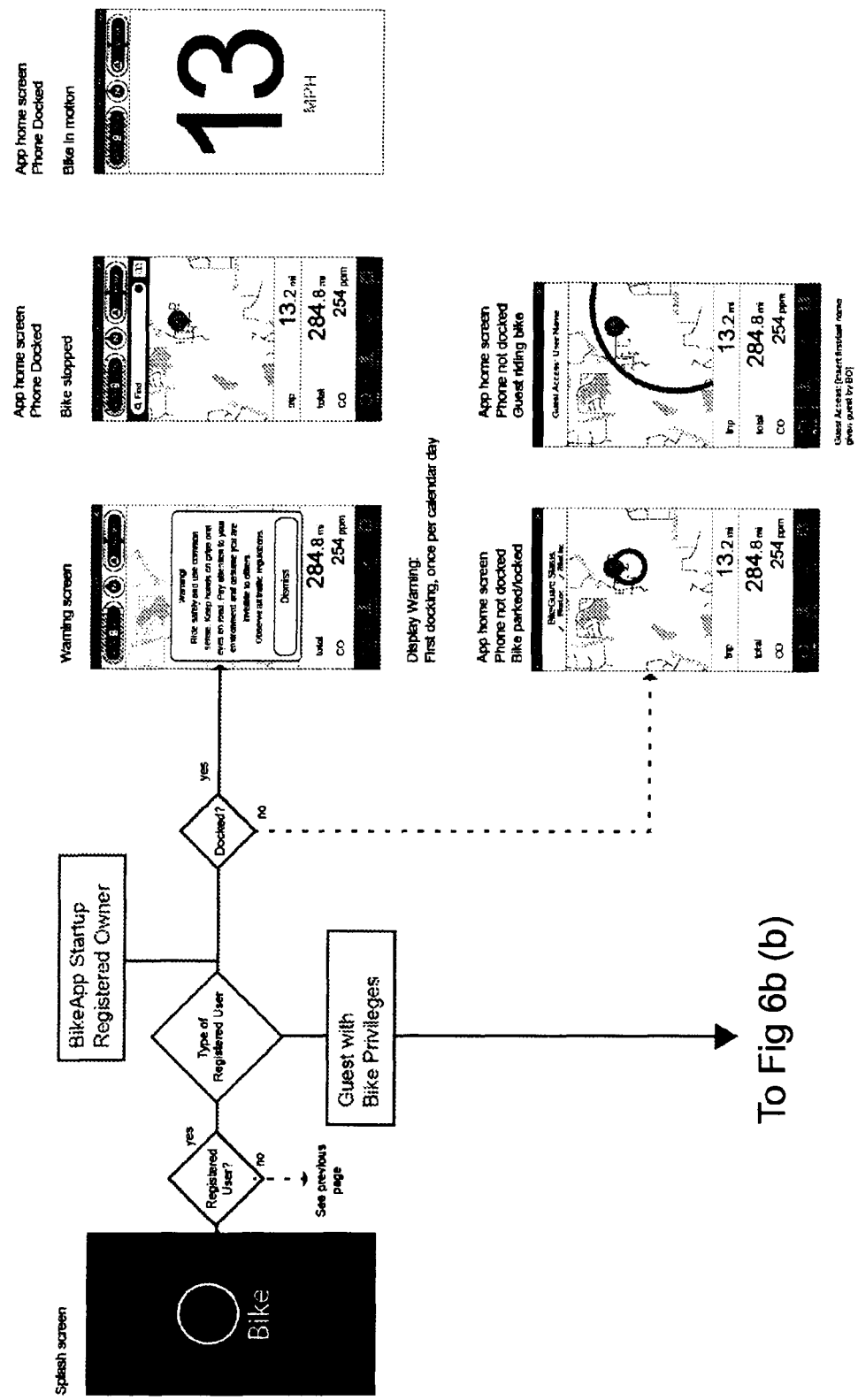

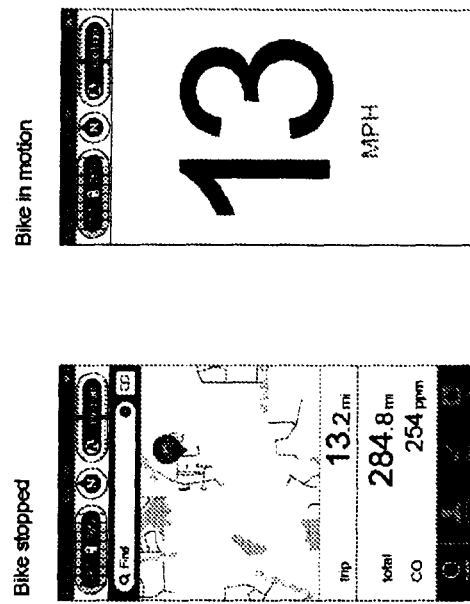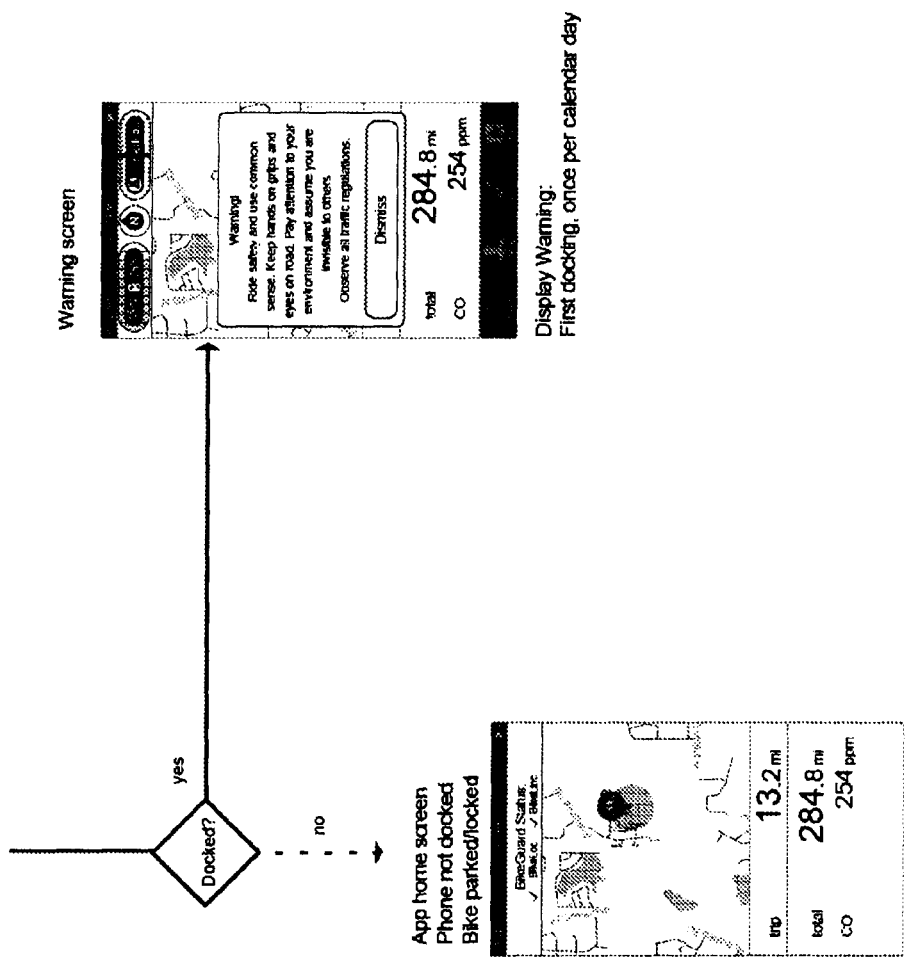
FIGURE 6b (b)

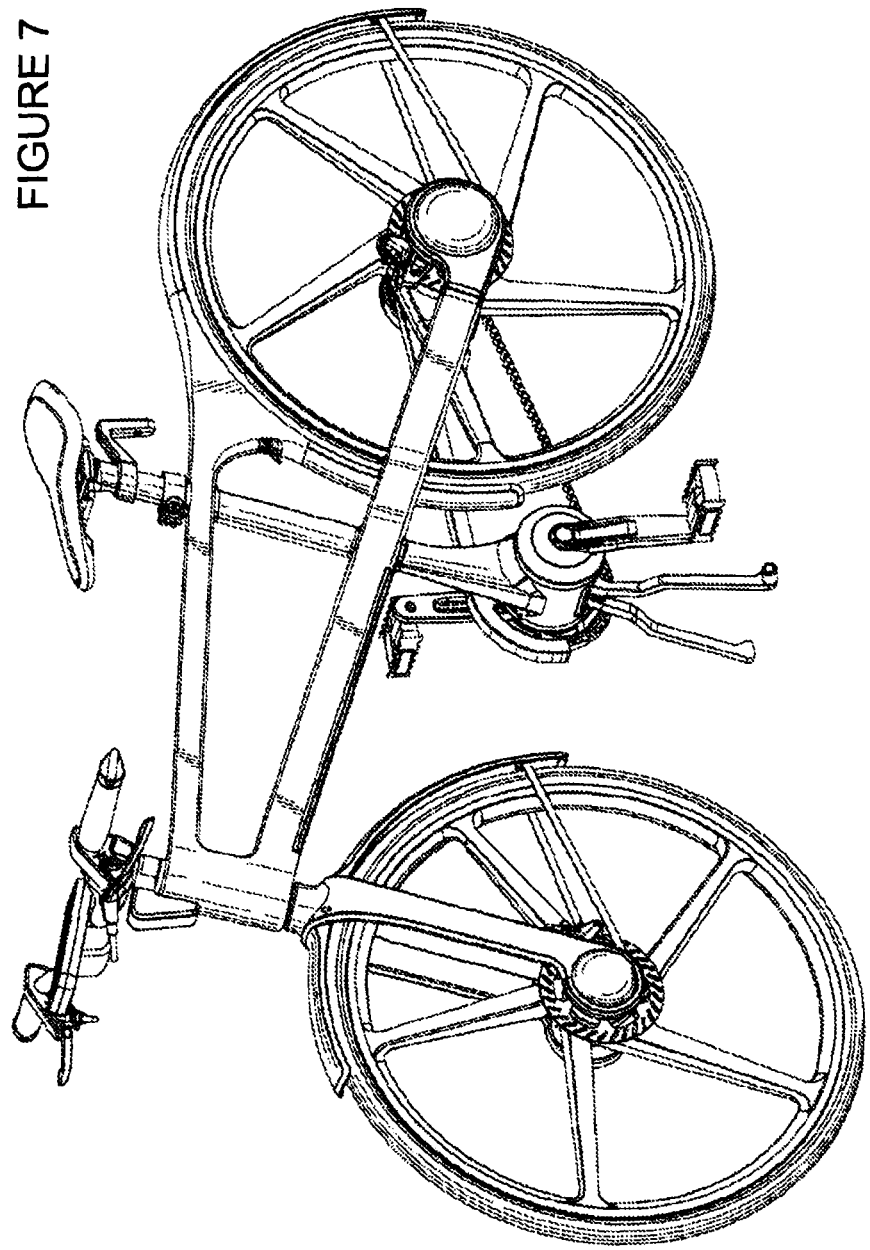

Display until conditions cleared

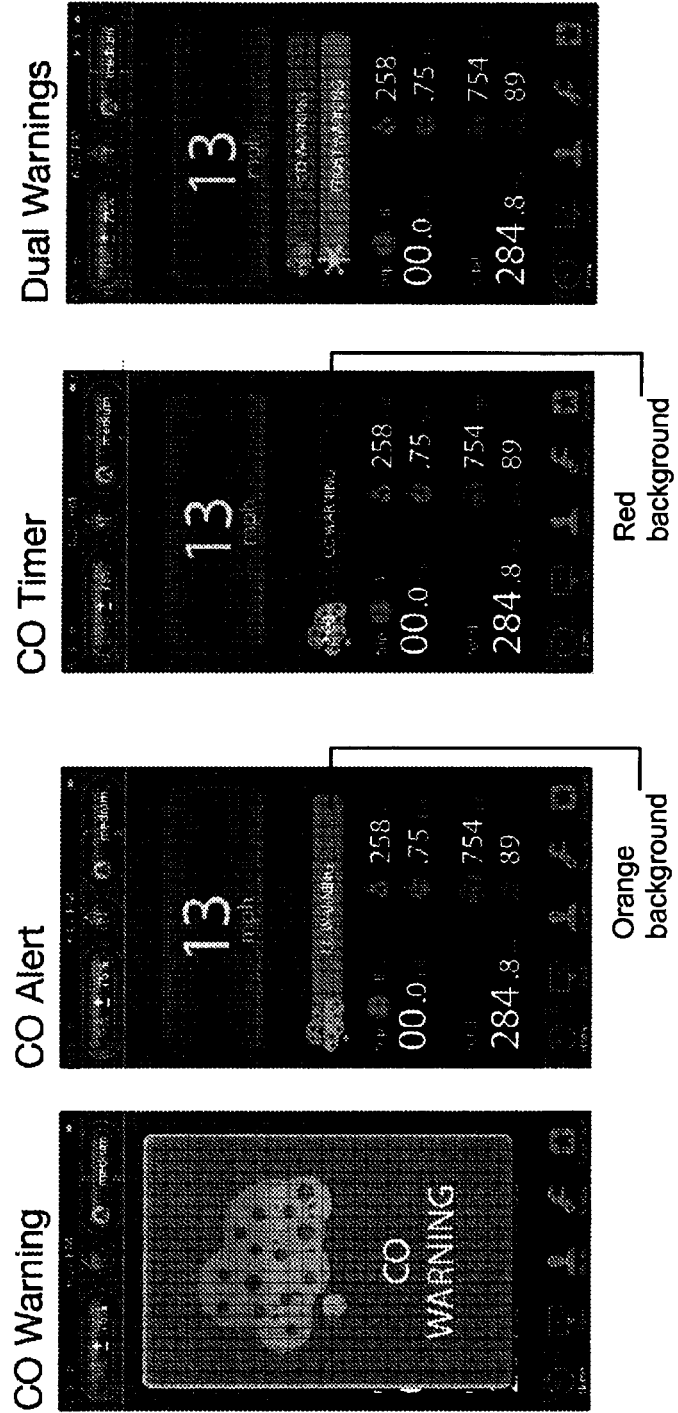

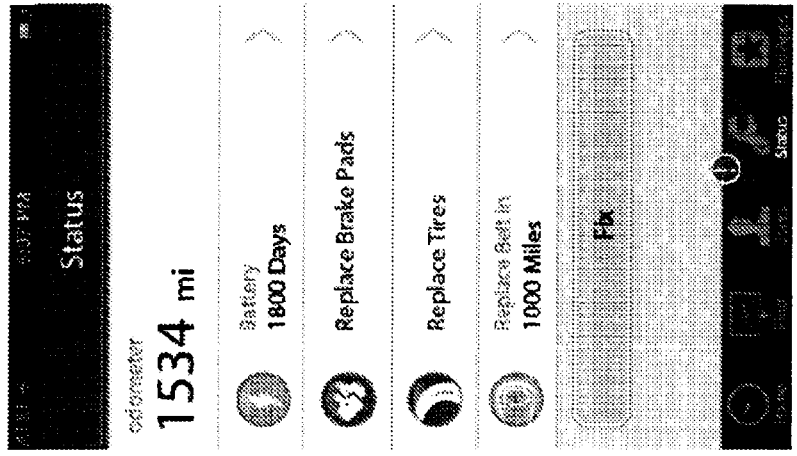
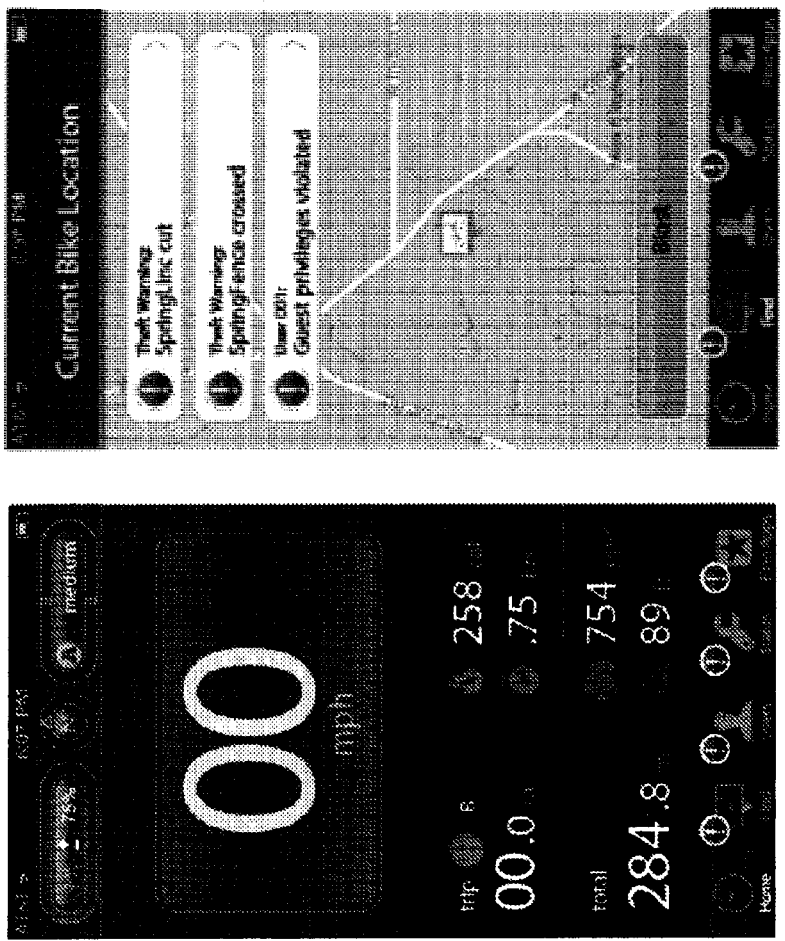
FIGURE 27c
FIGURE 27b
FIGURE 27a

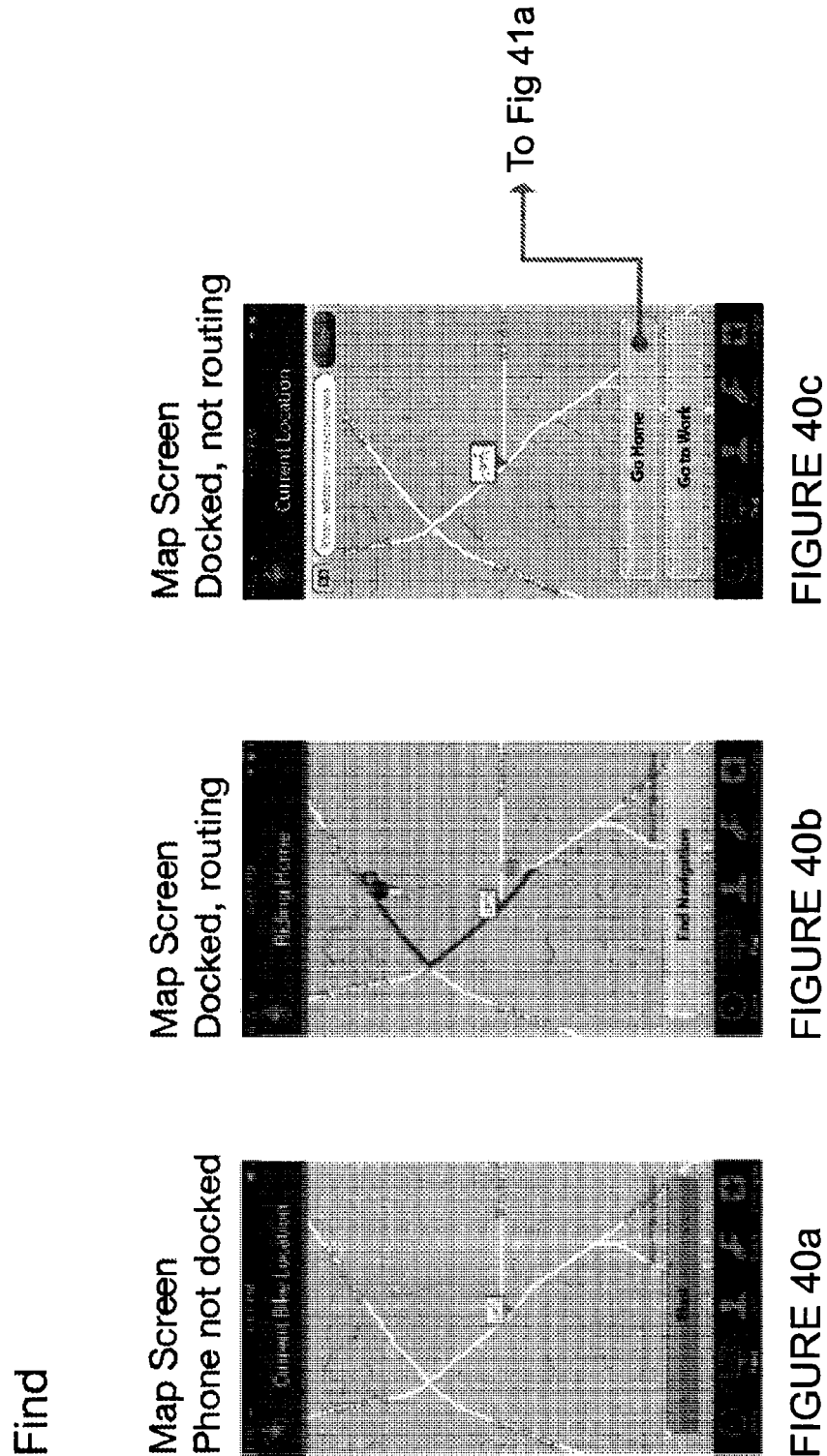

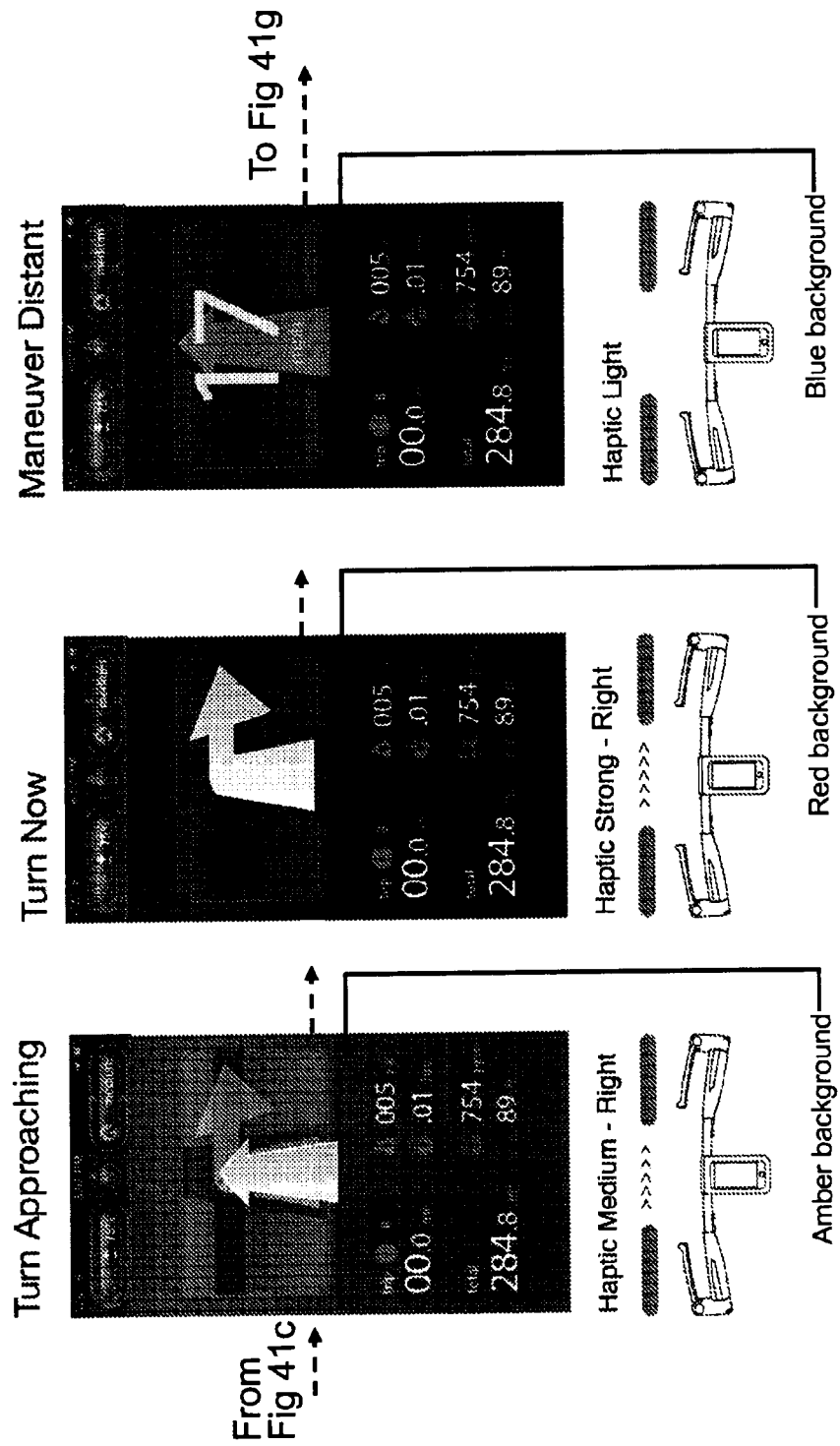

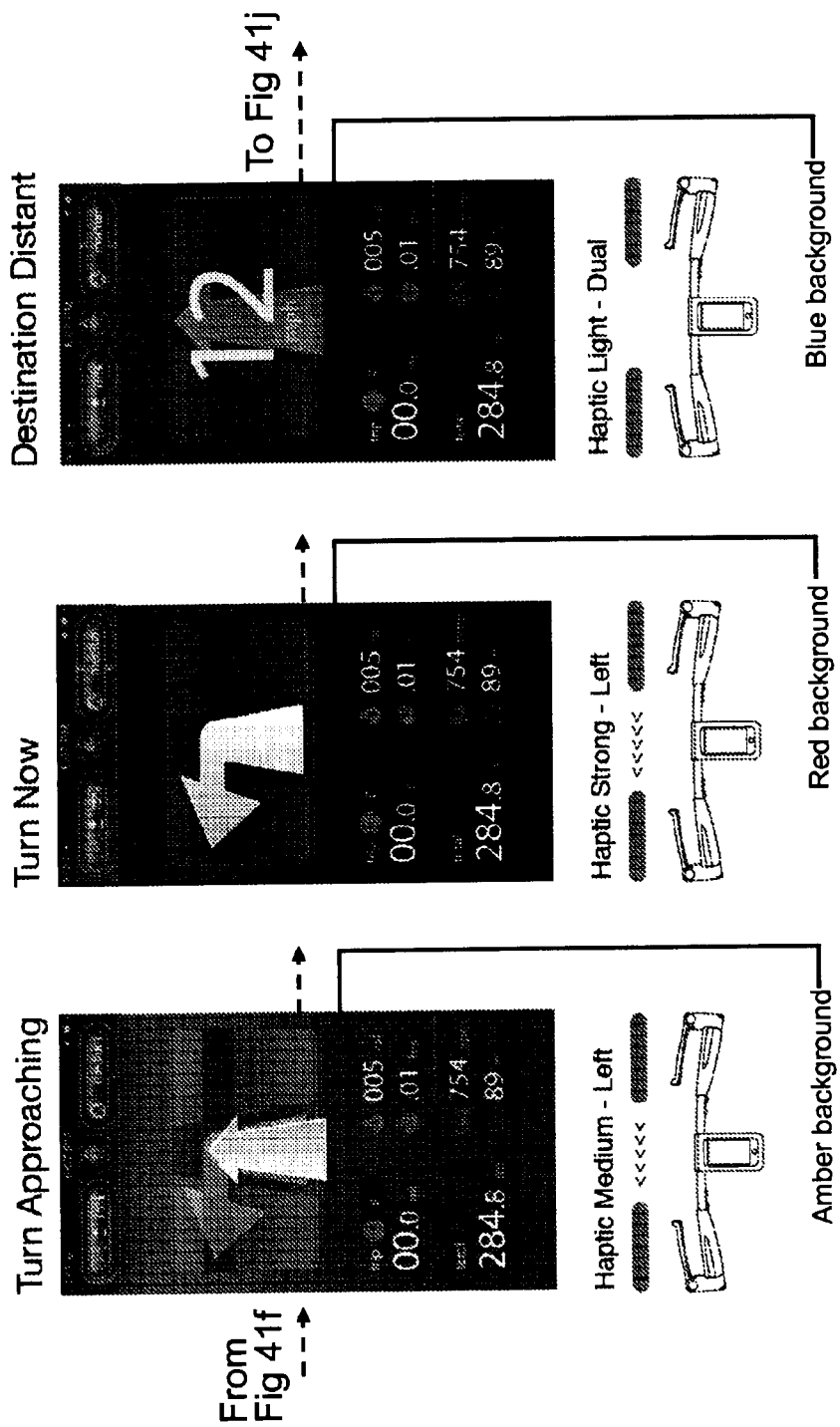

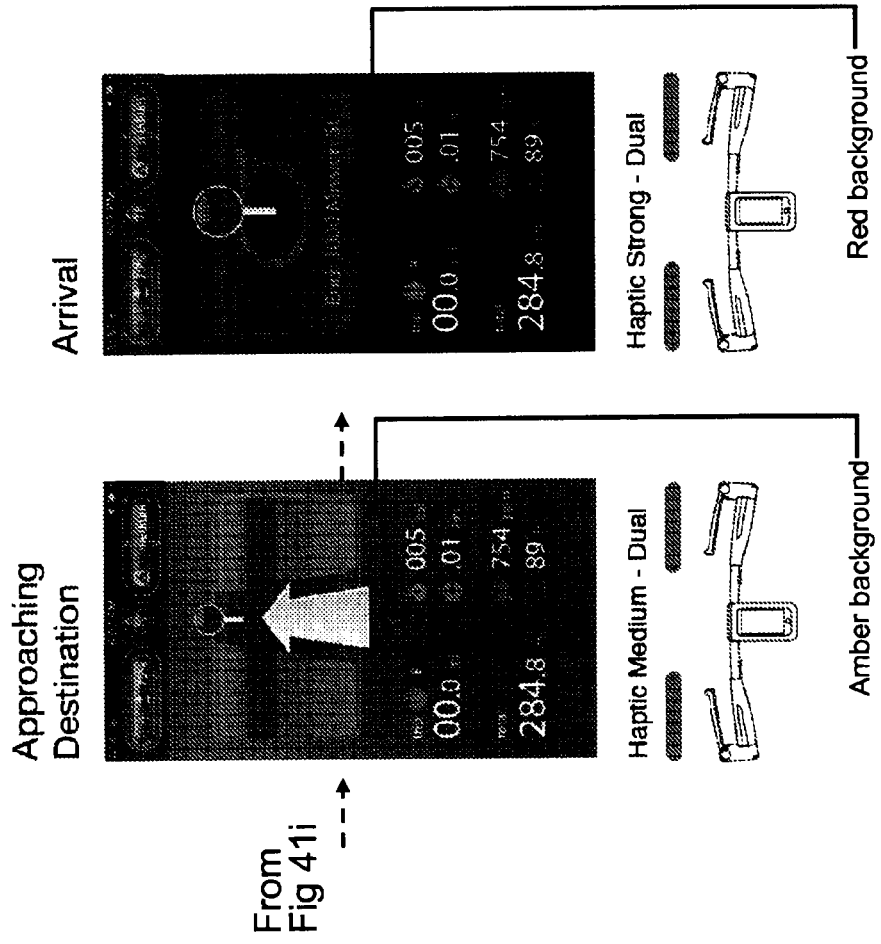

SpringApp's Status Feature

Status screen

To Fig 53a

Maintentance Book

Swipeable image/text viewer

From Fig 51

CAP Help

BICYCLE SYSTEM

This application claims priority from Ser. No. 15/902,585 filed Feb. 22, 2018 which claims priority from Ser. No. 14/899,501 filed Dec. 17, 2015 which claims priority of PCT/US2014/043405 filed on Jun. 20, 2014; GB1311001.0 filed Jun. 20, 2014; U.S. 61/978,464 filed Apr. 11, 2014 and U.S. Ser. No. 29/489,808 filed May 2, 2014.

A portion of the disclosure of this patent document contains material which is subject to copyright and/or mask work protection. The copyright and/or mask work owners have no objection to the facsimile reproduction by anyone of the patent document or the patent disclosure, as it appears in the US Patent and Trademark Office or World Intellectual Property Organization patent file or records, but otherwise reserve all copyright and mask work rights whatsoever.

BACKGROUND OF THE INVENTION

1. Field of the Invention

The field of the invention relates to bicycle systems, especially to bicycle systems adapted for use with smartphones, to smartphones configured for use with bicycle systems, and to methods and to computer software for use with such bicycle systems or smartphones, and to servers configured to communicate with such bicycle systems or smartphones.

2. Technical Background

Technological advancements have enhanced most modern day forms of transportation. For example, in the current smart-phone-centric society, operators and passengers of automobiles and airplanes have had their commute enriched with applications that enable users to tailor their experience. In contrast, the bicycle has remained comparatively primitive.

3. Discussion of Related Art

There have been developments in accessories that allow the usage of electronic devices, such as GPS systems or smart phones on a bicycle. However, these developments have typically been modular in nature and require that a user bolt on a GPS system to a bicycle or bolt on a docking system for a smart phone. There have even been developments to security systems for bicycles to allow tracking. The problem is that all of these accessories are separate from the bicycle and need to be added to a bicycle as a retro-fit. When these items are retro-fitted to a bike, durability and security become an issue. These accessories can be easily broken or stolen as they are simply bolted onto the bicycle. Further, each time an accessory is added, the bicycle becomes less aerodynamic and speed of the bicycle can be adversely affected. Here there are disclosed solutions to these problems by integrating accessories into the bicycle in a manner that they are all contained within the bicycle and it is not possible (or it is possible only with difficulty) for them to be broken off, stolen, or to interfere with the performance of the bicycle.

Bicycles and smart phones exist independently in our society, and each is used in some manner to plan and complete trips from point A to point B. Here there are disclosed solutions which fully integrate the two. Additionally, the solutions offer a technology-based approach to protecting and maintaining the bicycle.

The solutions disclosed herein relate to a bicycle's frame-embedded nervous system and provide the user with a fully interactive cycling experience. A handlebar integrated docking system allows the rider to customize and manage his trip "on the go." Currently, a cyclist should turn off and stow his smartphone while operating a bicycle. Additionally, if a cyclist is unfamiliar with his location or gets lost in search of a destination, he should pull over and either check a map or ask for directions. Moreover, while bike locks currently do exist, they are independent, basic, detached devices. The solutions disclosed herein truly bring the bicycle into the 21st Century, and are designed with the tech-savvy, urban rider in mind.

The above references to and descriptions of prior proposals or products are not intended to be, and are not to be construed as, statements or admissions of common general knowledge in the art. In particular, the above prior art discussion might not relate to what is commonly or well known by the person skilled in the art, but assists in the understanding of the inventive steps of the solutions disclosed herein of which the identification of pertinent prior art proposals is but one part.

SUMMARY OF THE INVENTION

According to a first aspect of the invention, there is provided a bicycle system including a bicycle, the bicycle system including a processor integral to the bicycle, the bicycle system further including a battery integral to the bicycle, wherein the processor is powerable by the battery, the bicycle system including a smartphone holder configurable to receive a smartphone and to connect the smartphone to the processor, wherein in use the smartphone holder is attachable to, and detachable from, the smartphone. Advantages include that the smartphone may be charged by the battery, the smartphone can communicate with the processor so as to receive various information such as maintenance-related information of the bicycle system, the bicycle system can investigate the smartphone identity to check for unauthorized use of the bicycle system, the smartphone is held during bicycle system travel which reduces the risk of damage to the smartphone, and the bicycle system shape is more aerodynamic than that of a bicycle to which a processor and/or a battery has merely been bolted-on.

The bicycle system may include software executable on the processor.

The bicycle system may be one wherein the processor is configured to identify a smartphone in connection with the processor.

The bicycle system may be one wherein the smartphone holder includes a transparent lid that is openable for the holder to receive the smartphone, and wherein the lid is closable to protect the smartphone during use of the bicycle system. An advantage is that the smartphone screen may be viewed during bicycle system travel and the smartphone (eg. its screen) is protected by the lid from damage.

The bicycle system may be one including handlebars, wherein the smartphone holder is a handlebars-integrated docking system. An advantage is the smartphone screen is readily viewable during travel.

The bicycle system may be one wherein the handlebars-integrated docking system position is adjustable.

The bicycle system may be one including handlebars, wherein the handlebars comprise right and left switches to control right and left turn signals. An advantage is that a user can signal the next turn without taking a hand far off the handlebars.

The bicycle system may include a left handlebar and a right handlebar, and a left haptic generator in the left handlebar and a right haptic generator in the right handlebar. An advantage is that a user feels a maneuver instruction without using sight or sound. This helps the user travel more safely because they don't necessarily have to look away or listen for an instruction.

The bicycle system may be one arranged to provide a haptic vibration in a handlebar grip corresponding to a direction of a turn in response to a navigation instruction generated by the smartphone. An advantage is that a user feels a maneuver instruction without necessarily using sight or sound.

The bicycle system may be one further including an integrated locking system configurable to prevent the bicycle system from traveling. An advantage is theft protection.

The bicycle system may be one wherein the locking system is controllable by the processor. An advantage is that a user does not need to provide a separate lock.

The bicycle system may be one wherein the locking system is deactivated in response to receiving a smart phone recognized by the processor in the smartphone holder. An advantage is that a smartphone also functions as a key to unlock the bicycle system.

The bicycle system may be one wherein the locking system is activated in response to removal of a smart phone recognized by the processor from the smartphone holder. An advantage is that a user does not need to perform a separate locking action.

The bicycle system may be one wherein the locking system includes a bolt lock integrated in a bottom bracket of the bicycle. An advantage is tamper resistance.

The bicycle system may be one wherein unauthorized deactivation of the bolt lock detected by the processor generates an alarm. An advantage is deterrence of more sophisticated theft.

The bicycle system may be one wherein upon activation of the locking system, the bicycle system establishes the bicycle system's geo-position, after which, if a moved distance exceeds a threshold, the bicycle system alerts a registered user via a notification transmitted to the registered user's smartphone. An advantage is deterrence of more sophisticated theft.

The bicycle system may be one wherein the locking system includes a frame-integrated, retractable cable operable to loop around an immovable object so as to secure the bicycle system to the immovable object.

The bicycle system may be one wherein a cutting of the cable, detected by the processor, generates an alarm. An advantage is deterrence of theft.

The bicycle system may be one configured to output an alarm if an unauthorized device is received in the smartphone holder of the bicycle system. An advantage is deterrence of theft.

The bicycle system may be one configured to transmit its position to a smartphone in response to the generation of an alarm at the bicycle system. An advantage is deterrence of theft.

The bicycle system may be one including a front hub capable of supporting an accessory. An advantage is that many accessories can be supported on the front hub.

The bicycle system may be one including a rear hub capable of supporting an accessory. An advantage is that many accessories can be supported on the rear hub.

The bicycle system may be one including a rear hub including a continuously variable transmission. An advantage is a user is not required to change gear.

The bicycle system may be one including a seamless bicycle frame. An advantage is aerodynamic efficiency.

The bicycle system may be one configured to charge the smartphone when the smartphone is in connection with the processor.

The bicycle system may be one including an on-frame charging port for external charging of the battery.

The bicycle system may be one including integrated energy generation, storage, and charging systems.

The bicycle system may be one wherein the energy generation system includes a front hub integrated kinetic generator.

The bicycle system may be one wherein the energy generation system includes a rear hub integrated kinetic generator.

The bicycle system may be one including a fully-integrated frame-embedded electronics system.

The bicycle system may be one wherein the electronics system includes an application processor, a transceiver module, system memory, rider-accessible flash memory, and a sensor processor.

The bicycle system may be one including a fully-integrated lighting system. An advantage is user safety.

The bicycle system may be one wherein the fully-integrated lighting system includes a stem light, indicator lights, front and rear dual-sided lights, and a seat light. An advantage is user safety.

The bicycle system may be one configured to increase the brightness of a rearwards facing light in response to actuation of a brake lever on a handlebar of the bicycle system. An advantage is user safety.

The bicycle system may be one wherein the bicycle system includes a carbon monoxide sensor in connection with the processor.

The bicycle system may be one configured to provide a carbon monoxide alert in response to a sensed carbon monoxide level exceeding a threshold. An advantage is user safety.

The bicycle system may include a temperature sensor in connection with the processor. The bicycle system may include a humidity sensor in connection with the processor. The bicycle system may include a light sensor in connection with the processor. The bicycle system may include an orientation sensor in connection with the processor. The bicycle system may include a position sensor in connection with the processor. The bicycle system may include an acceleration sensor in connection with the processor. The bicycle system may include a gyroscope sensor in connection with the processor. The bicycle system may include a carbon fiber belt. The bicycle system may include interchangeable trays which allow different smartphone models to be accommodated in the smartphone holder.

The bicycle system may be one wherein the processor is internal to a frame of the bicycle. An advantage is protection of the processor from impact shock.

The bicycle system may be one wherein the battery is internal to a frame of the bicycle. An advantage is protection of the battery from impact shock.

The bicycle system may be one wherein the bicycle system further includes the smartphone.

According to a second aspect of the invention, there is provided a smartphone configured to communicate with a bicycle system, the bicycle system including a bicycle, the bicycle system including a processor integral to the bicycle, the bicycle system further including a battery integral to the bicycle, wherein the processor is powerable by the battery, the bicycle system including a smartphone holder arranged to receive the smartphone and to connect the smartphone to the processor, wherein in use the smartphone is attachable to, and detachable from, the smartphone holder. Advantages include that the smartphone can be charged by the battery, the smartphone can communicate with the processor so as to receive various information such as maintenance-related information of the bicycle system, and the smartphone is held during bicycle system travel which reduces the risk of damage to the smartphone.

The smartphone according to the second aspect of the invention may be configured to communicate with a bicycle system according to any aspect of the first aspect of the invention.

According to a third aspect of the invention, there is provided a method of communicating between a bicycle system and a smartphone, the bicycle system including a bicycle, the bicycle system including a processor integral to the bicycle, the bicycle system further including a battery integral to the bicycle, wherein the processor is powerable by the battery, the bicycle system including a smartphone holder in which the smartphone has been received, the method including the step of the bicycle system processor communicating with the smartphone which has been received by the smartphone holder. Advantages include that the smartphone can communicate with the processor so as to receive various information such as maintenance-related information of the bicycle system, and the bicycle system can investigate the smartphone identity to check for unauthorized use of the bicycle system.

The method may further include the step of discovering the smartphone's unique identifying code. An advantage is a check for unauthorized use of the bicycle system.

The method may further include the step of deactivating a theft deterrence system of the bicycle system. An advantage is that the bicycle system can be unlocked for further use.

The method may further include the step of launching the bicycle system's companion smartphone application. An advantage is that a user does not need to manually launch the companion smartphone application, which may be inconvenient when the user wants to depart on the bicycle system.

The method may further include the step of determining the smartphone's battery state and initiating charging if required. An advantage is that the battery can be charged while the user travels, the opposite to what usually happens.

According to a fourth aspect of the invention, there is provided a computer program product executable on a smartphone, the computer program product arranged to communicate with a processor of a bicycle system in response to the smartphone being received in a smartphone holder of the bicycle system. An advantage is that a smartphone can be programmed to interact with the bicycle system.

The computer program product may be operable to communicate with a server over a network and to register a bicycle system with an account at the server which is already linked to a smartphone. An advantage is that unauthorized use of the bicycle system is made more difficult.

The computer program product may be operable to communicate with the server and to register the bicycle system with an account at the server which is already linked to the smartphone when the smartphone is docked with the bicycle system. An advantage is that future unauthorized use of the bicycle system is made more difficult.

The computer program product may synchronize with the bicycle system in response to the smartphone being received in a smartphone holder of the bicycle system. An advantage is the smartphone and bicycle system thereafter have access to consistent data resources, which avoids operational inconsistencies between the smartphone and the bicycle system.

The computer program product may be arranged to communicate with the bicycle system using a mobile communication network when the smartphone is not docked with the smartphone holder of the bicycle system. An advantage is that unauthorized use of the bicycle system is made more difficult.

The computer program product may be arranged to display a map screen on the smartphone which shows a bicycle system's current position, even when the smartphone is not docked to the bicycle system. An advantage is that unauthorized use of the bicycle system is made more difficult.

The computer program product may be operable to calculate a route to a destination.

The computer program product may be arranged to provide turn-by-turn navigation for the bicycle system to a destination. An advantage is that a user can obtain navigation instructions while traveling on the bicycle system.

The computer program product may be arranged to provide haptic feedback to handlebars of the bicycle system during turn-by-turn navigation for the bicycle system to a destination. An advantage is that a user can obtain haptic navigation instructions while traveling on the bicycle system.

The computer program product may be arranged to provide a first screen when the bicycle system is in motion and a different, second screen when the bicycle system is not in motion. An advantage is that information on the screen can be provided that is relevant to whether or not the bicycle system is moving.

The computer program product may be arranged to provide display on the smartphone of a smartphone battery state and of a bicycle system battery state. An advantage is that a user can know if one or both of the batteries needs charging, by looking at a single screen.

The computer program product may be operable to remotely trigger a theft alarm of the bicycle system. An advantage is theft deterrence.

The computer program product may be arranged to provide maintenance-related information of the bicycle system. An advantage is that the user has the opportunity to perform or seek relevant maintenance before the bicycle system breaks down.

The computer program product may be arranged to provide sensor data from sensors of the bicycle system on a screen of the smartphone. An advantage is that local sensor data is made available to the user.

According to a fifth aspect of the invention, there is provided a server configured to provide a downloadable software application, the software application downloadable to a smartphone, the software application identifiable by a processor of a bicycle system in connection with the smartphone. An advantage is that a software application can be obtained after purchase of one or more of the smartphone and the bicycle system.

According to a sixth aspect of the invention, there is provided a server arranged to establish and store a user account, the user account identifying a smartphone linked to the account, and the user account identifying a bicycle system linked to the account, the bicycle system including a processor. An advantage is that the smartphone and bicycle system can be linked in a secure way at a server.

The server may be arranged to provide downloadable software applications relating to the bicycle system to the smartphone. An advantage is a selection of relevant software applications can be provided.

According to a seventh aspect of the invention, there is provided a server configured to receive from a bicycle system an identity of a smartphone in response to a smartphone holder of the bicycle system receiving the smartphone, the server configured to transmit to the bicycle system an indication of whether or not the smartphone is authorized for use on the bicycle system. An advantage is that unauthorized use of the bicycle system is made more difficult.

According to an eighth aspect of the invention, there is provided a server configured to send a message warning of an unauthorized device having been received in a smartphone holder of a bicycle system, the server sending the message to a device which is authorized for receiving in a smartphone holder of a bicycle system. An advantage is that unauthorized use of the bicycle system is deterred.

According to a ninth aspect of the invention, there is provided a server arranged to interrogate a bicycle system, the bicycle system including a processor, for maintenance-related information, and to store at the server the maintenance-related information for the bicycle system. An advantage is that communications relating to needed maintenance work can be managed at the server.

The server may be configured to send maintenance-related instructions to a smartphone, in response to a request in relation to the maintenance-related information for the bicycle system stored at the server. An advantage is that communications relating to needed maintenance work can be managed at the server.

According to a tenth aspect of the invention, there is provided bicycle handlebars including a handlebar-integrated smart phone docking station. An advantage is that a smartphone can be protected and viewed during bicycle system travel.

According to an eleventh aspect of the invention, there is provided bicycle handlebars including built-in haptic feedback generators connectable to a power source. An advantage is that the handlebars are controllable to provide haptic feedback to a user during bicycle travel.

According to a twelfth aspect of the invention, there is provided bicycle handlebars including built-in indicator lights connectable to a power source. An advantage is that a user does not have to move a hand far from the handlebars to indicate a maneuver during bicycle system travel.

According to a thirteenth aspect of the invention, there is provided a bicycle including a frame, a crank axle and a crank axle lock integral to the frame, the lock moveable between a first configuration in which the crank axle is prevented from rotating with respect to the frame, and a second configuration in which the crank axle is rotatable with respect to the frame. An advantage is theft prevention.

According to a fourteenth aspect of the invention, there is provided a platform for mounting accessories above a rear wheel of a bicycle including a saddle, the platform elongate in a direction from the saddle to the rear of the bicycle, the platform including a recess for receiving an accessory, wherein the recess extends along the elongate platform, the platform in attachment with a support of the saddle, the platform including a spur arranged to abut against a frame of the bicycle, the spur providing support for the platform in a loaded configuration of the platform. An advantage is use of space above a rear bicycle wheel for carrying an accessory, with low adverse aerodynamic impact.

According to a fifteenth aspect of the invention, there is provided reusable packaging for a bicycle system, the packaging configurable between a closed configuration completely enclosing the bicycle system, and an open configuration in which the bicycle system is removable from the packaging, the packaging openable using quick-release locks, the packaging including fitted insets to fully isolate and protect the bicycle system during transport.

According to a sixteenth aspect of the invention, there is provided a bicycle hubcap, the hubcap rotatable around an axis of an axle of a bicycle wheel in a first direction so as to lock the hubcap to a bicycle hub, the bicycle hubcap rotatable around the axis of the axle of the bicycle wheel in a direction opposite to the first direction so as to unlock the hubcap from the bicycle hub.

According to a seventeenth aspect of the invention, there is provided bicycle hub including a hubcap mounting point that is arranged to receive an accessory mountable on the hubcap mounting point.

According to a eighteenth aspect of the invention, there is provided a protective carry case for a smartphone, the case configured to be receivable in a smartphone holder of a bicycle system, and to be stored securely in the smartphone holder of a bicycle system.

According to a nineteenth aspect of the invention, there is provided a dock insert for a smartphone holder of a bicycle system, the dock insert configured to receive and to secure a carry case for a smartphone, the dock insert configured to be received securely in the smartphone holder of the bicycle system.

BRIEF DESCRIPTION OF THE DRAWINGS

Possible and preferred features of the present invention will now be described with particular reference to the accompanying drawings. However, it is to be understood that the features illustrated in and described with reference to the drawings are not to be construed as limiting on the broad scope of the invention. The above and other aspects of the invention will now be described, by way of example only, with reference to the following Figures, in which:

FIGS. 6b (a) and 6b (b) show software flowcharts of what may occur when a previously-registered device is docked and recognized by a bicycle.

FIG. 7 shows a front perspective view of the left side of a bicycle system having a kickstand and docking station.

FIG. 23a shows an App for a bicycle system displaying a CO warning.

FIG. 23b shows an App for a bicycle system displaying a CO Alert with a coloured background.

FIG. 23c shows an App for a bicycle system displaying a CO Timer with a coloured background.

FIG. 23d shows an App for a bicycle system displaying dual warnings.

FIG. 27a shows an App for a bicycle system displaying Tab bar alerts.

FIG. 27b shows an App for a bicycle system displaying a notification list of notifications relating to the bicycle system with which the smartphone running the App is associated.

FIG. 27c shows an App for a bicycle system displaying a list of maintenance-related notifications.

FIG. 28 shows on the right hand side an example of screen output from an App which is first in the list on the left hand side.

FIG. 40a shows an App for a bicycle system displaying a map screen on the smartphone which shows a bicycle system's current position, even when the smartphone is not docked to the bicycle system.

FIG. 40b shows an App for a bicycle system displaying a map screen on the smartphone which shows a bicycle system's current position, when the smartphone is docked to the bicycle system, and routing information is being provided.

FIG. 40c shows an App for a bicycle system displaying a map screen on the smartphone which shows a bicycle system's current position, when the smartphone is docked to the bicycle system, even when routing information is not being provided.

FIG. 41d shows an App for a bicycle system displaying guidance regarding an upcoming maneuver, and that related haptic output is provided to handlebars of the bicycle system.

FIG. 41e shows an App for a bicycle system displaying guidance regarding a maneuver for immediate execution, and that related haptic output is provided to handlebars of the bicycle system.

FIG. 41f shows an App for a bicycle system displaying guidance regarding a distant maneuver, and that related haptic output is provided to handlebars of the bicycle system.

FIG. 41g shows an App for a bicycle system displaying guidance regarding an upcoming maneuver, and that related haptic output is provided to handlebars of the bicycle system.

FIG. 41h shows an App for a bicycle system displaying guidance regarding a maneuver for immediate execution, and that related haptic output is provided to handlebars of the bicycle system.

FIG. 41i shows an App for a bicycle system displaying guidance regarding a distant destination, and that related haptic output is provided to handlebars of the bicycle system.

FIG. 41j shows an App for a bicycle system displaying guidance regarding approaching the destination, and that related haptic output is provided to handlebars of the bicycle system.

FIG. 41k shows an App for a bicycle system displaying guidance regarding arrival at the destination, and that related haptic output is provided to handlebars of the bicycle system.

FIG. 56 shows on the right hand side an example of a bicycle system's packaging in a closed configuration.

DETAILED DESCRIPTION

Figure 1:
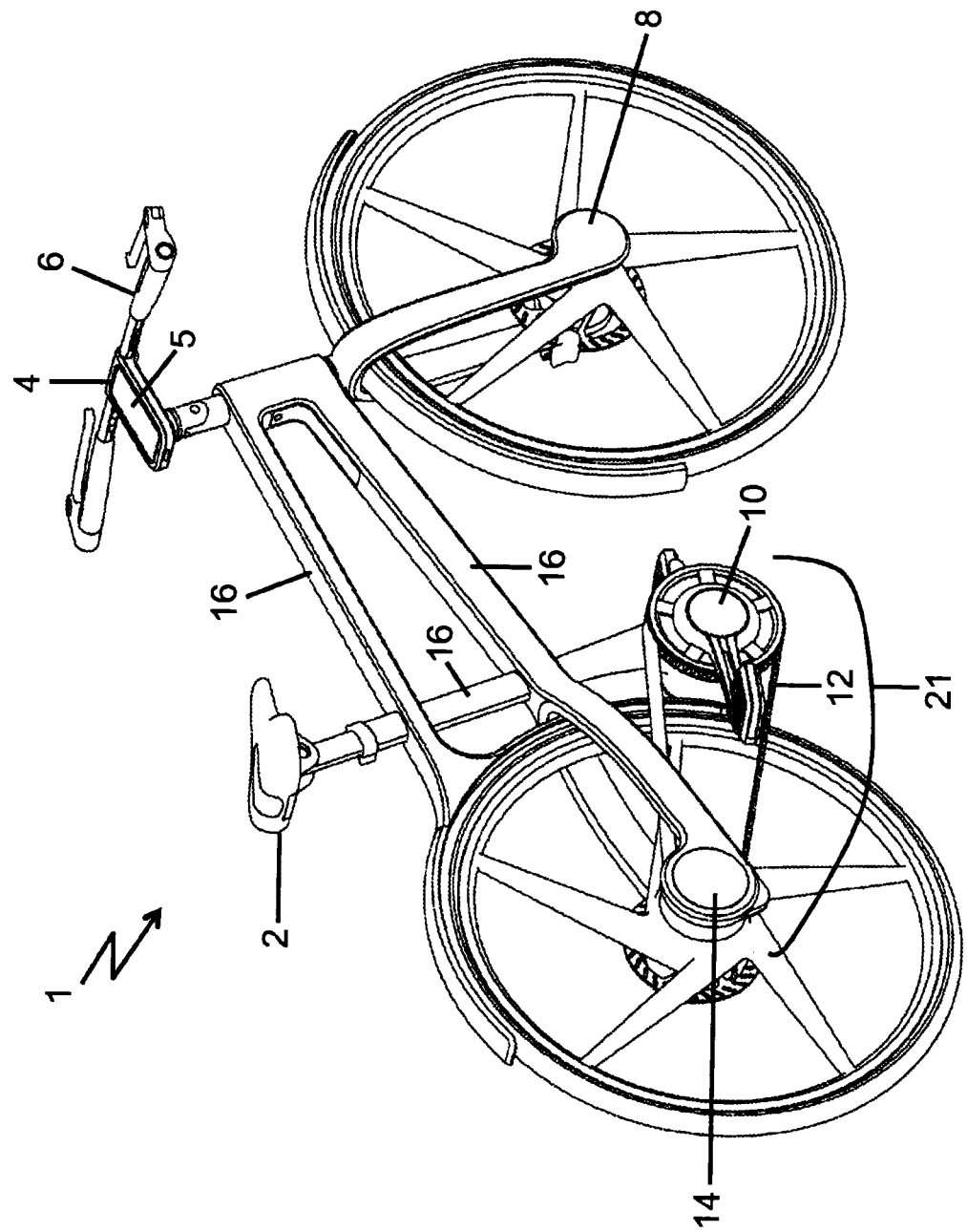
FIG. 1 shows a side rear perspective view of an example of a bicycle system.

A solution disclosed herein relates to a bicycle system with embedded software and hardware that enhances the user experience by connecting to the user's smart phone via a handlebar docking system. A solution disclosed herein may also relate to a lock for locking an item, such as a bicycle, that is linked to software on an electronic device.

A solution disclosed herein relates to a bicycle system comprising embedded electronics for controlling certain features and a handlebar integrated docking system for an electronic device, such as a smart phone, that acts as the rider-interface. The bicycle system may also contain a locking mechanism which is electronically-linked to said rider-interface.

There is provided a bicycle system with integrated electronics.

In one example, a bicycle system comprises: a bicycle frame further comprising an adjustable seat and an adjustable handlebar; an electronic device docking system integrated within said handlebar; front and rear hub caps capable of supporting an array of accessories integrated within said bicycle frame; electronics integrated within said bicycle frame wherein said electronics are powered by a battery and support features of the bicycle system; and a lock integrated into a bottom bracket of said bicycle frame.

In one example, the bicycle frame is seamless, and contains adjustable handlebar orientation, seat height, and seat tilt. The position of said handlebar-integrated docking system is also adjustable. The seamless frame further comprises a front hub, rear hub, and a bottom bracket. Integrated into said rear hub is a continuously variable transmission (CVT) which features a carbon fiber belt and nanotech-coated sprocket and pulley profiles to provide step-less, automatic torque control, as well as optional manual gear shifting. One skilled in the art will recognize that the front and rear hubs may also be capable of supporting an array of custom accessories, such as an infant seat, cargo rack or other similar accessory.

The bicycle system may further comprise a formidable theft deterrence and locking system. This locking system may provide unparalleled dual-level security. The first level is a bolt lock integrated into the bicycle's bottom bracket which is deactivated when the cyclist places an electronic device, such as a smart phone, into the handlebar-integrated docking system, and is activated when the device is undocked. The lock may contain a support bracket and a moveable, spring-loaded clamp. The second level of security is a frame-integrated, retractable cable. This cable can be used to secure the bicycle to bike racks, light poles, and other street furniture. Both the lock and the cable can detect theft attempts, trigger on-board electric alarms, and alert the bicycle system owner.

The bicycle system may further comprise an integrated energy generation, storage, and charging system. The energy system consists of front and rear hubs and a front hub integrated kinetic generators, frame-embedded batteries, and an on-frame charging port. The primary power storage unit may be a lithium ion battery which, when progressively charged by said kinetic generators, ensures all-day, full-system performance. While the lithium battery is preferred, one skilled in the art will recognize that other battery types may also be possible. However, the bicycle system contains an on-frame DC charging port in the event the battery becomes discharged due to prolonged non-use.

The bicycle system may further comprise a fully-integrated frame-embedded electronics system. The electronics system may comprise an application processor, transceiver module, wired or wireless technology, such as Bluetooth, Near field communication (NFC), etc., system memory, rider-accessible flash memory, user interface, and sensor processor which controls bicycle system features such as the CVT, smart battery charger, gyroscope, Electrocardiography (EKG), sensor, and a fully-integrated lighting system. It is anticipated that the electronics may be able to control any number of desired features and that the list of features is in no way limited by the above listing. The lighting system comprises white stem projection lights, side bar indicator lights, front and rear, dual-sided notice-of-presence lights, seat notice-of-presence lights, and right-sided CVT buttons. It is preferred that any number of lights be utilized on the bicycle frame to achieve desired results for a user. The lighting system and its accompanying lights provide high visibility and increased awareness to other road users which increases safety to the user and his/her surroundings.

The application processor may control vibrating haptic feedback to the rider, the bicycle kickstand, cable lock, horn, locking mechanism, and the detection of the presence of the user's smart phone on the handlebar-mounted docking system. To further enhance the user experience, the bicycle may also be equipped with an advanced sensor array which provides a range of ambient data including, but not limited to, carbon monoxide levels, temperature readings, humidity, light and noise levels as well as physical data such as heading, velocity, acceleration, and orientation. When the bicycle system takes its own range of ambient data, the readings are more accurate than what a user may find when looking up data remotely.

Customized, user-friendly control of the aforementioned features may be achieved via an application on the user's smart phone that may sync to and communicate with the bicycle system upon docking to the handlebar-integrated docking station. A user is also able to communicate with the bicycle system when the electronic device is not docked by using mobile communication networks. Features, such as mapping and turn-by-turn navigation, are then accessible to the rider while the bicycle system is in operation. All the while, the bicycle system may utilize haptics and provide audible notices to the user to ensure optimum safety.

An integration point between the user and a solution disclosed herein is the handlebar-integrated smart phone docking station. The user is able to download and install an application on an electronic device to be identified by the bicycle system's recognition software when placed into the docking station after an initial registration and syncing process is completed. One skilled in the art will recognize that the electronic device is preferred to be a smart mobile phone or other similar electronic device so long as it is capable of sending or receiving information. When recognized as the owner's smart phone, the bicycle system-embedded software may launch and display a customizable "Welcome screen" on the face of the smart phone. If a potential user attempts to place a non-registered device on the bicycle system, an "Unauthorized screen" may pop-up on the device and a signal may be sent to the registered owner's registered device warning of a potential theft. Additionally, the registered owner can program the bicycle system's horn and lights to activate in an alarming manner when a non-registered device is docked. Similarly, the registered owner can program the bicycle system's horn and lights to activate if the kickstand is retracted or if the cable lock is cut without the registered device on the docking station.

If a registered device is recognized by the embedded software via the docking station, the user may be prompted to Sign In. After a recognized ID and password are entered, the bicycle system's navigation screen may appear on the docked device. The first time a recognized device is docked on a calendar day, the 'Warning Screen' appears, providing common sense cycling safety advice. After the 'Warning Screen' is manually dismissed by the user, the 'Bike Stopped' screen is displayed and the bicycle system is ready for use. Upon movement, the 'Bike Stopped' screen is replaced by the 'Bike in Motion' screen. This solution's motion-recognition software detects motion and hides/shows elements differently when riding versus when stopped. For example, detailed maps are displayed when the bike is stopped, while bike speed is displayed while the bike is in motion. Moreover, screen input is locked when bike motion is detected to ensure safe, non-distracted, riding.

Another feature of the solution is the on-board navigation system which uses haptic feedback to relay directions. For example, from a stopped position, the user can program a desired destination into the docked device; in turn, the bicycle system's navigation system may calculate and show the route on the screen of the docked device. Once the user begins to move, the 'Bike in Motion' screen may engage and display directional arrows to guide the cyclist to the entered destination. When turns are required, vibration motors embedded within the handlebar grips signal the correct direction to the cyclist, e.g. the left hand grip rumbles twice indicating that cyclist needs to take the next left hand turn. Routes can also be re-calculated in instances where a user cycles off course.

In a second example, a solution disclosed herein relates to the lock for linking an electronic device to an item comprising the item to be locked or unlocked, an electronic device, and a locking mechanism wherein the locking mechanism is linked to the electronic device. In an example, the lock is integrated into the bicycle system's bottom bracket and electronically connected to the docking station via the bicycle system's embedded software. When a registered device is placed on the handlebar-integrated docking system, and is recognized by the bicycle system's embedded software, the lock is disengaged and the bicycle system's crank axle is enabled to allow movement. The lock is engaged when the registered device is removed from the docking station. When the registered device is removed from the docking station, an electronic signal is sent to the lock and the spring-loaded, movable clamp is lowered onto the crank axle, disabling the axle and immobilizing the pedals.

In instances where the bicycle system is stolen or the lock is tampered or broken, the bicycle system is able to notify a user's electronic device by sending a message regarding the status of the bicycle system or lock. The bicycle system may then also be able to transmit its location to a user's electronic device which is a major theft deterrent.

This and other examples will be more thoroughly realized with reference to the drawings and detailed description below.

A bicycle system (1) may comprise a seamless frame (16), with a front hub (8), a rear hub (14), and a bottom bracket (10). The seat (2) and handlebar (6) may be adjustable to accommodate the individual user.

The primary mechanism of accomplishing device to bike connectivity may be by placing an electronic device (5), in the handlebar-integrated docking system (4).

The drivetrain's transmission (CVT) (21) may be integrated into the bicycle at the rear hub (14) and may utilize a carbon fiber belt (12) to deliver smoother, quieter operation than traditional chain systems. An example is shown in FIG. 1.

Figure 2C:
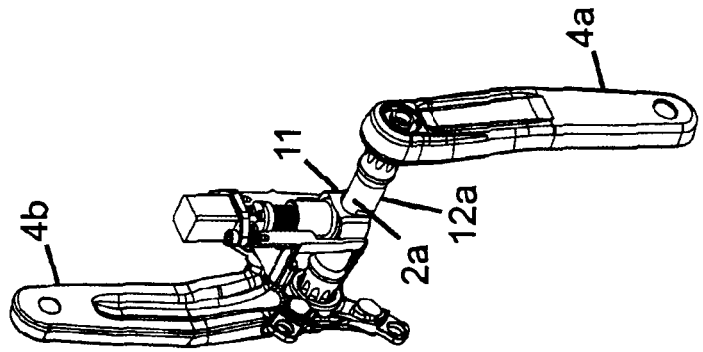
FIG. 2c shows a lock in a locked position.
Figure 2B:
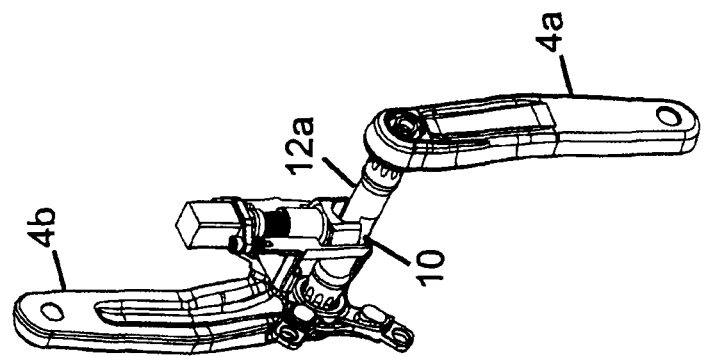
FIG. 2b shows a lock in an unlocked position.
Figure 2A:
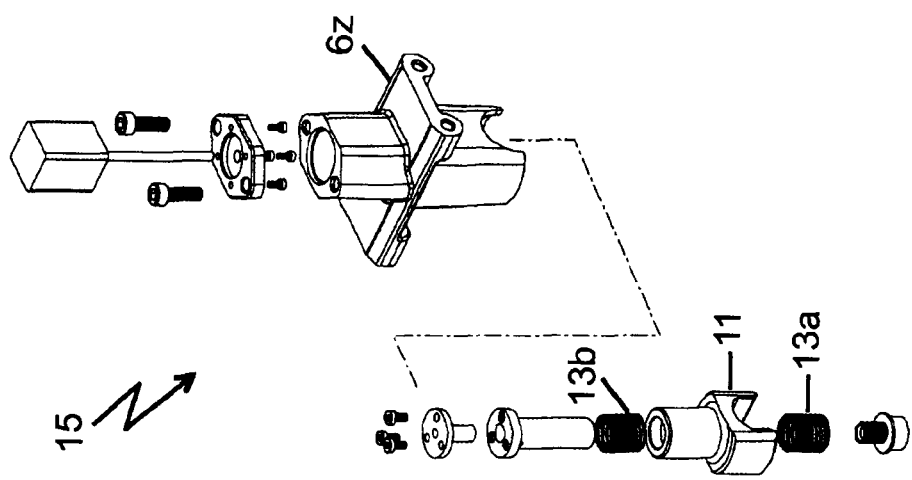
FIG. 2a shows an exploded view of a lock.

A bicycle system (1) may feature an integrated lock that is activated and deactivated when the user places a smart phone, or similar device, on the docking station linked to the bicycle system (1). The lock may be connected to the bicycle system at crank axle (12a). An example is shown in FIGS. 2a, 2b and 2c.

The lock (15) may be comprised of a support bracket (6z) and a spring-loaded, moveable clamp (11). The lock may attach to the bicycle system's crank axle (12a) at a locking point (2a) which is embedded within the bicycle system's bottom bracket (10). Springs (13a, 13b) may provide a point of compression for the clamp (11) when it is either locked or unlocked. FIG. 2c depicts an example of a lock in an engaged, locked state. The lock (15) may receive a lock signal from an electronic device (5) which causes the clamp (11) to move into position around the axle (12a). When the lock is engaged, the pedal cranks (4a, 4b) are disabled and cannot be moved. This in turn causes the bicycle system movement to be disabled. FIG. 2b depicts an example of a lock in a disengaged, unlocked state. To disengage, the lock (15) may receive an unlock signal from an electronic device (5) which causes the clamp (11) to move upward to release the axle (12a).

Figure 3:
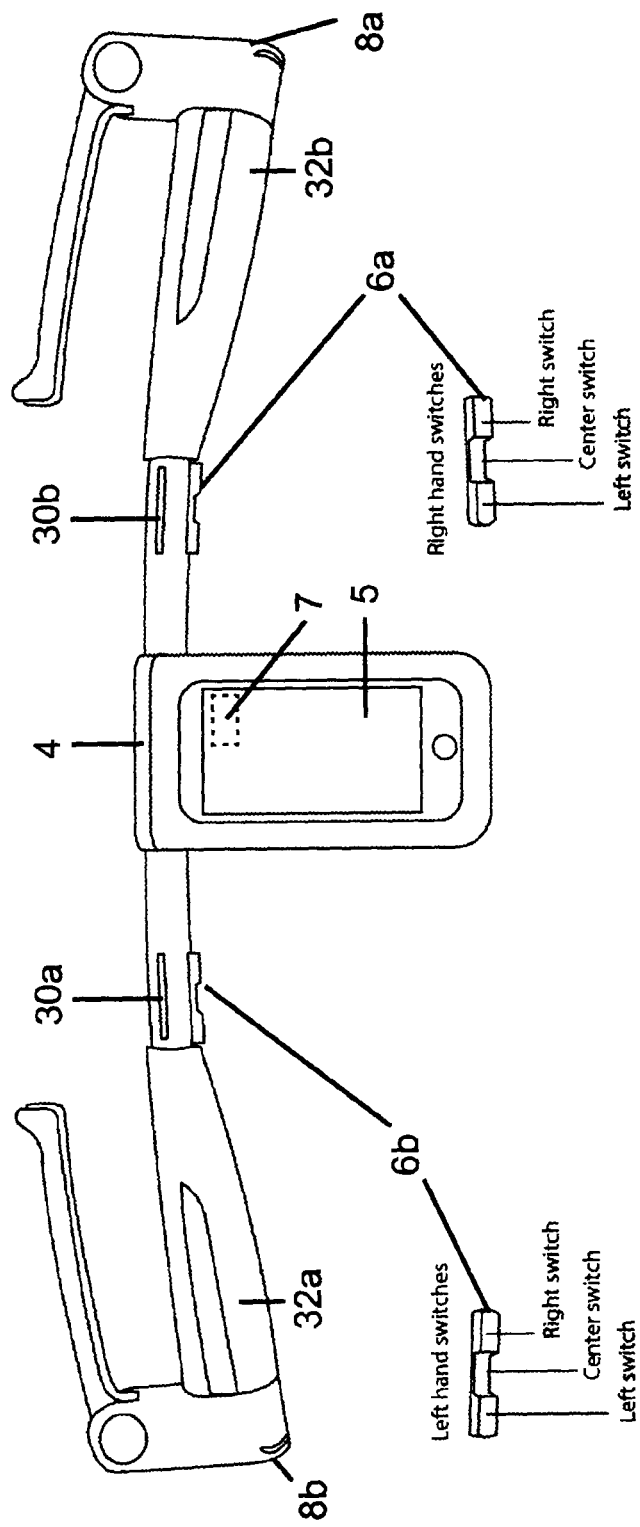
FIG. 3 shows a detailed view of an example of handlebars.

In an example, a bicycle system has been designed to enhance the user experience. The main interaction between user and bicycle occurs at the handlebar. Integrated into the handlebar is the docking station (4) for the user's electronic device (5). The electronic device (5), provides on-screen control and feedback information to the user, and contains such features as a CVT indicator (7), for example, which indicates the current gearing of the bike. The handlebar further comprises right (6a) and left (6b) switches to control bicycle system features such as the right (8a) and left (8b) turn signals, the horn, the projection lights, the launch of the Bike App, or for switching the transmission from manual to automatic and vice versa. An example is shown in FIG. 3.

There are provided Transmission Behavior and Handlebar Controls. CVT may be self-controlling with behavior inputs from the bike electronics. Handlebar switches may allow control of bike lighting, horn, transmission, and other functions. For navigation, an upcoming/current left turn indicator light (30a) may be provided. For navigation, an upcoming/current right turn indicator light (30b) may be provided. ("Indicator lights" are usually referred to as "turn signals" in US English). A Bike CVT Indicator (7) may be provided. Left hand switch (6b) may control a turn signal, a horn and a projection light. With the right switch, a single press may toggle a right turn signal on/off. With the right switch, a long press may toggle a projection light flashing function on/off. With a center switch, this may sound a horn as long as it is depressed. With a left switch, a single press may toggle a left turn signal on/off. With the left switch, a long press may toggle a projection light on/off. Haptic feedback in left hand grip (32a) may be provided for navigation turn indicators. Haptic feedback in right hand grip (32b) may be provided for navigation turn indicators. Haptic feedback may be provided on a corresponding side of a handlebar trigger as a turn approaches. Right hand switch (6a) may control transmission and bike app controls. A left switch may set transmission one selection softer (automatic) or down one gear (manual). A center switch, with a single press may switch between Automatic Transmission and Manual Transmission. A center switch, with a long press may launch a Bike app if not currently running a Bike app. A right switch may set transmission one selection harder (Automatic) or up one gear (Manual). Modes may be kept in App memory (bike should remember last setting). Switching between Automatic and Manual should aim to have a seamless ride style. App should launch in Automatic mode. Docking the bike may begin a registration check. After a smartphone is confirmed as valid, an ambient light sensor may turn on a projection light and NOP lights. An example is shown in FIG. 3.

Figure 4:
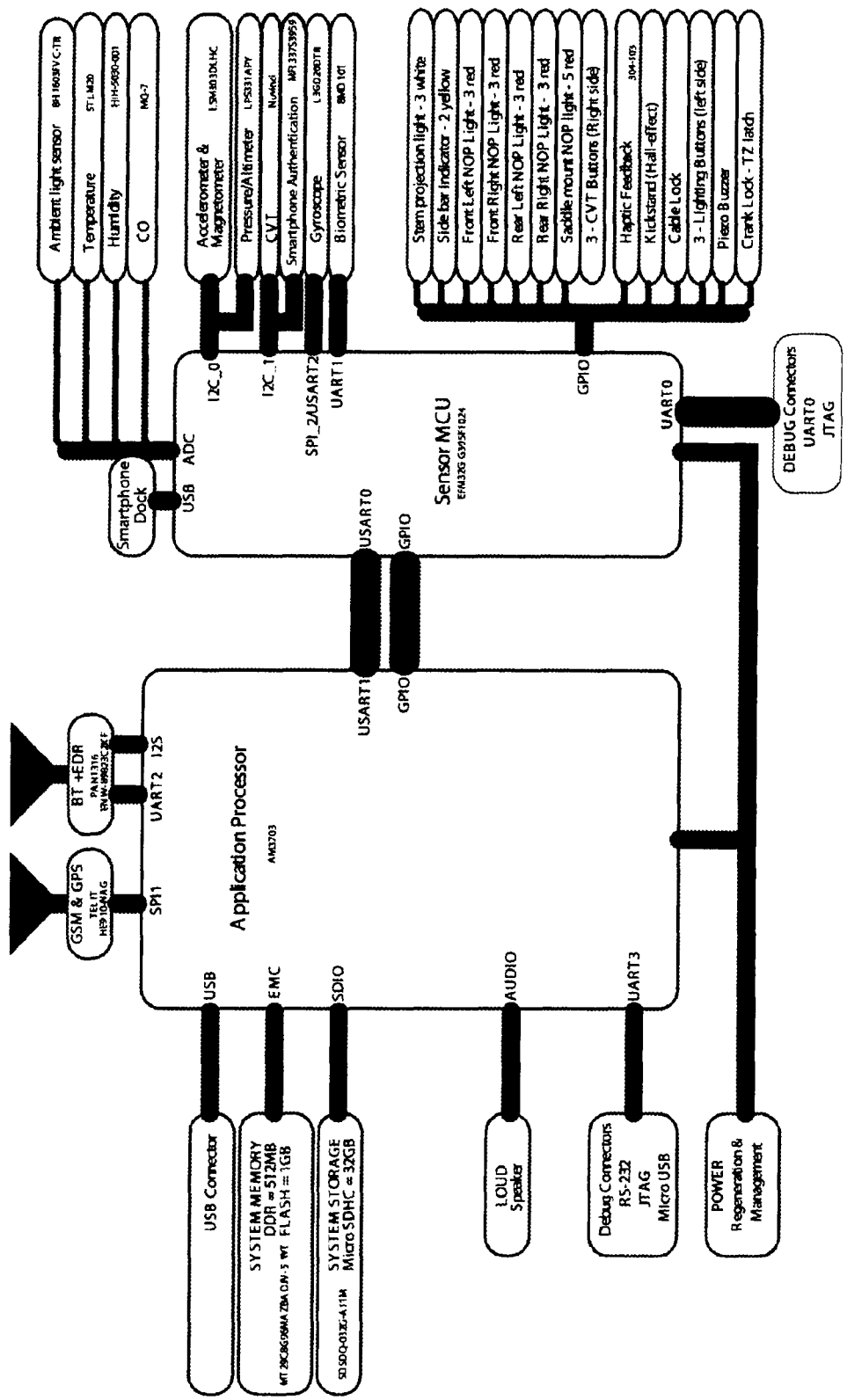
FIG. 4 shows an electronics system architecture.
Figure 5:
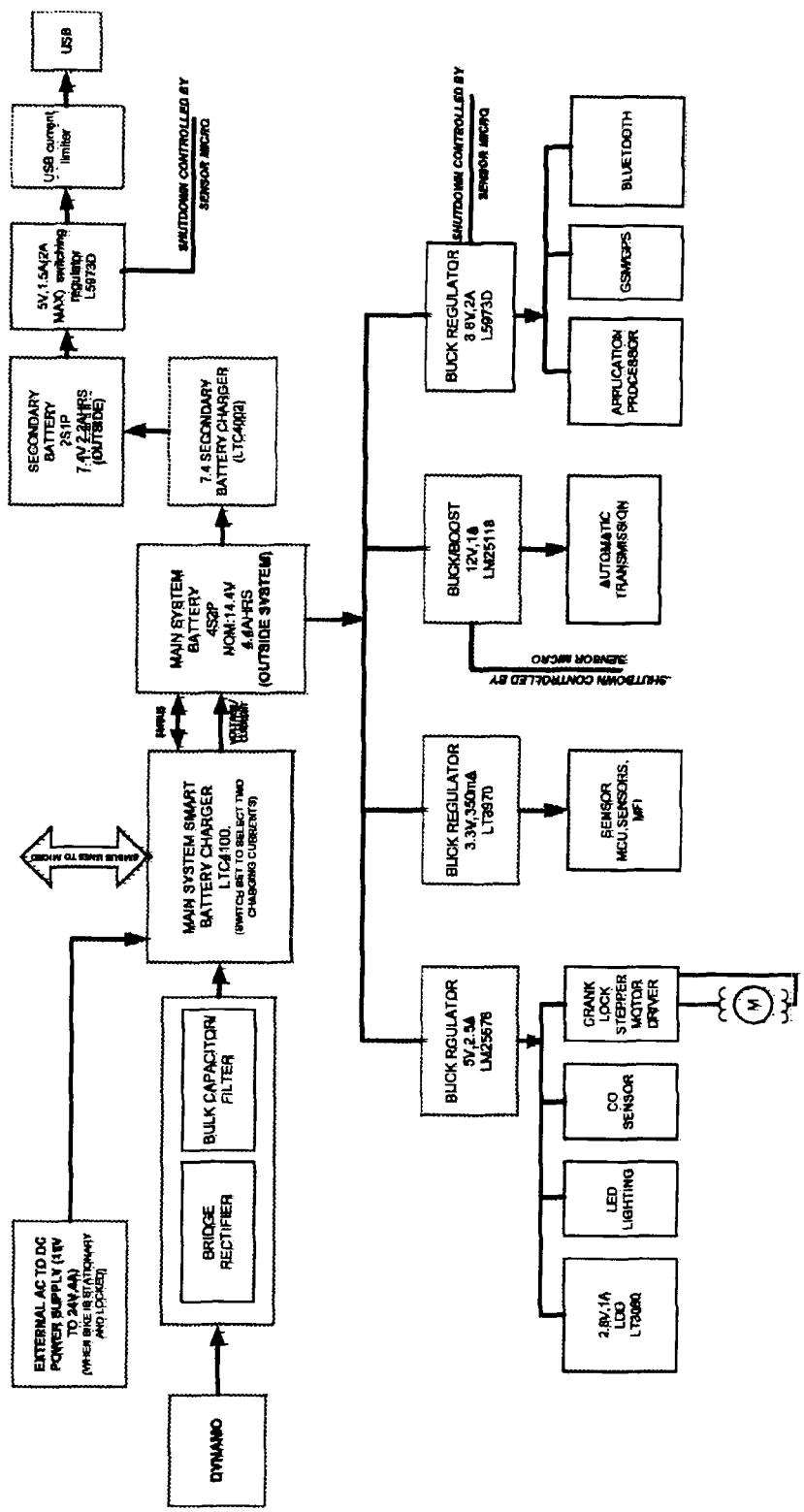
FIG. 5 shows an example of a power architecture for an embedded nervous system.

Turning to FIG. 4, an example of an electrical system for the bicycle system's nervous system is depicted. And FIG. 5 depicts an example of a corresponding power architecture. FIGS. 4 and 5 set forth an example of a manner and order in which the various components of the embedded software system interact in order for the user's commands to result in various programmed outputs.

In an example electrical system for a bicycle system, an application processor is in connection with GSM, GPS and Bluetooth+enhanced data rate (BT+EDR) antennae. The application processor is in connection with a USB Connector, system memory (including double data rate (DDR) and flash memory), system storage (including micro Secure Digital High Capacity (SDHC)), a loud speaker, debug connectors (including RS-232, Joint Test Action Group (JTAG) and micro USB). The application processor is in connection with a power regeneration and management function. The application processor is connected to a sensor microcontroller (MCU) via universal synchronous/asynchronous receiver/transmitter (USART) and General-purpose input/output (GPIO) interfaces. The sensor microcontroller (MCU) is in connection with debug connectors (including UART0 and JTAG). The sensor microcontroller (MCU) is in connection with a smartphone (eg. iphone) dock via a USB connection. The sensor microcontroller (MCU) is in connection via connections (eg. analogue to digital converters (ADC)) to an ambient light sensor, a temperature sensor, a humidity sensor and to a CO sensor. The sensor microcontroller (MCU) is in connection with an accelerometer and magnetometer, a pressure/altimeter, a CVT, a smartphone authentication, a gyroscope, and to a biometric sensor. The sensor microcontroller (MCU) is in connection with stem projection lights, side bar indicator lights, front left and front right NOP lights, rear left and rear right NOP lights, a saddle mount NOP light, CVT buttons, haptic feedback, a kickstand, a cable lock, lighting buttons, a piezo buzzer, and a crank lock. An example electrical system for a bicycle system is shown in FIG. 4.

In an example of a power architecture of a bicycle system, output from a dynamo of the bicycle system is passed through a bridge rectifier and a bulk capacitor to a main system smart battery charger which provides for example a single output 12V charging voltage. Alternatively, power from an external AC to DC power supply, 19V to 24 V, 4 A, may be provided to the system battery charger when the bicycle system is stationary and locked. Output from the system battery charger is fed to the main system battery, eg. at 12V or at 16.8V. Main system battery output may be used at 7.4V for charging a secondary battery, which may store 2.2 Ahrs charge at 7.4V for supplying 5V, 1.5 A (2 A maximum) for a USB charging port via a USB current limiter. Main system battery output may provide output at 5V, 2.5 A (regulator) for powering a CO sensor, a LED lighting supply, or a crank lock stepper motor driver. Main system battery output may be used at 3.3V, 350 mA (regulator) for powering a sensor MCU, or sensors. Main system battery output may be used at 12V, 1 A for powering an automatic transmission. Main system battery output may be used at 3.8V, 2 A (regulator) to power a GSM/GPS unit, a Bluetooth interface and an application processor. An example of a power architecture of a bicycle system is shown in FIG. 5.

Figure 6A:
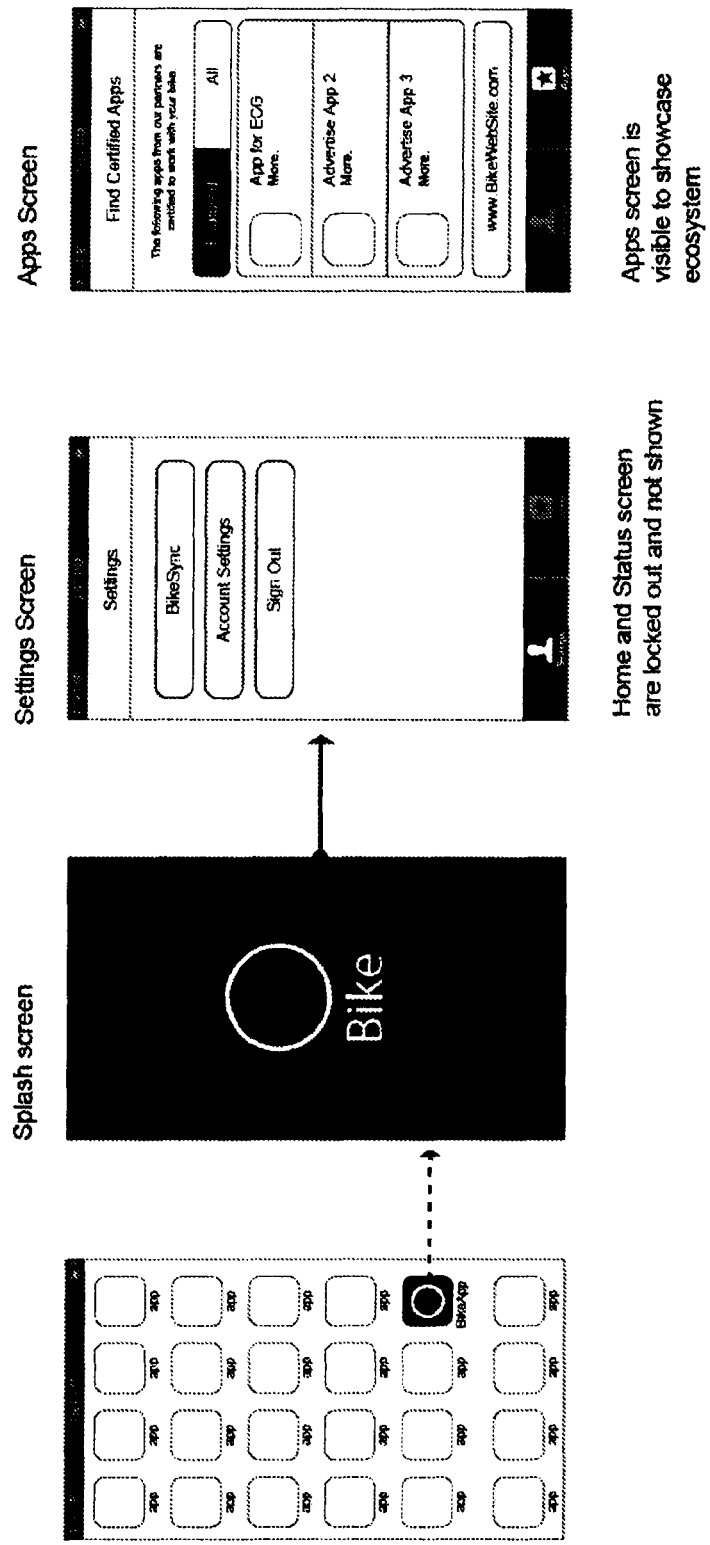
FIGS. 6a (a) and 6a (b) show software flowcharts that depict a process for registering a bicycle to a device.
Figure 6A:
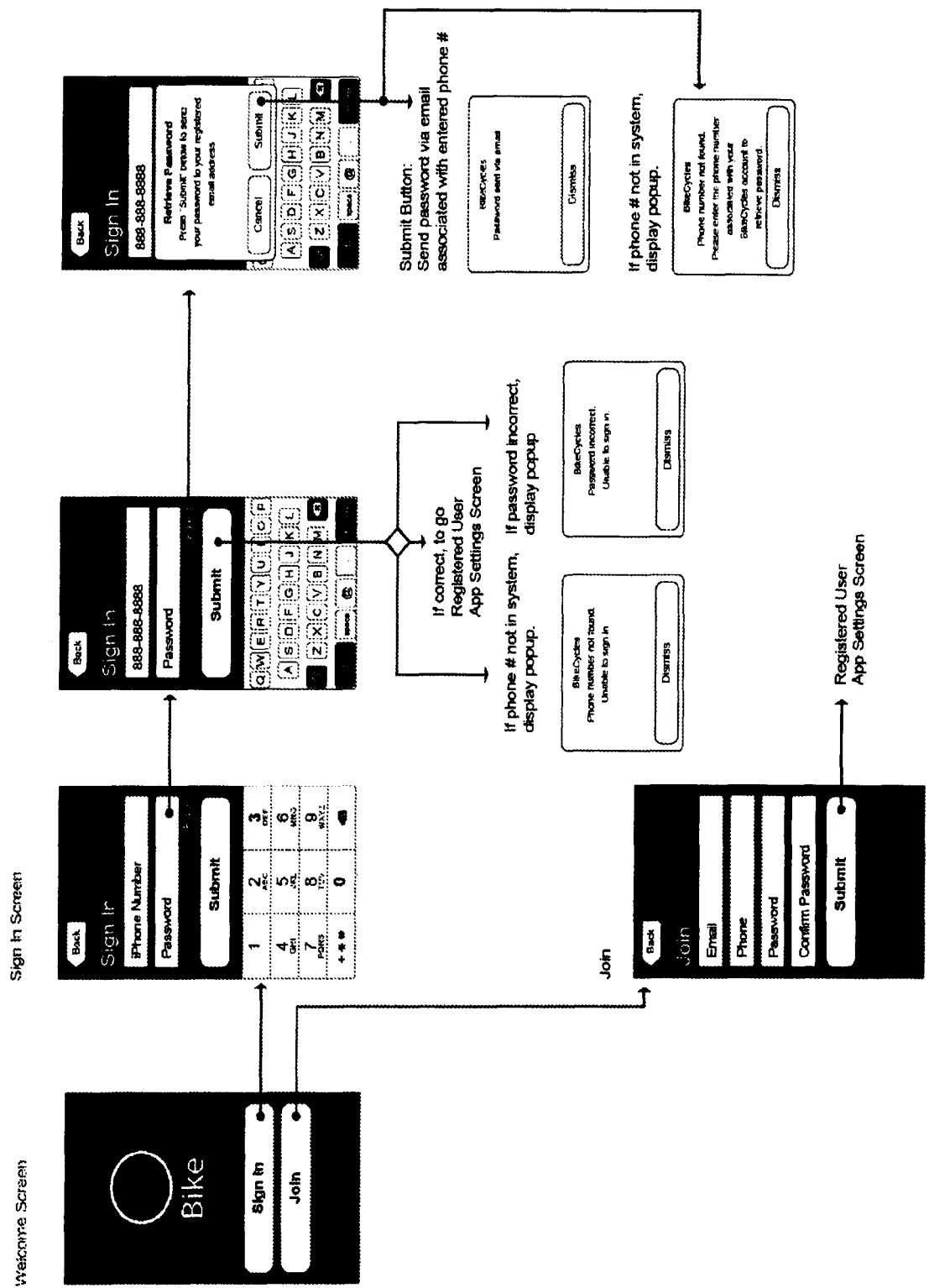
Figure 8:
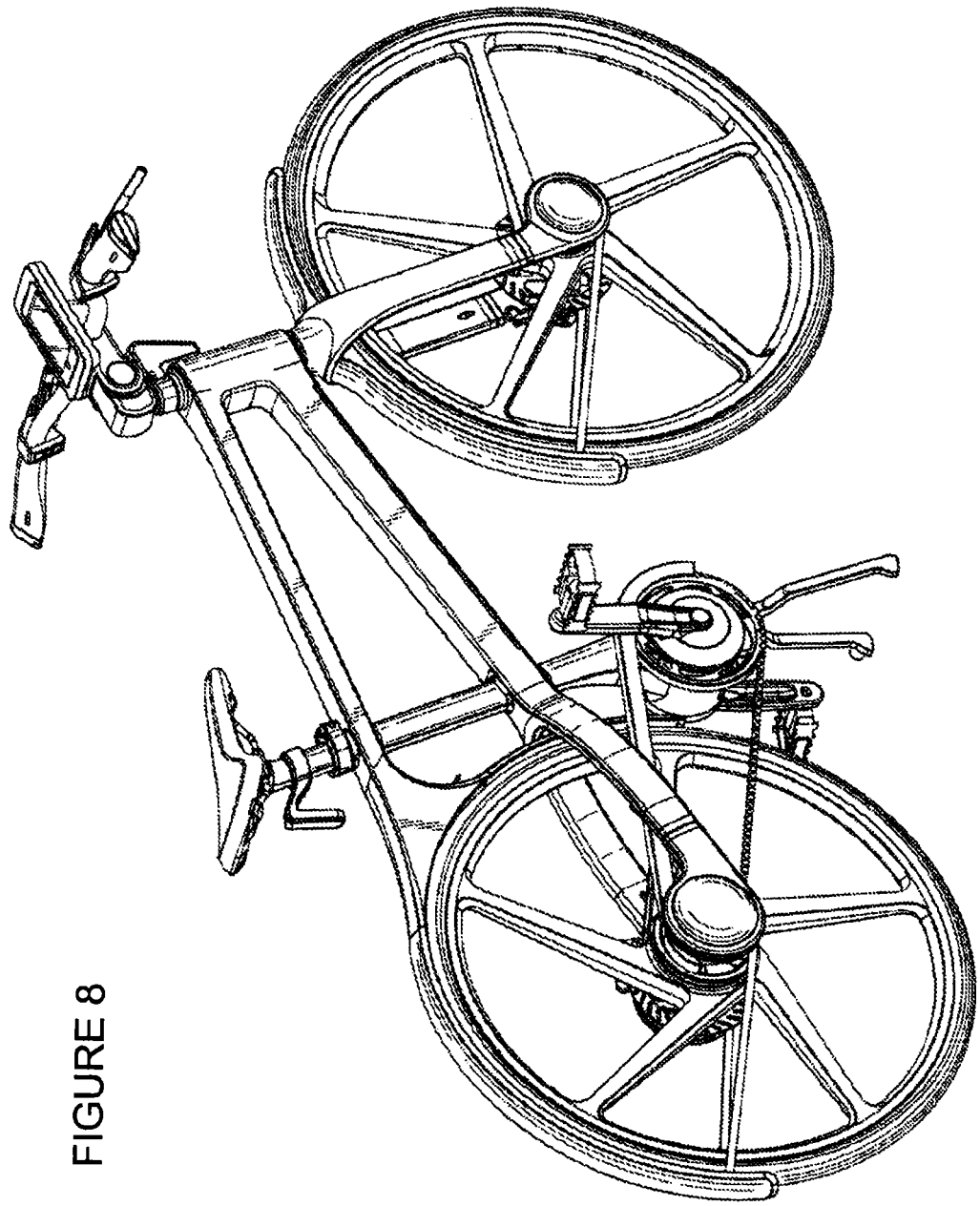
FIG. 8 shows a rear perspective view of the right side of a bicycle system having a kickstand and docking station.
Figure 9:
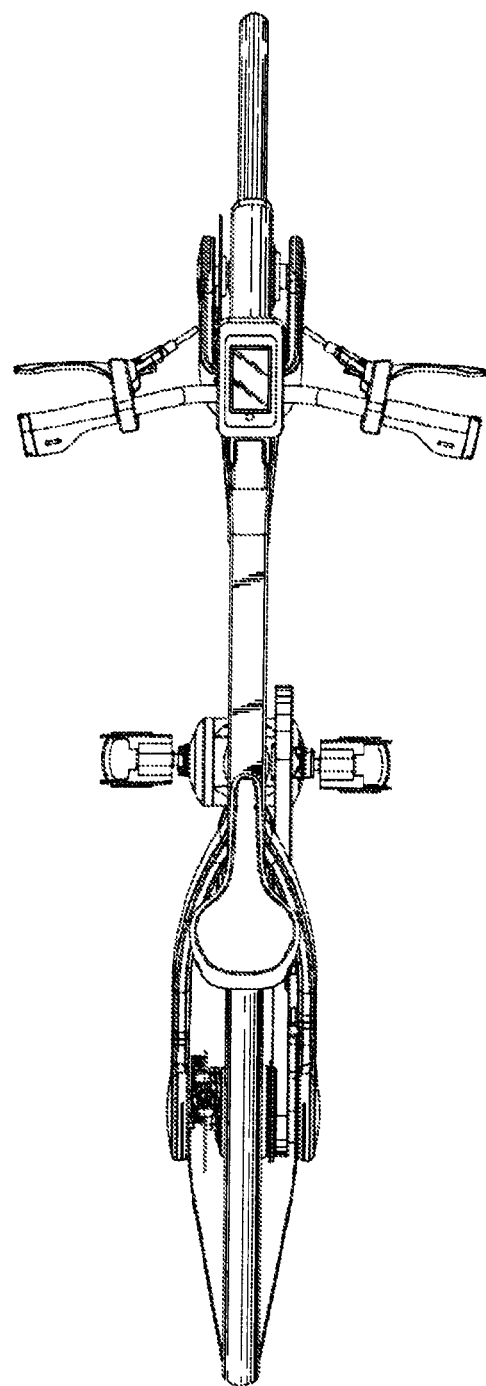
FIG. 9 shows a top plan view of a bicycle system having a kickstand and docking station.
Figure 10:
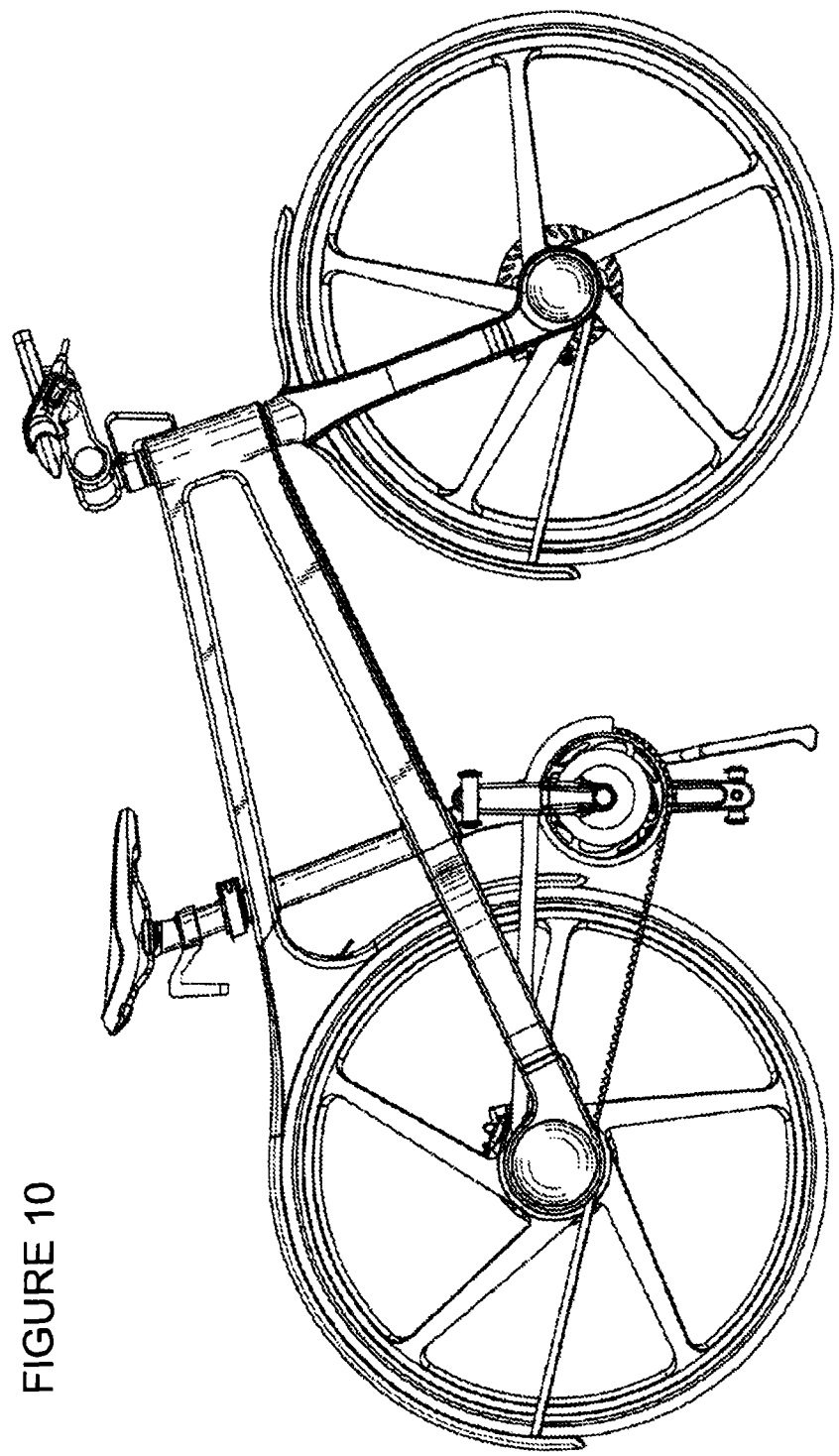
FIG. 10 shows a right side elevation view of a bicycle system having a kickstand and docking station.
Figure 12:
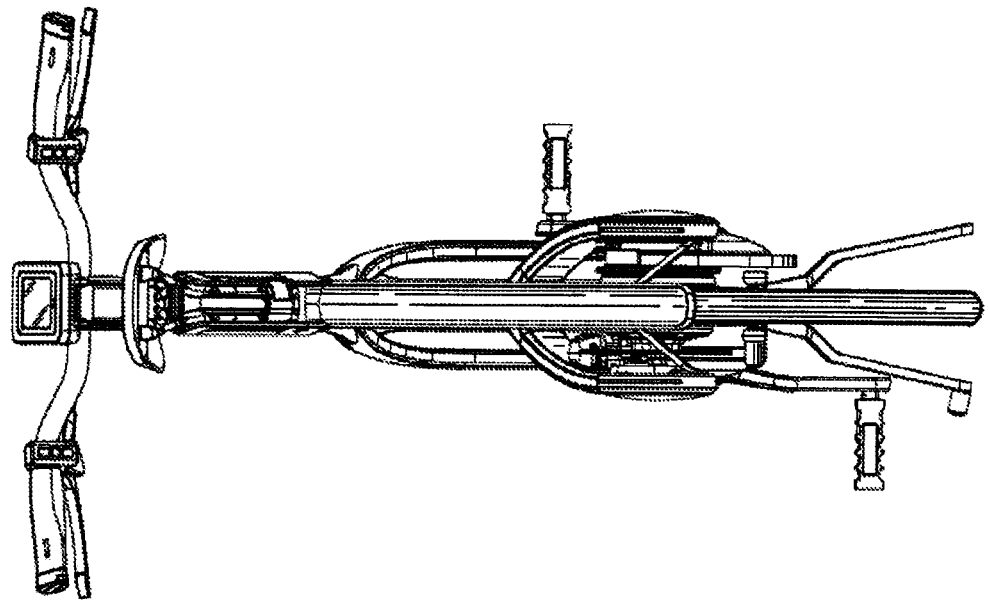
FIG. 12 shows a rear elevation view of a bicycle system having a kickstand and docking station.
Figure 11:
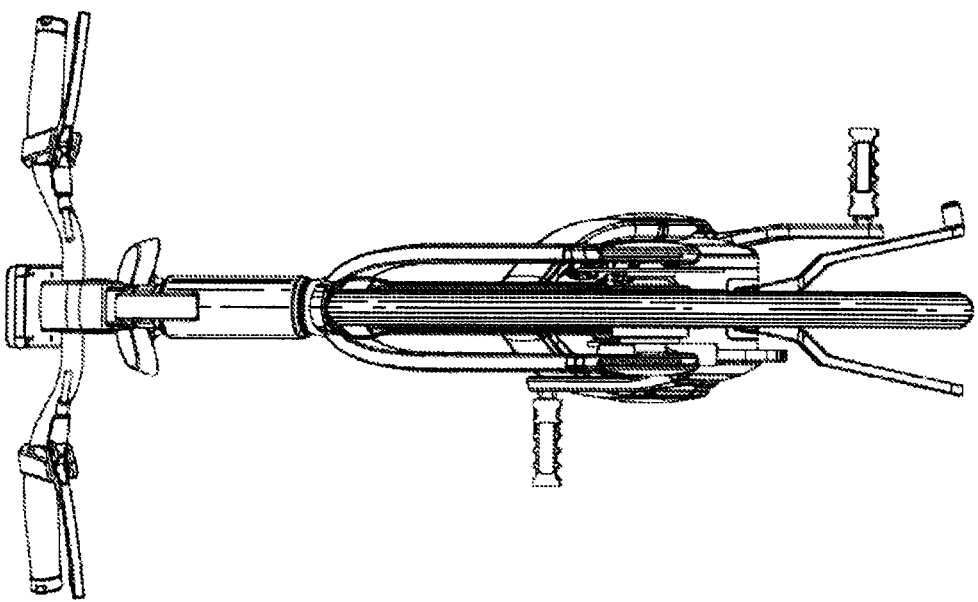
FIG. 11 shows a front elevation view of a bicycle system having a kickstand and docking station.
Figure 13:
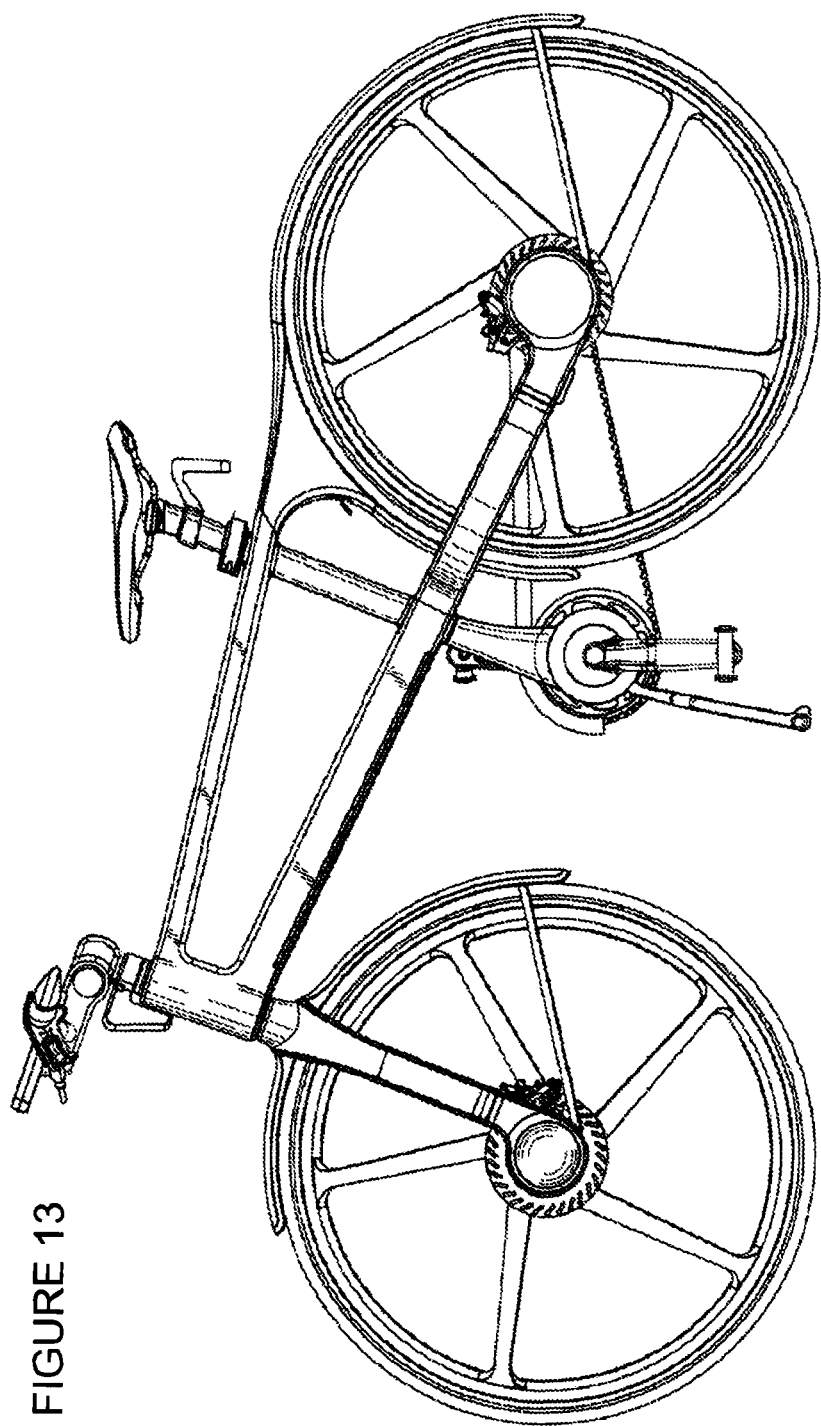
FIG. 13 shows a left side elevation view of a bicycle system having a kickstand and docking station.
Figure 14:
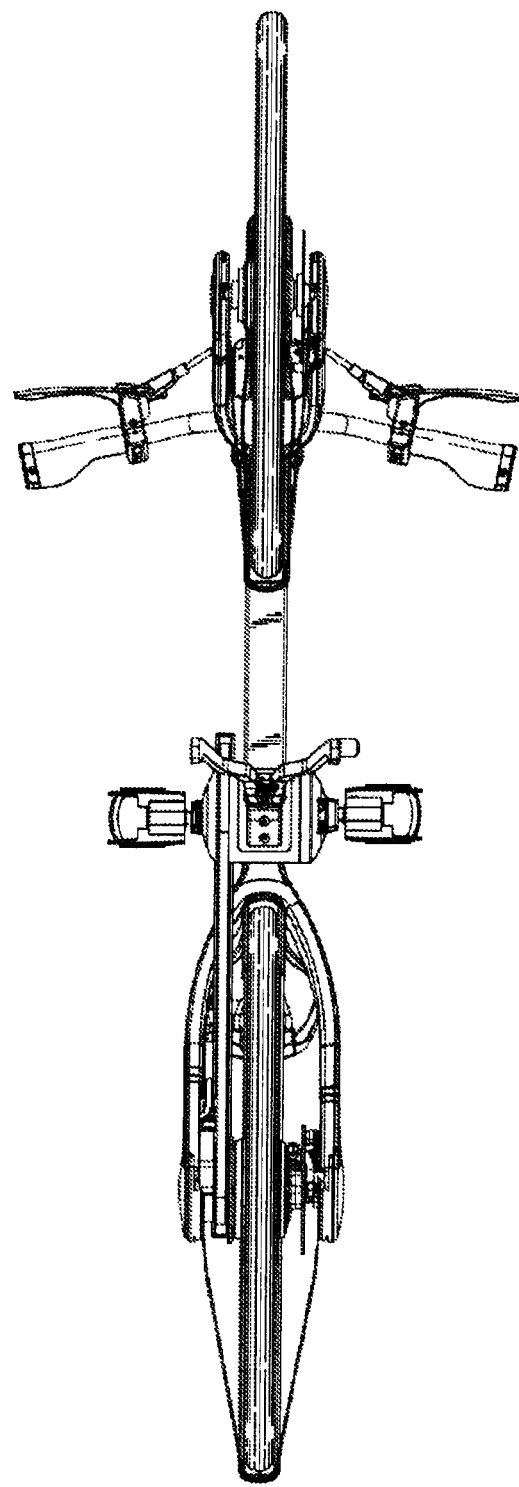
FIG. 14 shows a bottom plan view of a bicycle system having a kickstand and docking station.
Figure 15:
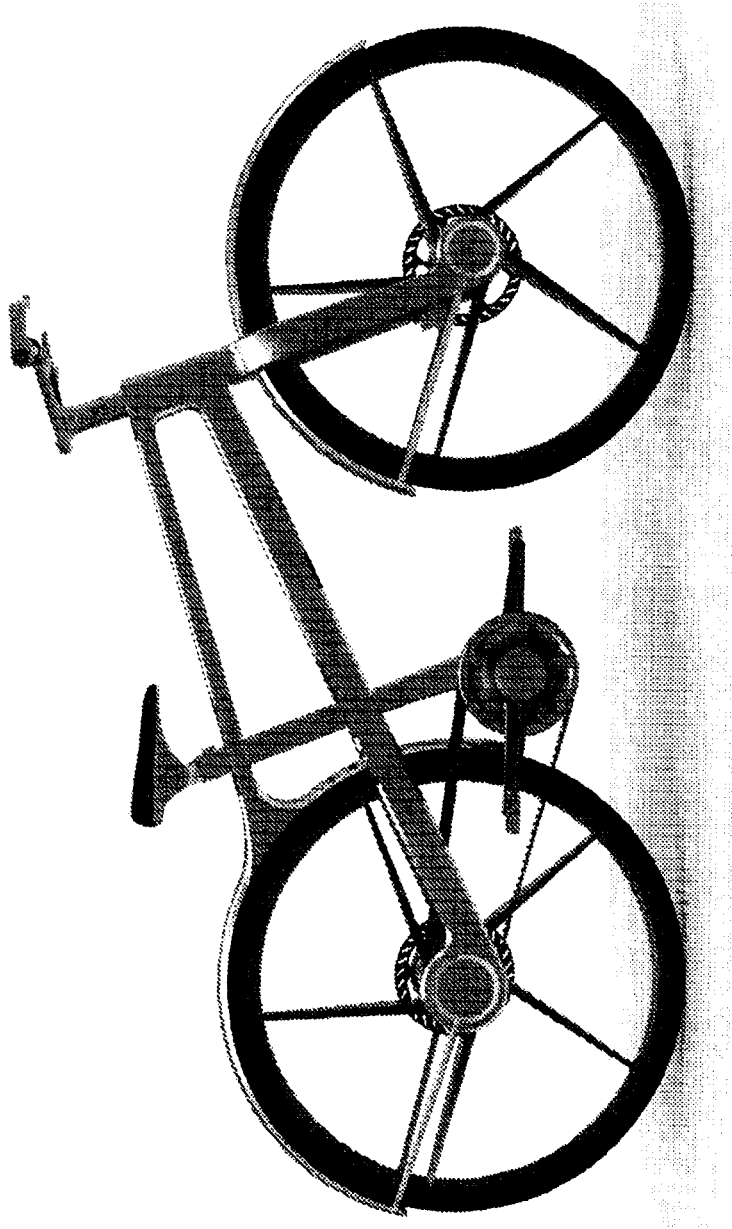
FIG. 15 shows a right side view of a bicycle system having a docking station.
Figure 16:
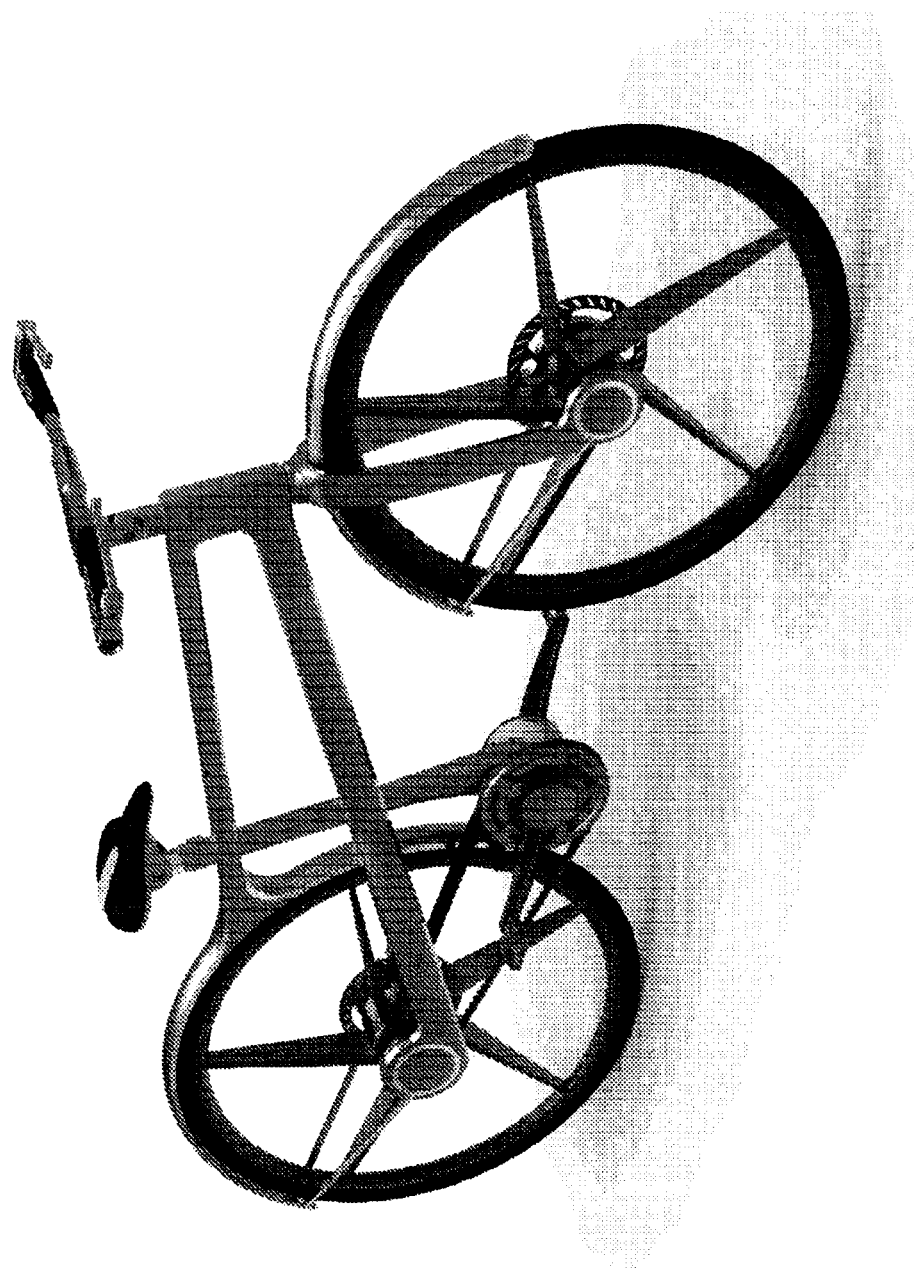
FIG. 16 shows a front perspective view of the right side of a bicycle system having a docking station.

FIGS. 6a (a), 6a (b), 6b (a) and 6b (b) are software flowcharts, depicting examples of a step-by-step process for registering an unrecognized device in order to gain access to the bicycle (FIGS. 6a (a), 6a (b)) and starting-up the bicycle with a previously-registered device (FIGS. 6b (a) and 6b (b)). FIGS. 6b (a) and 6b (b) further depict the appearance of the 'Warning Screen', the 'Bike Stopped' screen, and the 'Bike in Motion' screen.

There is provided a server which provides smartphone applications for download. Users may register at the server and obtain an account linked to their smartphone. Users may register at the server and obtain an account linked to their bicycle system. Users registered at the server may link their account to a smartphone and to a bicycle system.

A user with an account which is linked to a smartphone, but which is not linked to a bicycle system, may download an app from the server which is an app for use with a bicycle system. A user with an account which is linked to a smartphone, but which is not linked to a bicycle system may download an app from the server which is an app for use with a bicycle system and run the app on their smartphone. Running such an app may provide a splash screen, followed by a settings screen. On the smartphone, the app may not display a Home screen or a Status screen, because the user does not have a bicycle system linked to their account. The server may provide a screen to a user with an account which is linked to a smartphone, but which is not linked to a bicycle system, which lists Apps available for use with a bicycle system; this may showcase the Apps available for use with a bicycle system. A related example is shown in FIG. 6a (a).

A user with an account which is linked to a smartphone, and which is not linked to a bicycle system, may download an app from the server which is an app for use with a bicycle system. A user with an account which is linked to a smartphone, and which is not linked to a bicycle system may download an app from the server which is an app for use with a bicycle system and run the app on their smartphone while it is docked with a bicycle system. Running such an app may provide a Welcome Screen. The Welcome Screen may provide the options to Sign In or to Join. A Sign In option may allow a user to sign in to their registered account at the server, such as by providing a username and a password, or by providing a phone number and a password. After signing in, a user may be provided with a registered user App settings screen. A Join option may allow a user to confirm that their particular bicycle system with its own unique ID is the particular bicycle system which should be linked with the account registered at the server. A user may Join by providing their email, phone, password, and confirm the password. The App may then provide the user with a registered user App settings screen. A related example is shown in FIG. 6a (b).

A user with an account which is linked to a smartphone, and which is linked to a bicycle system, may download an app from the server which is an app for use with a bicycle system. A user with an account which is linked to a smartphone, and which is linked to a bicycle system may download an app from the server which is an app for use with a bicycle system and run the app on their smartphone. A user with an account which is linked to a smartphone, and which is linked to a bicycle system, may view bicycle system data, or access or unlock a docked bicycle system, while in connection with the server. When a user with an account which is linked to a smartphone, and which is linked to a bicycle system, runs the app on their smartphone, in a first stage, the app may check that the user is a registered user. In a second stage, the app may check on the type of registered user, such as a guest with bicycle system privileges, or as a fully registered owner. If a user is a guest with bicycle system privileges, the App may check if the smartphone is docked in a bicycle system. If it is not docked, a Home screen may be provided on which it is noted that the phone is not docked with a bicycle system. If it is docked, a warning screen may be displayed which warns that the user to travel safely. If a user is a fully registered owner of a bicycle system, then the App may check if the smartphone is docked in a bicycle system. If it is not docked, a Home screen may be provided on which it is noted that the phone is not docked with a bicycle system. If it is docked, the App may proceed to display information such as that the phone is docked with the bicycle system, or the current speed of the bicycle system. Related examples are shown in FIGS. 6b (a) and 6b (b).

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the solutions described herein without departing from the spirit and scope of the solutions.

There is provided a bicycle system comprising: a bicycle frame further comprising an adjustable seat and an adjustable handlebar; an electronic device docking system integrated within said handlebar; front and rear hub caps capable of supporting an array of accessories integrated within said bicycle frame; electronics integrated within said bicycle frame wherein said electronics are powered by a battery and support features of the bicycle system; and a lock integrated into a bottom bracket of said bicycle frame.

The bicycle system may further comprise an integrated energy generation, storage, and charging system.

The bicycle system may further comprise a rear hub-integrated continuously variable transmission with nano-tech-coated sprocket and pulley profiles.

The bicycle system may further comprise a carbon fiber belt. The bicycle system may further comprise a handlebar-integrated user interface. The bicycle system may further comprise a fully-integrated notice-of-presence lighting system. The bicycle system may further comprise a theft deterrence system. The bicycle system may further comprise a bolted lock integrated into said bottom bracket. The bicycle system may further comprise a frame-integrated retractable security cable.

The bicycle system may be one wherein said electronic device is a mobile phone, smart mobile phone, or other similar personal digital assistant.

The bicycle system may be one wherein the electronic device sends and receives signals.

The bicycle system may be one wherein the electronics further comprises a user interface, an application processor, and a sensor processor.

The bicycle system may be one wherein the application processor controls various features.

There is provided a bicycle system including a lock for linking an electronic device to an item, comprising the item to be locked or unlocked, an electronic device, and a locking mechanism wherein the locking mechanism is linked to the electronic device.

The lock may be one wherein a locking mechanism further comprises a support bracket and a moveable clamp.

The lock may be one wherein the moveable clamp is spring-loaded and said support bracket is mounted to the item to be locked.

The lock may be one wherein the lock receives a signal from the electronic device to lock or unlock the item.

There is provided a method to electronically control a bicycle system comprising the steps of linking an electronic device to a bicycle system to enable the smart features of a bicycle system.

The method may be one wherein the steps include placing an electronic device into a docking system, sending signals from the docking system to the various bicycle system components, and the components responding with pre-programmed output.

The disclosure of FIGS. 7 to 14 includes an ornamental design for a bicycle frame, including the wheels, kickstand, and docking station as shown. FIGS. 7 to 14 provide an example of a bicycle system.

INTRODUCTION

In an example, there is provided a bike consumers will instantly recognize as the one they've always wanted. In an example, there is provided a bicycle system which is the world's first bicycle system specifically created to extend and enhance the smartphone lifestyle. It may seamlessly integrate a smartphone with an elegant, innovative design to deliver a peerless balance of form and function-one we strongly believe will resonate with existing and future smartphone consumers alike. Examples are shown in FIGS. 7 to 16.

In an example, the bicycle system begins with general consumer expectations of what a bicycle "is" and then decidedly exceeds those expectations through its calculated fusion of performance, technology, ergonomics, dependability, safety, and aesthetics. In an example, the bicycle system propels cycling's evolution from its sporting/utilitarian roots to the vanguard of urban mobility. It signals "discreetly premium" and denotes "professional-grade" and "precision instrument"-all while providing a ride unmatched for style, comfort, safety, and security.

To deliver on this vision, we developed an example key-feature set specifically devised to ensure the project maintained its consumer-driven focus. Here we walk you through each of these key features, providing detailed insight into the deliberate and thorough nature of each feature's development and its contribution to the whole. We hope you find the following both informative and enjoyable.

Features

In an example, the bicycle system is a sophisticated, smartphone-enhanced urban bicycle.

In an example, the bicycle system's sophistication derives from combining a smartphone with a host of features specifically devised to deliver an unprecedented user experience.

Connectivity

In an example, the bicycle system seamlessly connects with any authenticated smartphone eg. an iPhone™ 4 or 5 device running iOS 6.x or a later version, in a number of innovative ways.

SpringPort™

In an example, SpringPort—the bicycle system's primary mechanism of accomplishing Device-to-bike connectivity—is an elegant, handlebar-integrated docking station. It envelops "SpringPorted" Devices within the IP65-rated, moisture, dust, and vibration free environment created by a machined aluminum body with Lexan® optical grade, touch-compliant cover and silicone seals. (The IP Code, International Protection Marking, IEC standard 60529, sometimes interpreted as Ingress Protection Marking, classifies and rates the degree of protection provided against the intrusion (including body parts such as hands and fingers), dust, accidental contact, and water by mechanical casings and electrical enclosures. It is published by the International Electrotechnical Commission (IEC)).

In an example, the bicycle system ships with interchangeable trays (eg. polycarbonate trays) that allow users to easily adapt SpringPort for use with current Device models. Moreover, in an example, tray designs are readily updatable to maintain compatibility with future smartphone device form factors. In an example, "SpringPorting" a smartphone Device is effortless, and once completed, prompts a series of auto-executed tasks, examples of which include:

Discovering the Device's unique identifying code.
Connecting the Device to the bicycle system's "nervous system".
Deactivating the bicycle system's theft deterrence system.
Launching the bicycle system's companion smartphone application.
Determining the Device's battery state and initiating charging if required.

Figure 17:
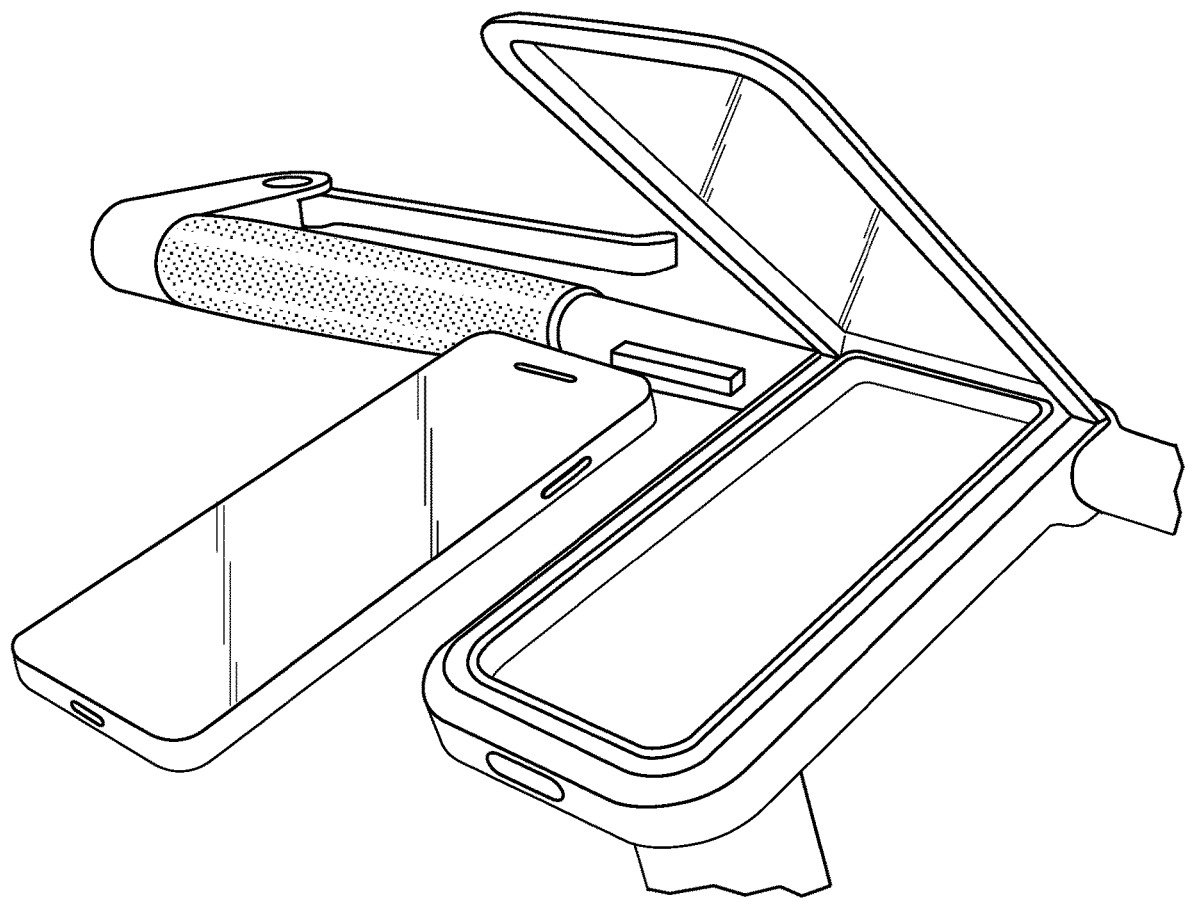
FIG. 17 and FIG. 18 show an example of a handlebar-integrated docking station receiving a smartphone for docking with a bicycle system.
Figure 18:
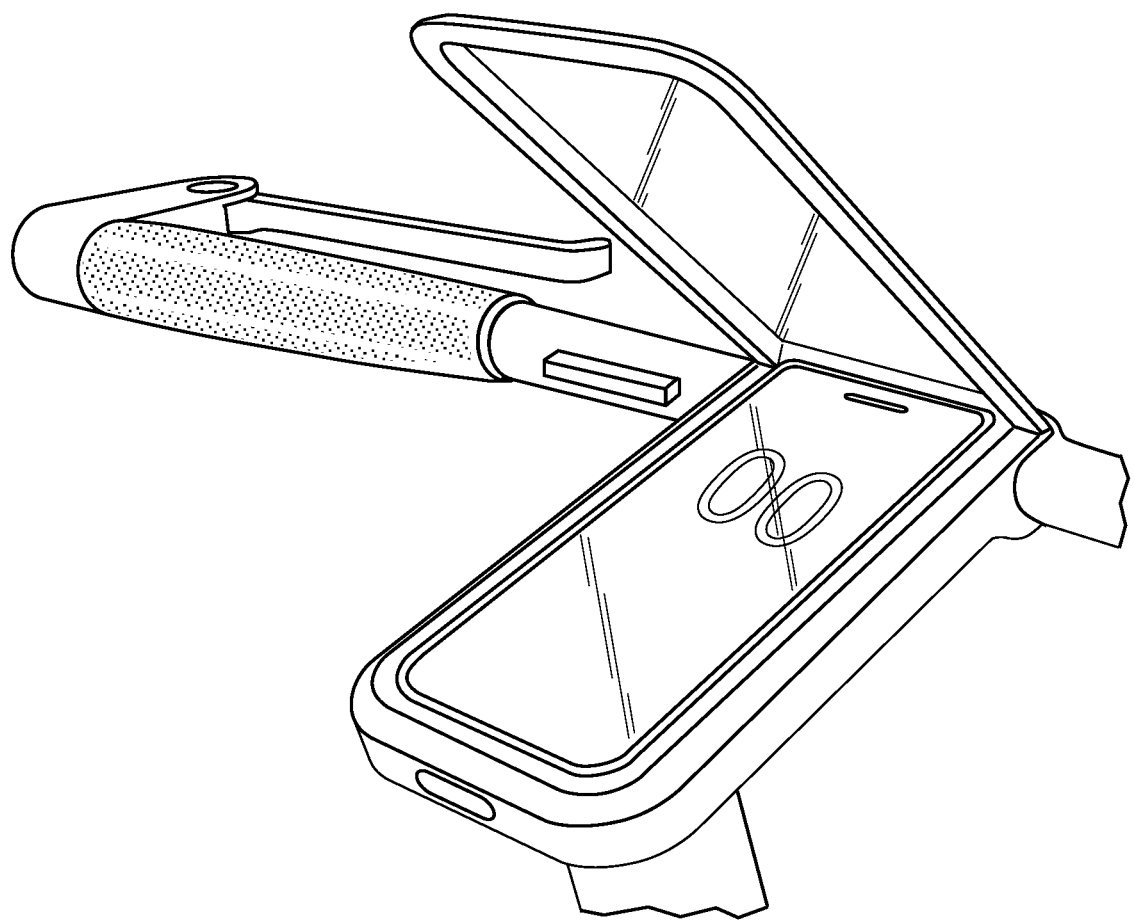

FIG. 17 and FIG. 18 show an example of a handlebar-integrated docking station receiving a smartphone for docking with a bicycle system.

SpringSmart™

In an example, once "SpringPorted", a Device gains access to SpringSmart, the bicycle system's frame-embedded nervous system. SpringSmart elements may include:
Processor (e.g. ARM CPU running MFi authentication)
Transceiver module (eg. including BTLE, GSM, GPRS, EDGE, UMTS, GPS, and HSPA+)
Powered, multiband antenna
Micro-SDHC system memory
Rider-accessible flash memory SpringSmart may also incorporate SpringSense™, an advanced sensor array providing a range of ambient data, including e.g. carbon monoxide, temperature, humidity, light, and noise levels, as well as physical data, such as heading, velocity, acceleration, and orientation.

Figure 19:
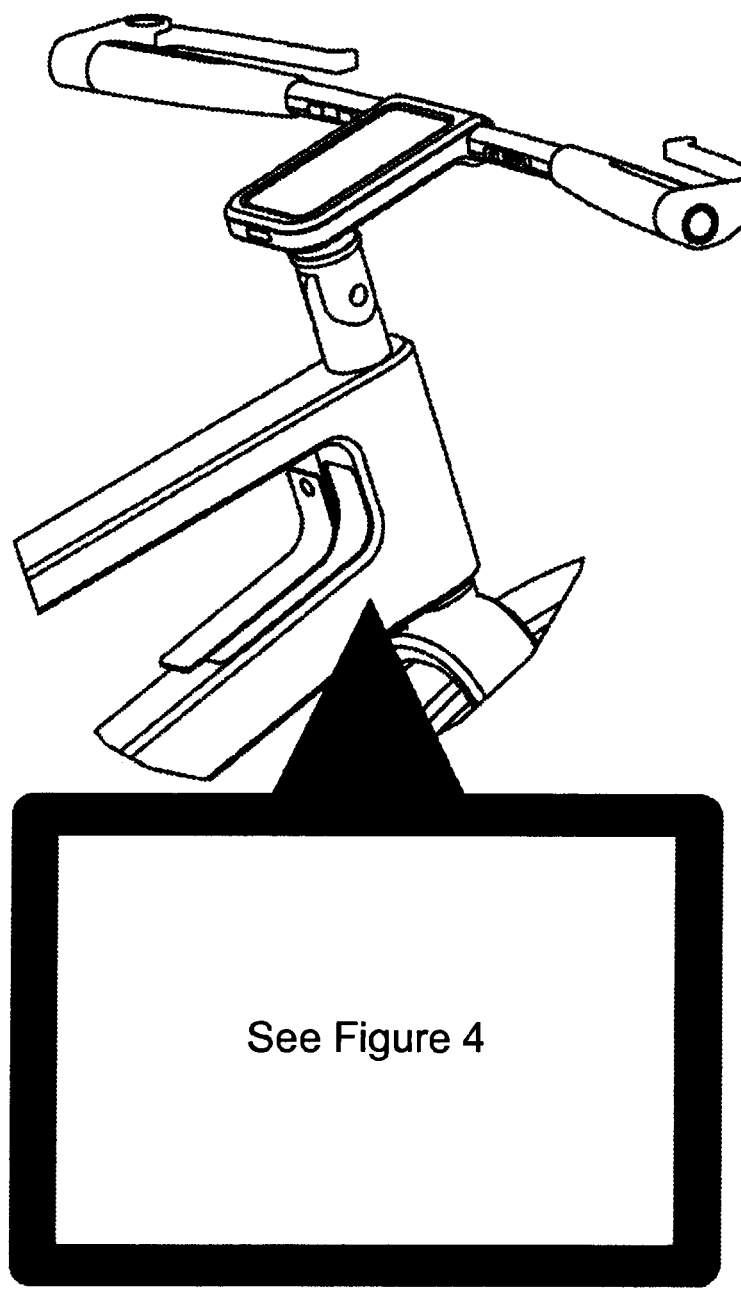
FIG. 19 shows schematically that an electronics system architecture of FIG. 4 forms an integral part of a bicycle system.

In an example, the bicycle system achieves an ultra-low power budget due, primarily, to SpringSmart's robust systems management capabilities. SpringSmart safeguards its sensors, allowing application access only to the extent needed, thus permitting the balance to remain dormant. In an example, SpringSmart also powers its antennas only to the precise degree required by active applications. An example is shown in FIG. 19, which shows schematically that an electronics system architecture of FIG. 4 forms an integral part of a bicycle system.

SpringApp™

In an example, SpringApp is the bicycle system's companion smartphone application. Following download, in an example, its Sync feature allows new users to couple a specific Device to a specific bicycle system. After syncing, users gain access to the full SpringApp feature set, which may include:

Sync
Device pairing to additional bikes/unpairing from a specific bike.
Share
Customizable, eco-friendly bicycle system sharing with guest users, enabling a primary user to retain admin level control over security features while managing the type of access guest users are granted.
Find
Cycling-centric, turn-by-turn navigation ("TBTN").
Lost/stolen bicycle system tracking.
Remote theft alarm activation.
Status
Access to data concerning the state of key components and recommendations to users concerning the maintenance of each request for remote assistance with bicycle system systems issues.

Examples of bicycle system SpringApp Features

Figures 20A, 20B, 20C, 20D:
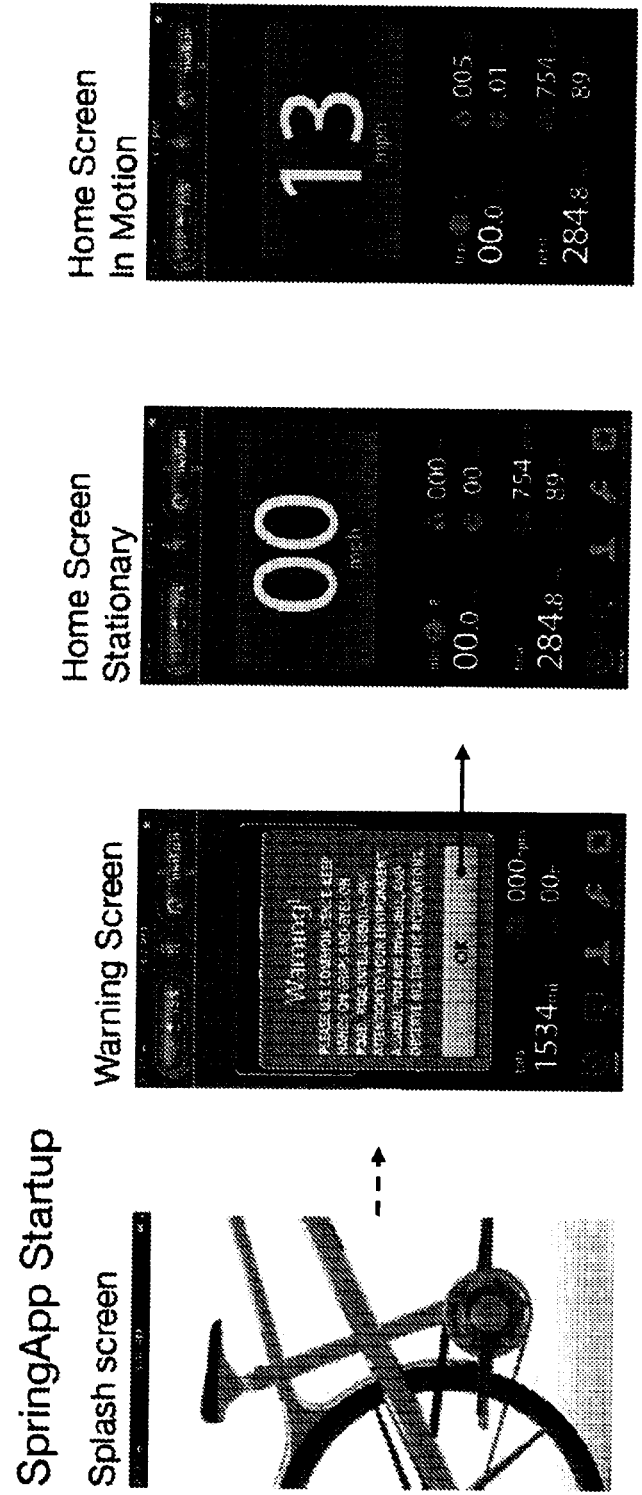
FIG. 20a shows an App for a bicycle system displaying a splash screen.
FIG. 20b shows an App for a bicycle system displaying a warning screen.
FIG. 20c shows an App for a bicycle system displaying a Home Screen.
FIG. 20d shows an App for a bicycle system displaying a different Home Screen if the bicycle system is in motion.
Figure 21:
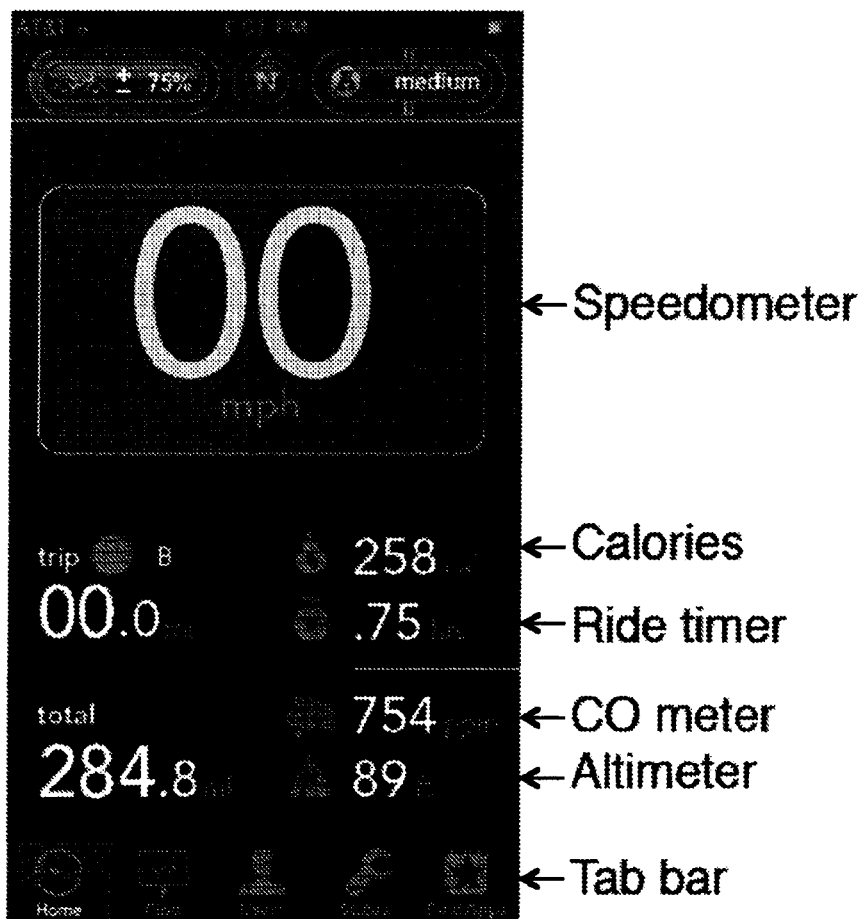
FIG. 21 shows an App for a bicycle system displaying a Home Screen.
Figure 22B:
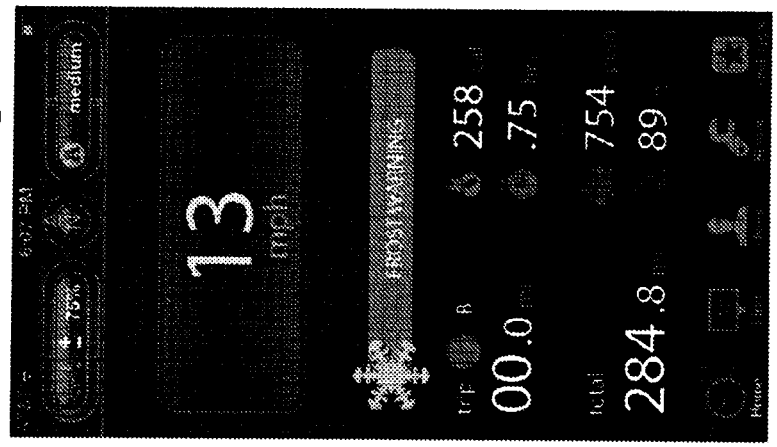
FIG. 22b shows an App for a bicycle system displaying a frost warning.
Figure 22A:
FIG. 22a shows an App for a bicycle system displaying a frost alert.
Figure 25:
FIG. 25 shows an SMS alert relating to the bicycle system which is provided to the user of a smartphone associated with the bicycle system.
Figure 24:
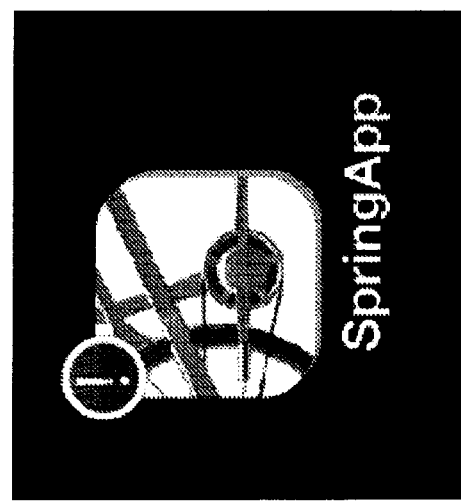
FIG. 24 shows an App for a bicycle system displaying an alert using a modified version of a smartphone icon associated with the App.
Figure 26:
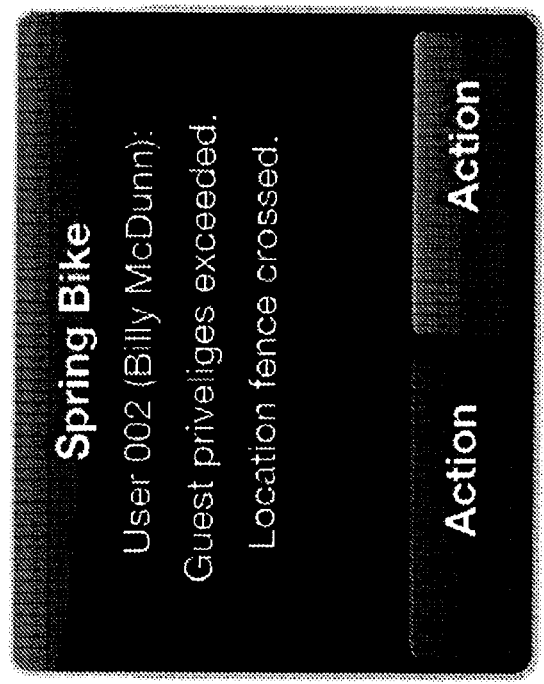
FIG. 26 shows an App Notification relating to the bicycle system which is provided to the user of a smartphone associated with the bicycle system.

When an App for a bicycle system starts to run on a smartphone docked with the bicycle system, the App may begin by displaying a splash screen. An example is shown in FIG. 20*a*. The App may display a warning screen, asking the user to travel safely on the bicycle system. An example is shown in FIG. 20*b*. A Home Screen may be displayed if the bicycle system is stationary. An example is shown in FIG. 20*c*. A different Home Screen may be displayed if the bicycle system is in motion. An example is shown in FIG. 20*d*. A Home Screen may display one or more of a speedometer, calories calculated to have been burned by a user of the bicycle system, a ride timer, a CO meter reading, an altimeter reading and a Tab bar. An example is shown in FIG. 21. The App may display a frost alert. An example is shown in FIG. 22*a*. The App may display a frost warning, which may be displayed until frost conditions have cleared. An example is shown in FIG. 22*b*. The App may display a CO Warning. An example is shown in FIG. 23*a*. The App may display a CO Alert. The CO Alert may have a coloured background eg. an orange background. An example is shown in FIG. 23*b*. The App may display a CO Timer which may indicate that a CO Warning has persisted beyond a predefined time interval. The CO Timer may have a coloured background eg. a red background. An example is shown in FIG. 23*c*. The App may display dual warnings eg. a CO Warning and a Frost Warning. An example is shown in FIG. 23*d*. The App may display an alert using a modified version of a smartphone icon associated with the App. An example is shown in FIG. 24. An SMS alert relating to the bicycle system may be provided to the user of a smartphone associated with the bicycle system. The SMS alert may identify the bicycle system and include some SMS message text. An example is shown in FIG. 25. An App Notification relating to the bicycle system may be provided to the user of a smartphone associated with the bicycle system. The App Notification may identify the bicycle system and include some text. An example is shown in FIG. 26. A Home Screen may provide Tab bar alerts. An example is shown in FIG. 27*a*. An App Find Screen may provide a notification list of notifications relating to the bicycle system with which the smartphone running the App is associated. An example is shown in FIG. 27*b*. A status screen may be provided by the App which lists maintenance-related notifications. An example is shown in FIG. 27*c*.

Made for the Bicycle System

Third party developers may be provided an SDK (software development kit) for designing bicycle system-ready applications in addition to SpringApp. A flourishing application market may enhance user experience and serve to further expand smartphones to new markets via an entirely unexpected path. Applications certified as "Made for "bicycle system C"" (or, "MfC"), may be published on the bicycle system's "Application Marketplace" site and on SpringApp, with summaries and reviews, and the ability for users to download applications directly from the two locations.

Figure 28:
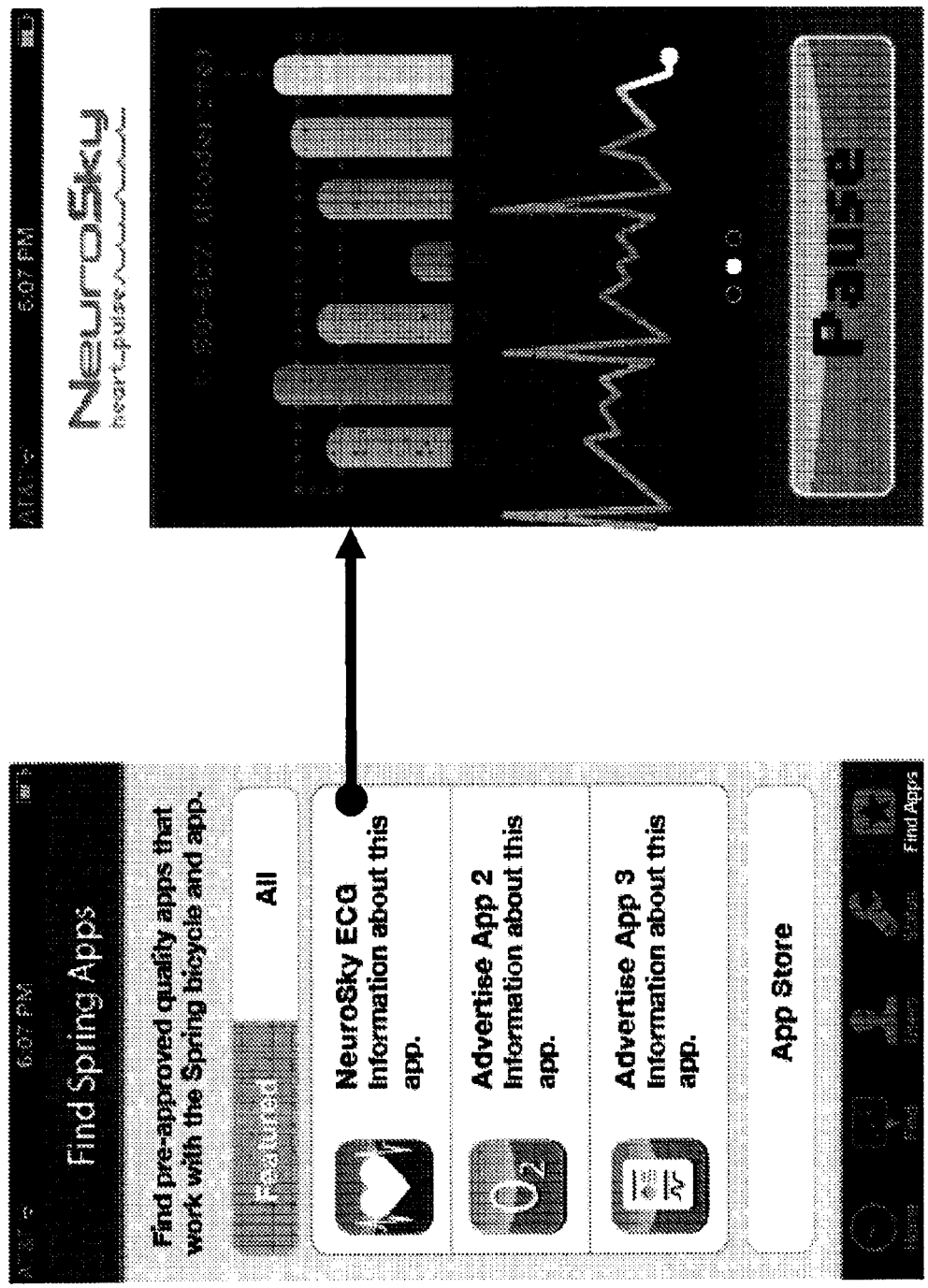
FIG. 28 shows on the left hand side an example of a list of Apps that has been generated on a smartphone in response to a search of a category of Apps for use with a smartphone and a bicycle system.

Apps for use with a smartphone and a bicycle system may be provided. Such Apps may be searchable as a category of Apps by a user using the smartphone. A list of such apps may be provided in response to a search of the category of Apps using the smartphone. FIG. 28 (left hand side) shows an example of a list of Apps that has been generated on a smartphone in response to a search of a category of Apps for use with a smartphone and a bicycle system. FIG. 28 further shows an example of screen output (right hand side) from an App which is first in a list (left hand side) of Apps that has been generated on a smartphone in response to a search of a category of Apps for use with a smartphone and a bicycle system. Advertisements for Apps for use with a smartphone and a bicycle system may be provided in a list of Apps for use with a smartphone and a bicycle system.

Power

In an example, the bicycle system possesses not only the unique capacity to power its electrical systems, but also the ability to simultaneously charge a SpringPorted Device. Moreover, in the unlikely event a bicycle system has not been ridden in a while, a user can take comfort in the fact that a bicycle system's on-board power generation capabilities may be supplemented with an included AC/DC power charger and on-frame DC charge point.

SpringSparc™

In an example, SpringSparc is a bicycle system's ingenious energy generation, storage, and charging system. It includes front and rear hub-integrated kinetic generators, frame-embedded batteries, and an on-frame charging port.

In an example, SpringSparc's primary power storage unit is a 50 W lithium ion battery. A fully charged primary battery may power the bicycle system for six hours without interim charging. When progressively charged via SpringSparc's kinetic generators, the primary battery may ensure all-day, full-system performance. However, should the primary unit become completely discharged due to prolonged storage, in an example it may be brought rapidly to functional levels via SpringSparc's on-frame DC charging point and supplied, country-specific, AC/DC 12V/90 W charger.

Figure 30:
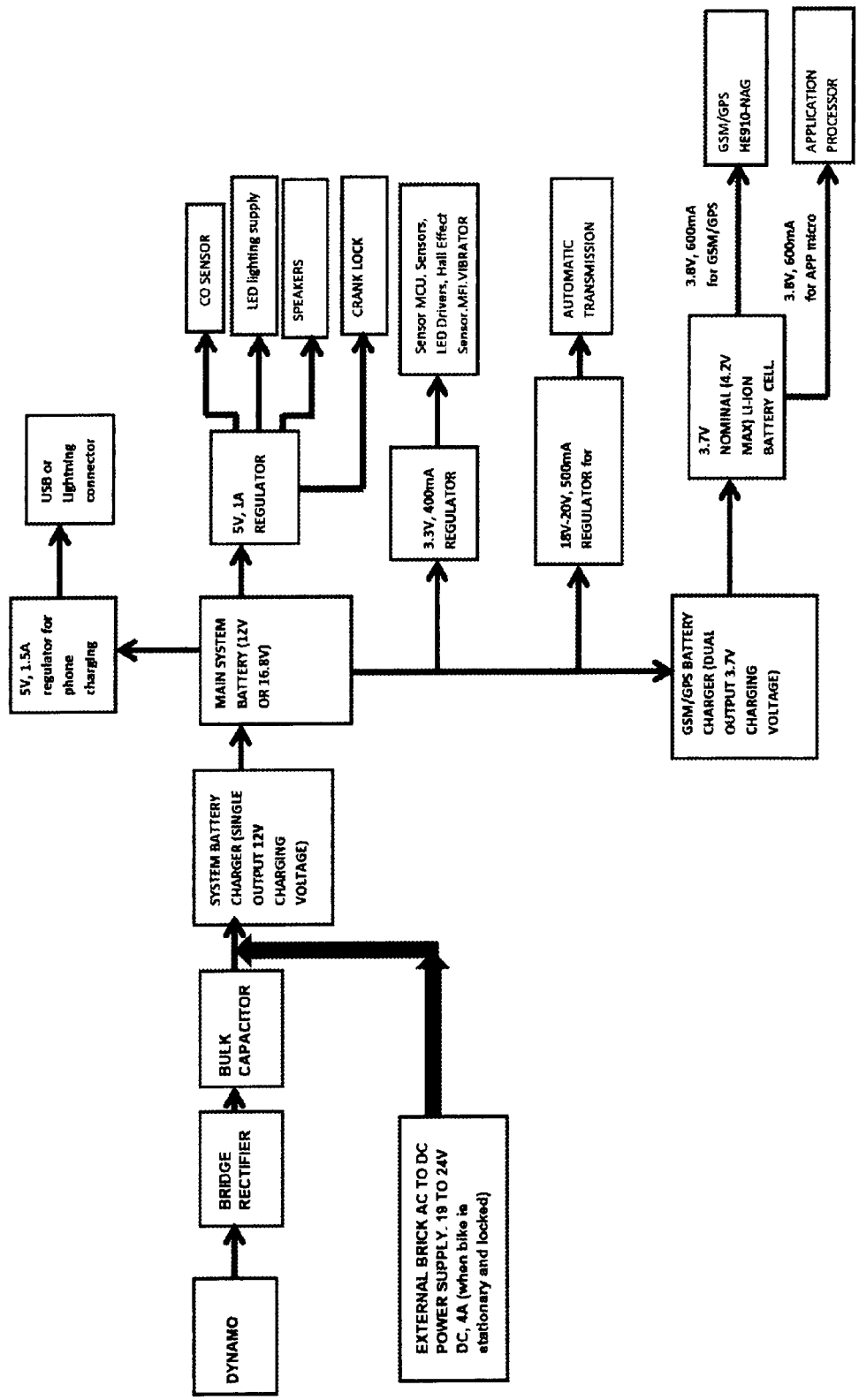
FIG. 30 shows an example of a power management system of a bicycle system.

In an example of a power management system of a bicycle system, output from a dynamo of the bicycle system is passed through a bridge rectifier and a bulk capacitor to a system battery charger which provides for example a single output 12V charging voltage. Alternatively, power from an external AC to DC power supply, 19V to 24 V, DC, 4 A, may be provided to the system battery charger when the bicycle system is stationary and locked. Output from the system battery charger is fed to the main system battery, at 12V or at 16.8V. Main system battery output may be used at 5V, 1.5 A (regulator) for smartphone charging, or for power output to a USB connector, or to a lighting connector. Main system battery output may be used at 5V, 1.5 A (regulator) for powering a CO sensor, a LED lighting supply, a speaker or a crank lock. Main system battery output may be used at 3.3V, 400 mA (regulator) for powering a sensor MCU, sensors, LED drivers, or a Hall Effect sensor. Main system battery output may be used at 18V-20V, 500 mA (regulator) for powering an automatic transmission. Main system battery output may be used to power a GSM/GPS battery charger (dual output 3.7V charging voltage); such output may also power an application processor. An example of a power management system of a bicycle system is shown in FIG. 30.

Figure 29:
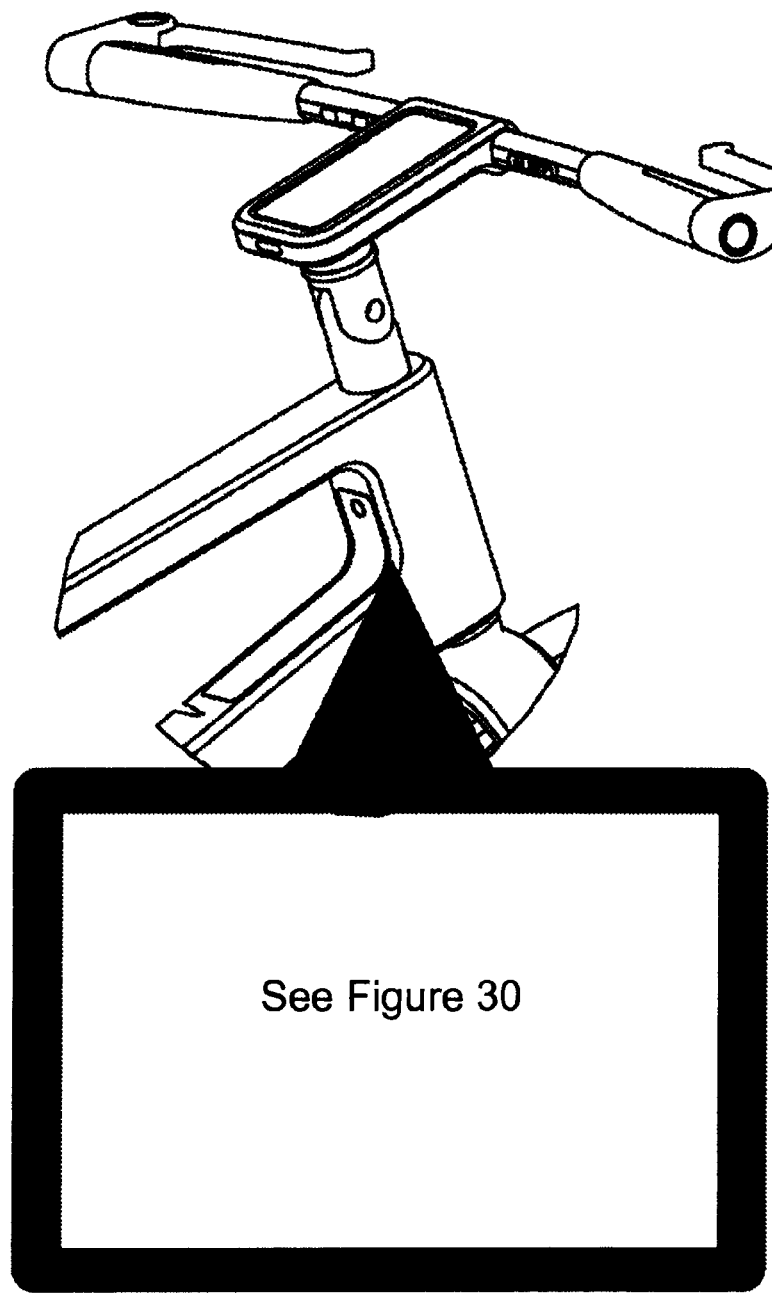
FIG. 29 shows a schematic example of a bicycle system which includes an example of a power management system of a bicycle system.

A bicycle system may include a power management system. FIG. 29 shows a schematic example of a bicycle system which includes an example of a power management system of a bicycle system, as shown in FIG. 30.

In an example, SpringSparc's secondary battery is a 5 W unit specifically designated to provide MFi-compliant power to SpringPorted Devices for both on-board use and charging purposes. In an example, in terms of order of charging, the primary battery is charged initially, followed by the secondary battery, which then powers/charges a SpringPorted Device. In an example, SpringSmart gives SpringSparc's 2 W tertiary battery extra attention by trickle charging and conditioning it to maintain optimal performance levels at all times. This is beneficial due to the battery's role in supporting lost/stolen bicycle system tracking provided by SpringApp's 'Find' feature, as successful location could take several days due to the variety and quantity of factors that can affect GSM and GPS signal transmission and reception.

Figure 31:
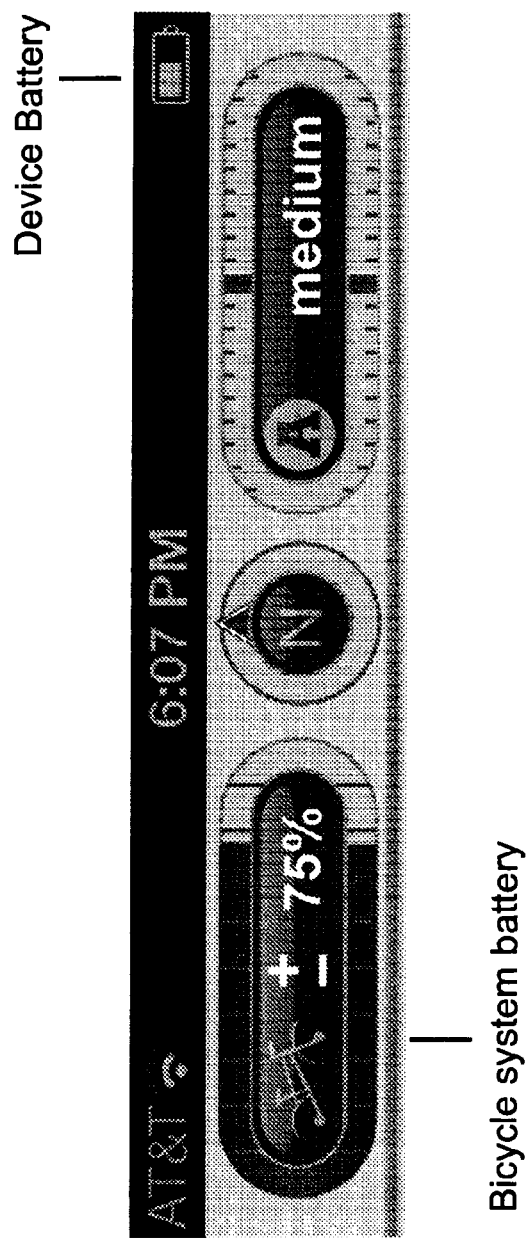
FIG. 31 shows an example of display on a smartphone by an App of a smartphone battery state and of a bicycle system battery state.

As previously mentioned, in an example, SpringSmart controls all SpringSense sensors and ensures low power consumption by activating/deactivating sensors as needed. Additionally SpringApp may display real-time battery state, charging progress, and time-to-depletion information, along with Device battery levels. An example of display on a smartphone by an App of a smartphone battery state and of a bicycle system battery state is shown in FIG. 31.

Performance

Luxury, premium, and aspirational consumers ("LPACs") have grown too sophisticated to tolerate the hollow promises proffered by "form over function". Indeed, LPACs are well aware that design is not enough, and that "pretty is as pretty does" applies as readily to products as it does to people. Which is why, for each of the countless hours dedicated to developing the bicycle system's elegant form, an equal measure was devoted to its functionality. The bicycle system represents a new class of urban transport.

Drivetrain

In an example, the bicycle system's SpringDrive™ delivers ride quality and utility. In an example, SpringDrive comprises one, two or three of three key components:

Rear hub-integrated continuously variable transmission ("CVT") providing step-less, automatic torque control, as well as optional manual "gear shift" cadence adjustment.

Carbon fiber belt delivering smoother, quieter operation than traditional chain systems, while providing all of a chain's efficiency without the associated mess and maintenance.

Custom designed and meticulously engineered sprocket and pulley profiles, finished with a nanotech coating specifically formulated to provide unparalleled durability in even the harshest environments.

Figure 32:
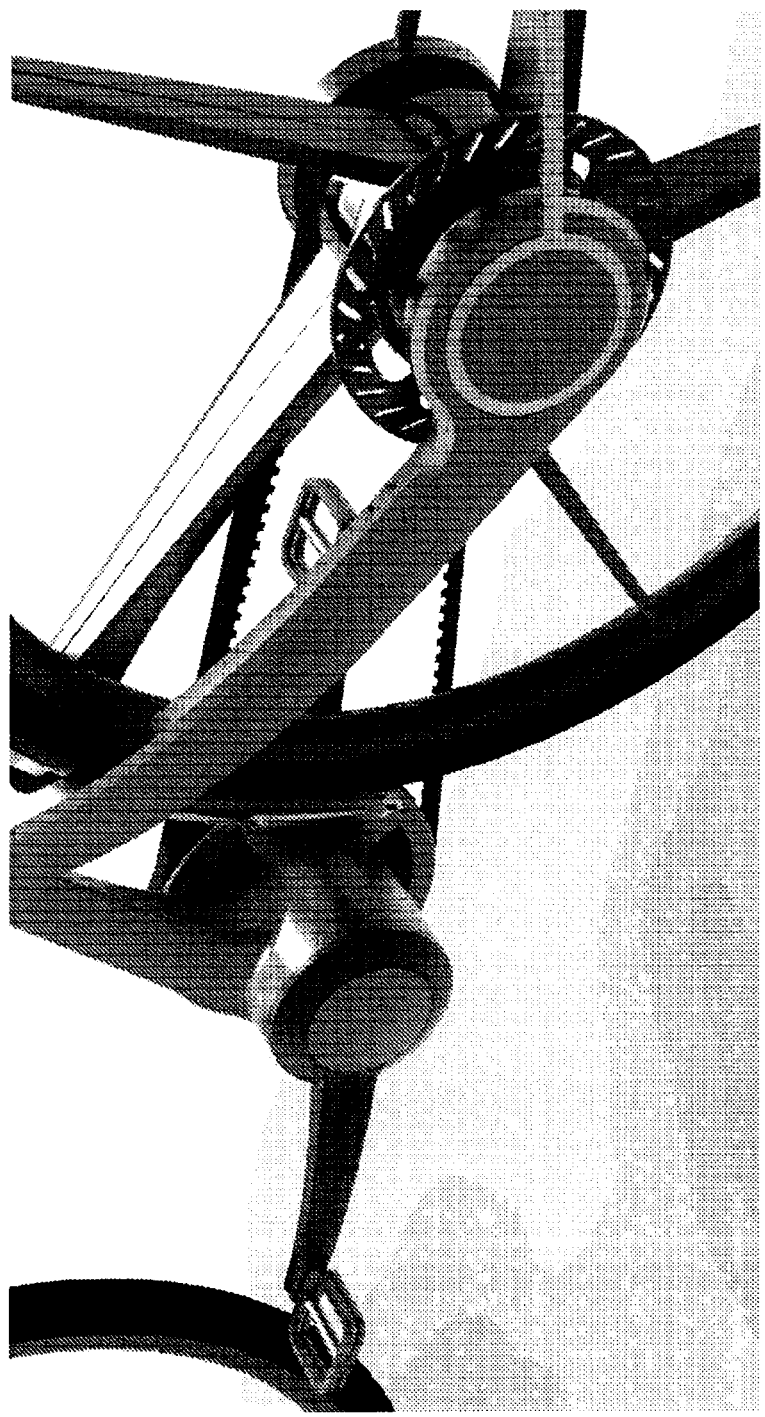
FIG. 32 shows an example of a bicycle system drivetrain.

An example is shown in FIG. 32.

Adjustability

SpringFlex™ is a mechanism offering three possible handlebar orientations:

"Comfort" for rider-upright, low-to-mid velocities

"Speed" for rider-forward, higher-velocities

"Stow" for shipping and storage

Figure 33:
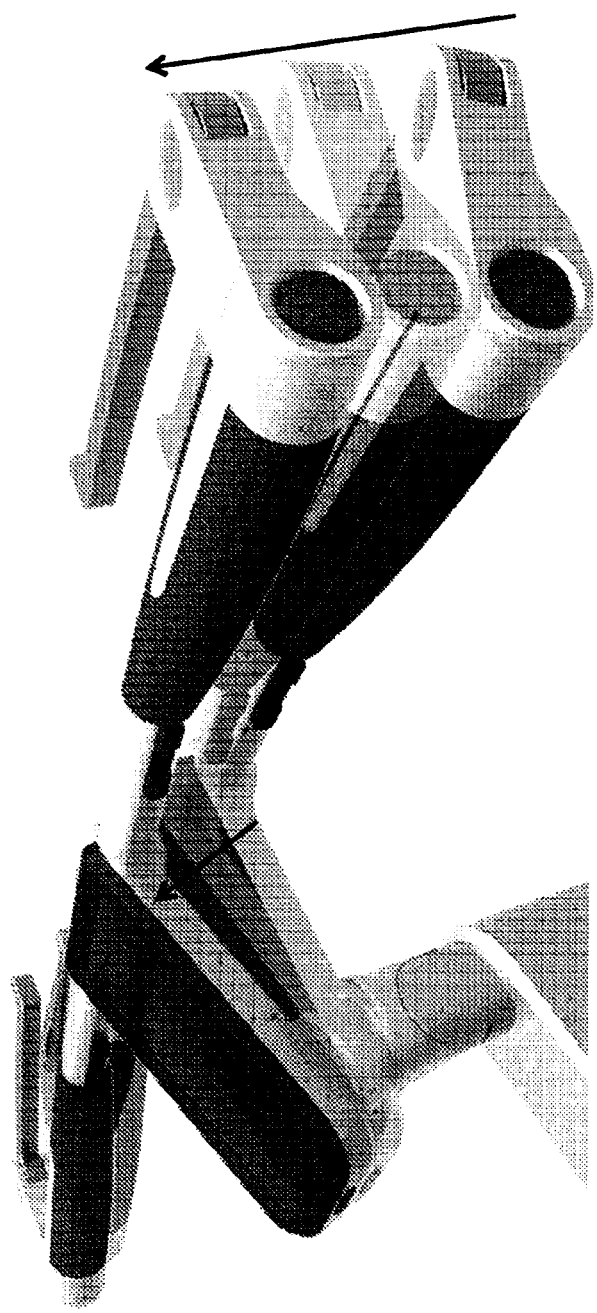
FIG. 33 shows three possible handlebar orientations in one image, in part of an example bicycle system.
Figure 34:
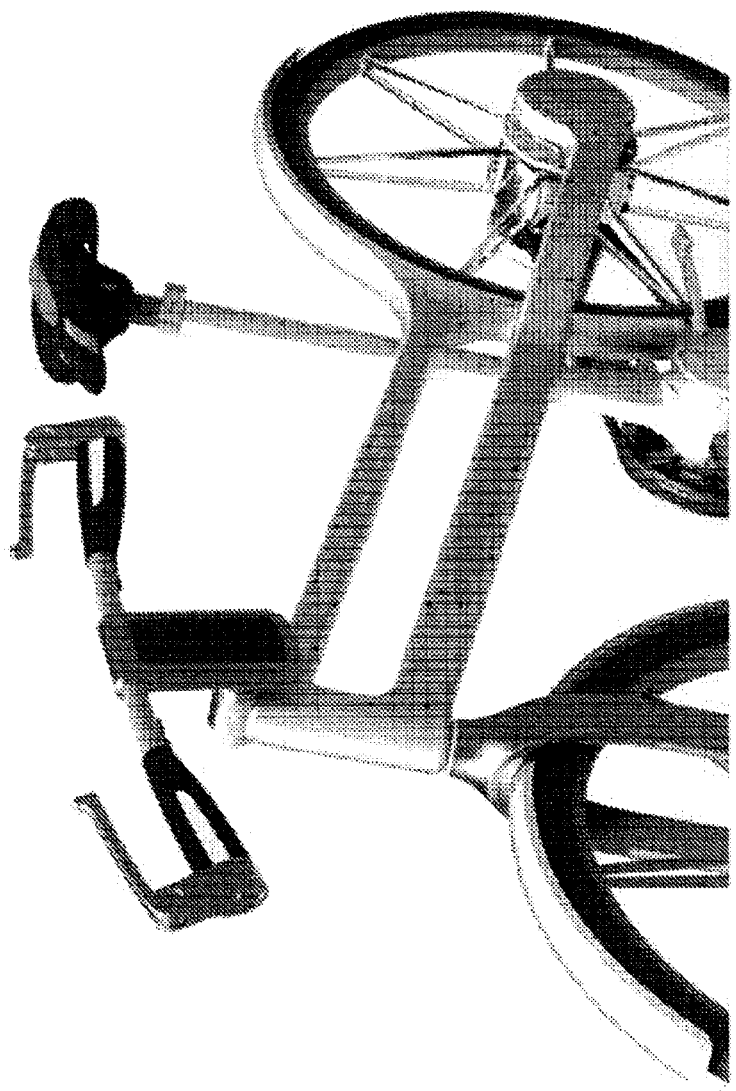
FIG. 34 shows an example of an orientation of handlebars in a bicycle system.
Figure 35:
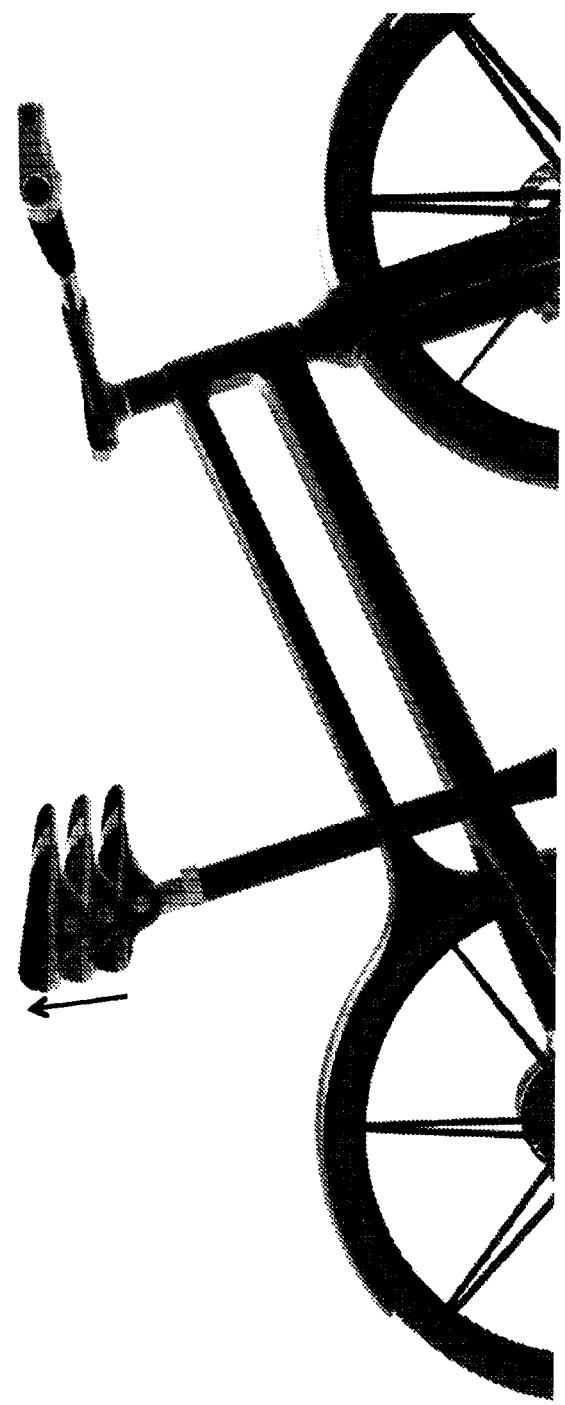
FIG. 35 shows three possible seat heights in one image, in part of an example bicycle system.

SpringFlex may additionally offer height adjustments for the handlebars and height/tilt adjustments for the seat. Ride positioning is simple and easy, due to the incorporation of advanced materials into a superior design that eliminates the usual sticking and dragging normally associated with fine-tuning these components. An example which shows three possible handlebar orientations in one image is shown in FIG. 33. FIG. 34 shows an example of an orientation of handlebars. An example which shows three possible seat heights in one image is shown in FIG. 35.

Control

In an example, SpringCom™ is the bicycle system's user interface. Its handlebar-integrated, left and right side, three-button controls leverage the user's Device to:

Activate and deactivate turn signal lights

Trigger the bicycle system's horn

Figure 36:
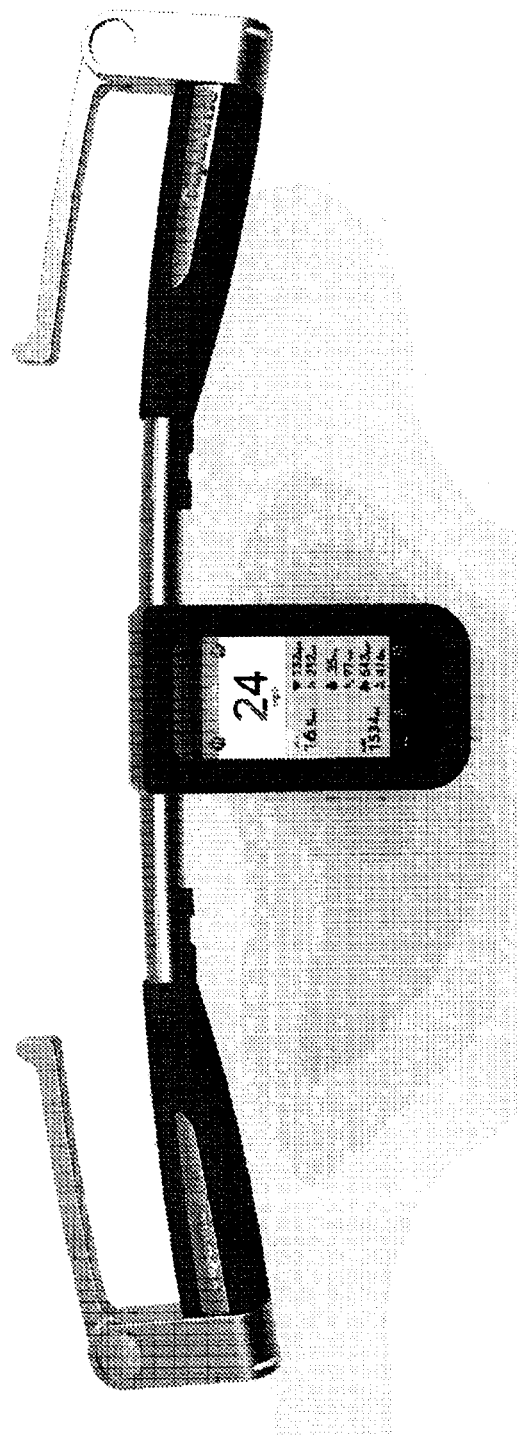
FIG. 36 shows an example of handlebars in a bicycle system, including a smartphone holder which is holding a smartphone.

Manually activate/deactivate the bicycle system's forward-facing projection light An example of handlebars in a bicycle system, including a smartphone holder which is holding a smartphone, is shown in FIG. 36.

Moreover, SpringCom may provide users the ability to manually regulate pedaling cadence via its right side three-button control, thereby overriding the bicycle system's automatic CVT torque control feature.

SpringCom may communicate with users through a synergistic combination of haptic feedback and Device-displayed notices. Vibration motors embedded within the bicycle system's handlebar grips may provide haptic feedback. Haptics instill confidence by ensuring that SpringCom notices are not inadvertently missed.

SpringCom notices may appear in response to input from SpringSmart, SpringApp, and MfC-compliant third party applications. Notices may be specifically designed to be clearly visible in a user's peripheral vision and to transfer maximum information with minimal distraction.

Figure 37A:
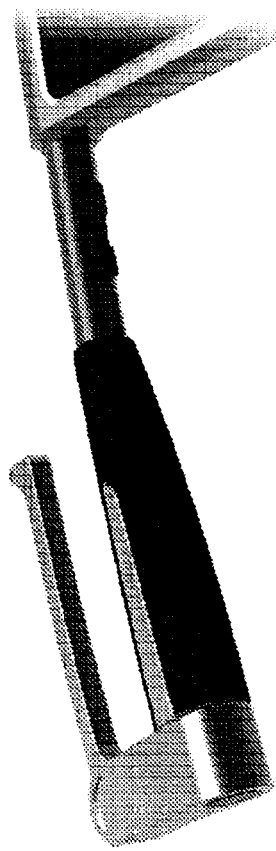
FIG. 37a shows an example of a left handlebar in a bicycle system.
Figure 37B:
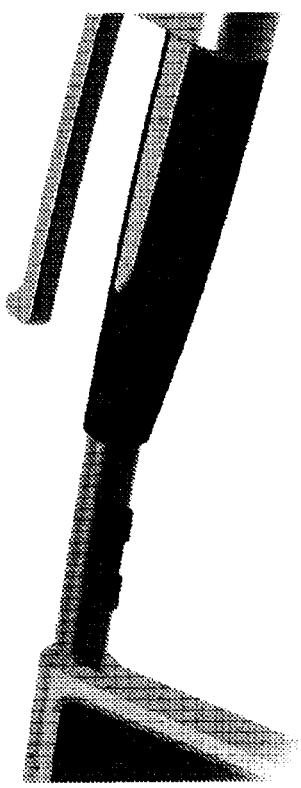
FIG. 37b shows an example of a right handlebar in a bicycle system.
Figure 38:
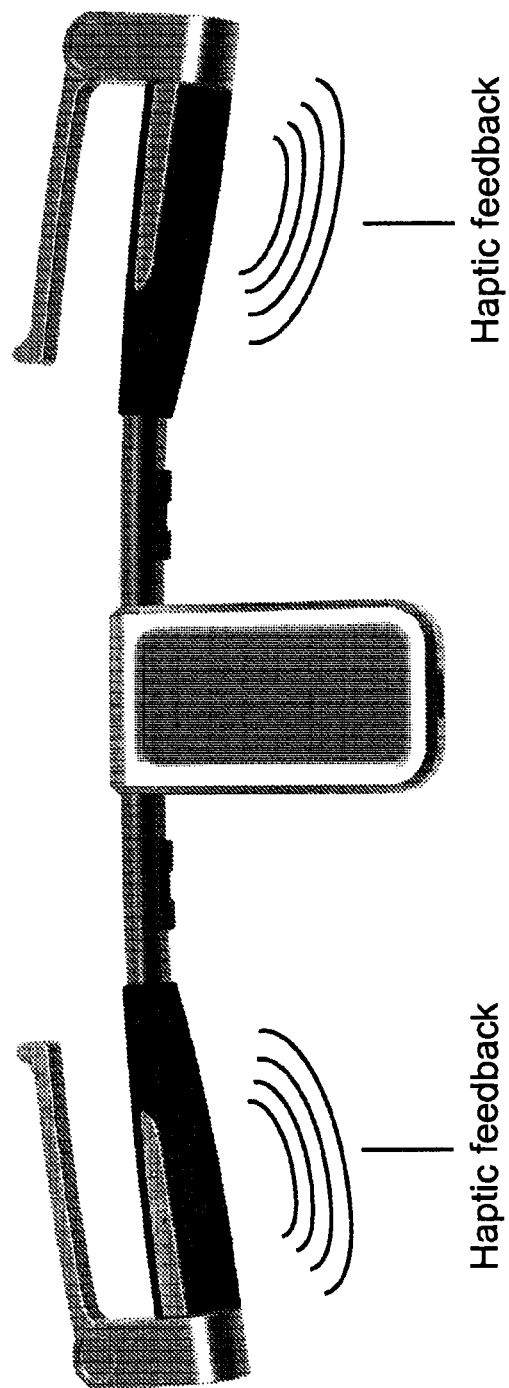
FIG. 38 shows an example of handlebars in a bicycle system, including a smartphone holder which is holding a smartphone (not shown), in which it is indicated schematically that the handlebars are providing haptic feedback.
Figure 39:
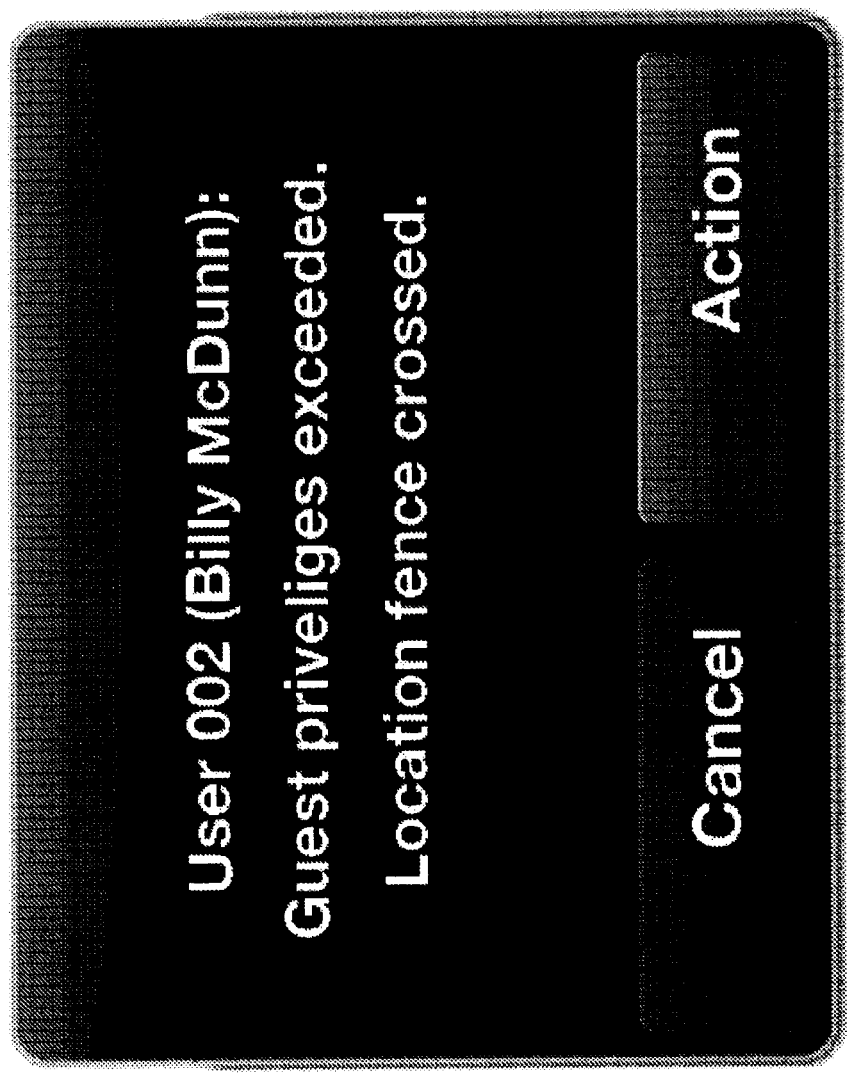
FIG. 39 shows an example of a notice displayed by an App running on a smartphone which is docked to a bicycle system.

FIG. 37*a* shows an example of a left handlebar in a bicycle system. FIG. 37*b* shows an example of a right handlebar in a bicycle system. An example of handlebars in a bicycle system, including a smartphone holder which is holding a smartphone (not shown), wherein it is indicated schematically that the handlebars are providing haptic feedback, is shown in FIG. 38. An example of a notice displayed by an App running on a smartphone which is docked to a bicycle system is shown in FIG. 39.

Navigation

In an example, SpringApp's 'Find' feature offers an instructive example of how SpringCom combines haptics and notices to communicate with users. 'Find' may obtain location and turn-by-turn navigation data from smartphone Maps and/or from itself or from another smartphone App, or from Maps or services accessible from a smartphone, and/or from other third party providers. 'Find' may then utilize SpringCom's innovative system to deliver intuitive, cycling-centric TBTN instructions to a user using some or all of the following:

Notice message arrows communicate direction of upcoming turn.
Notice message colors communicate pre-turn information:
  Blue: Displayable only while the bicycle system is static and provides pre-trip information (e.g., "proceed to intersection of X and Y Street to begin").
  Green: Displayable while the bicycle system is in motion and indicates user has progressed halfway or less to next turn.
  Amber: Displayable while the bicycle system is in motion and indicates user has progressed halfway or more to next turn.
  Red: Displayable while the bicycle system is in motion and indicates that user is to take next turn.
Direction of an upcoming turn and change in notice lighting color state are indicated by haptic vibration in the grip corresponding to direction of turn.

SpringApp's Find Feature

SpringCom enables users to obtain the information they need without ever having to shift primary focus from the road.

A map screen may be provided on the smartphone which shows a bicycle system's current position, even when the smartphone is not docked to the bicycle system. An example is shown in FIG. 40a. A map screen may be provided on the smartphone which shows a bicycle system's current position, when the smartphone is docked to the bicycle system, and routing information is being provided. An example is shown in FIG. 40b. A map screen may be provided on the smartphone which shows a bicycle system's current position, when the smartphone is docked to the bicycle system, even when routing information is not being provided. On such a map screen, a selectable touch screen icon may provided, which when selected leads to the provision of routing information to a predefined destination, eg. a predefined Home destination. An example is shown in FIG. 40c.

Figures 41A, 41B, 41C:
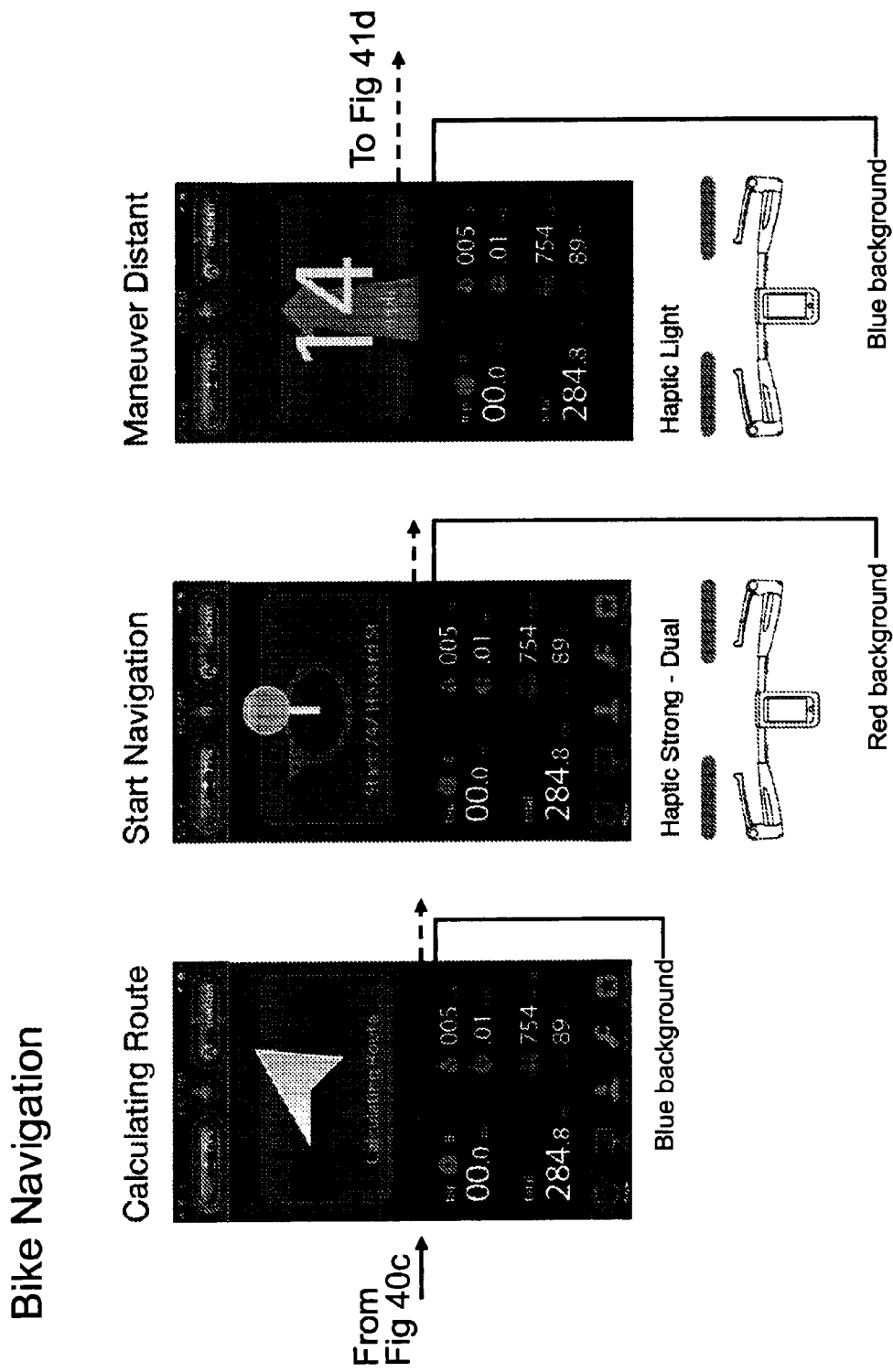
FIG. 41a shows an App for a bicycle system displaying that a route is being calculated to the selected destination.
FIG. 41b shows an App for a bicycle system displaying that navigation has been started, and that related haptic output is provided to handlebars of the bicycle system.
FIG. 41c shows an App for a bicycle system displaying guidance regarding a distant maneuver, and that related haptic output is provided to handlebars of the bicycle system.

When a destination is selected on the smartphone that is docked to a bicycle system, and a route is requested, a route is calculated to the selected destination. Screen output may include a blue background colour. An example is shown in FIG. 41a. After a route has been calculated, navigation may be started. Screen output may include a changed (eg. red) background colour. A strong haptic output, which is dual in the sense that haptic output is provided to the left handlebar and to the right handlebar, may be provided. An example is shown in FIG. 41b. During route guidance, guidance regarding a distant maneuver may be provided. Screen output may include an associated direction arrow. Screen output may include a blue background colour. A light haptic output, which is dual in the sense that haptic output is provided to the left handlebar and to the right handlebar, may be provided. An example is shown in FIG. 41c. During route guidance, guidance regarding an upcoming maneuver may be provided. Screen output may include an associated direction arrow. Screen output may include an amber background colour. A medium haptic output, may be provided to the handlebar corresponding to the turn direction (eg. haptic output to a right handlebar corresponding to a right turn may be provided). An example is shown in FIG. 41d. During route guidance, guidance regarding a maneuver for immediate execution may be provided. Screen output may include an associated direction arrow. Screen output may include a red background colour. A strong haptic output, may be provided to the handlebar corresponding to the turn direction (eg. haptic output to a right handlebar corresponding to a right turn may be provided). An example is shown in FIG. 41e. During route guidance, guidance regarding a distant maneuver may be provided. Screen output may include an associated direction arrow. Screen output may include a blue background colour. A light haptic output, which is dual in the sense that haptic output is provided to the left handlebar and to the right handlebar, may be provided. An example is shown in FIG. 41f. During route guidance, guidance regarding an upcoming maneuver may be provided. Screen output may include an associated direction arrow. Screen output may include an amber background colour. A medium haptic output, may be provided to the handlebar corresponding to the turn direction (eg. haptic output to a left handlebar corresponding to a left turn may be provided). An example is shown in FIG. 41g. During route guidance, guidance regarding a maneuver for immediate execution may be provided. Screen output may include an associated direction arrow. Screen output may include a red background colour. A strong haptic output, may be provided to the handlebar corresponding to the turn direction (eg. haptic output to a left handlebar corresponding to a left turn may be provided). An example is shown in FIG. 41h. During route guidance, guidance regarding a distant destination may be provided. Screen output may include an associated direction arrow. Screen output may include a blue background colour. A light haptic output, which is dual in the sense that haptic output is provided to the left handlebar and to the right handlebar, may be provided. An example is shown in FIG. 41i. During route guidance, guidance regarding approaching the destination may be provided. Screen output may include an associated direction arrow. Screen output may include an amber background colour. A medium haptic output, which is dual in the sense that haptic output is provided to the left handlebar and to the right handlebar, may be provided. An example is shown in FIG. 41j. During route guidance, guidance regarding arrival at the destination may be provided. Screen output may include an associated destination icon. Screen output may include a red background colour. A strong haptic output, which is dual in the sense that haptic output is provided to the left handlebar and to the right handlebar, may be provided. An example is shown in FIG. 41k.

The sequence of Figures from FIG. 41a to FIG. 41k provide an example of a sequence of Figures which relate to an example of bicycle system route guidance output during route calculation and route guidance provision.

Safety

While the bicycle system will certainly satisfy traditional bike consumers, its true market is the exponentially larger LPACs segment. This means many bicycle system users will not have been on a bike for years, so safety's importance increases. The bicycle system and its accompanying software meet this challenge and, in so doing, set a new standard for urban biking. Safety influences every aspect of the bicycle system and impacts even the smallest details. Though not always readily apparent, safety's importance is borne out by a host of meticulously considered elements, several examples of which follow.

Warnings & Restrictions

Examples of the bicycle system's "baked in" approach to safety include:

SpringApp's on-screen warnings, including:
"Ride Safe Warning", which is displayed each time a Device is SpringPorted
"Frost Warning", which is displayed upon ambient temperatures dropping to 37° F.
SpringApp's ability to leverage SpringSense data to "know" whether "its bicycle system" is on the go and then restrict in-motion feature access to those specifically designated for use while cycling.

The App may display a warning screen, asking the user to travel safely on the bicycle system. An example is shown in FIG. 20b. The App may display a frost alert. An example is shown in FIG. 22a.

SpringBeep™

The bicycle system's SpringBeep is a battery-powered, frame-integrated speaker providing audible notice-of-presence ("NOP") to motorists, cyclists, and pedestrians in proximity. SpringBeep also enables SpringNanny™, the bicycle system's SpringPorted-Device monitoring system, as well as the bicycle system's SpringGuard™ theft alarm.

Figure 42:
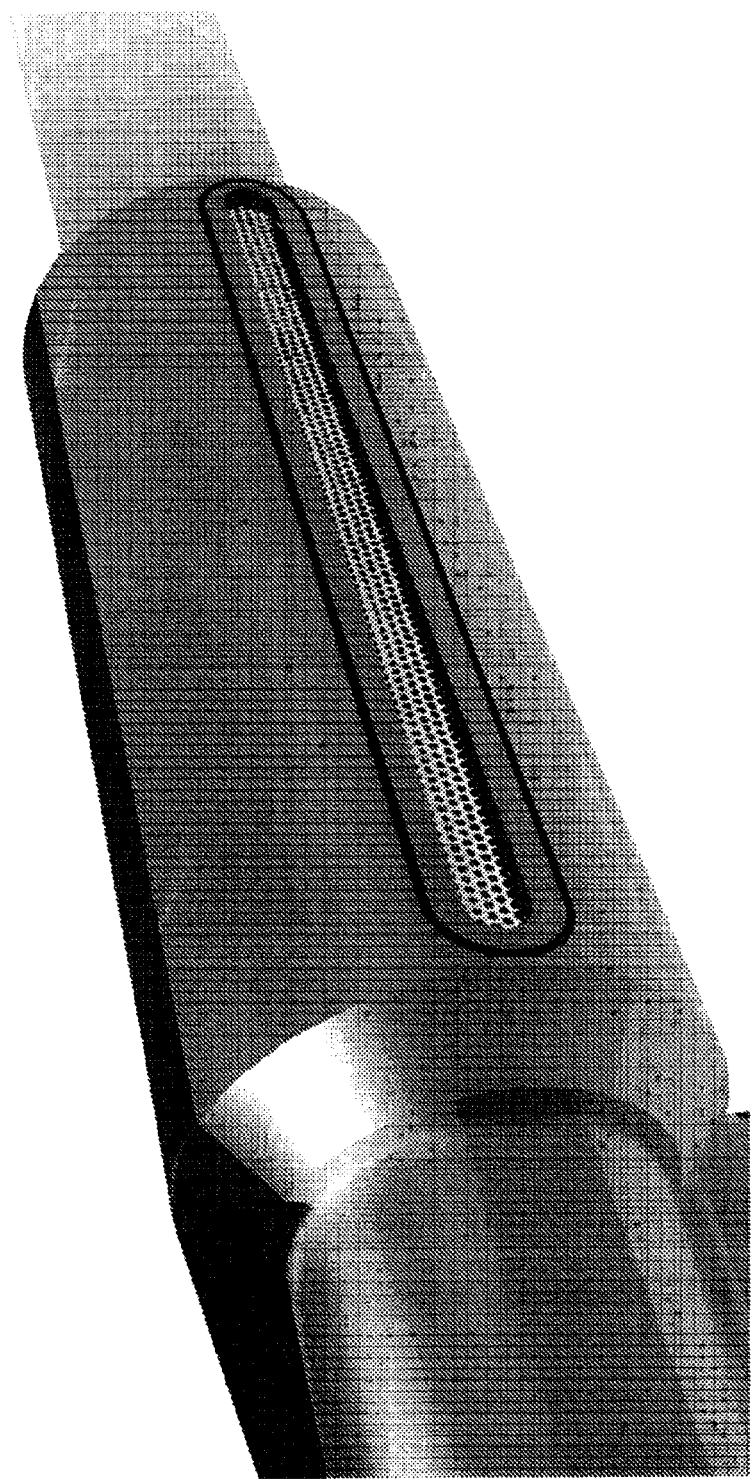
FIG. 42 shows a schematic example of a frame-integrated speaker providing audible notice-of-presence.

A schematic example of a frame-integrated speaker providing audible notice-of-presence is shown in FIG. 42.

SpringBrite™

Figure 43:
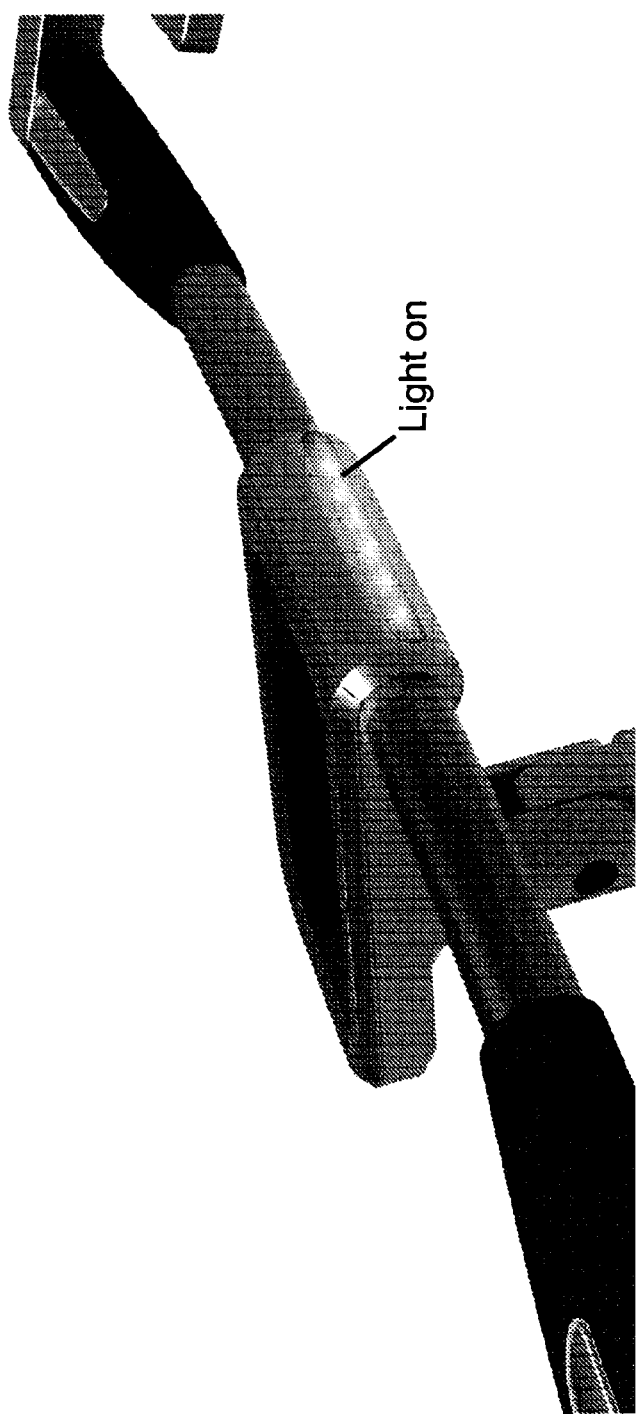
FIG. 43 shows an example of a frame-integrated projection element providing high-intensity path lighting.

Lighting is a crucial safety component. In an example, the bicycle system delivers with SpringBrite its comprehensive lighting system. SpringBrite's frame-integrated projection element may provide white, high-intensity path lighting and may be auto-activated by SpringSmart when ambient light conditions fall below pre-set levels. An example of a frame-integrated projection element providing high-intensity path lighting is shown in FIG. 43.

In an example, SpringBrite's NOP elements are high-intensity, constant-state lights integrated into the bicycle system's front and rear hubs (white and red, respectively) and the rear of its saddle (red) to provide NOP to motorists, cyclists, and pedestrians in proximity. NOP lights may be auto-activated upon SpringPorting a Device and are protected by polycarbonate lenses engineered to resist impact and maximize visibility.

Figure 44:
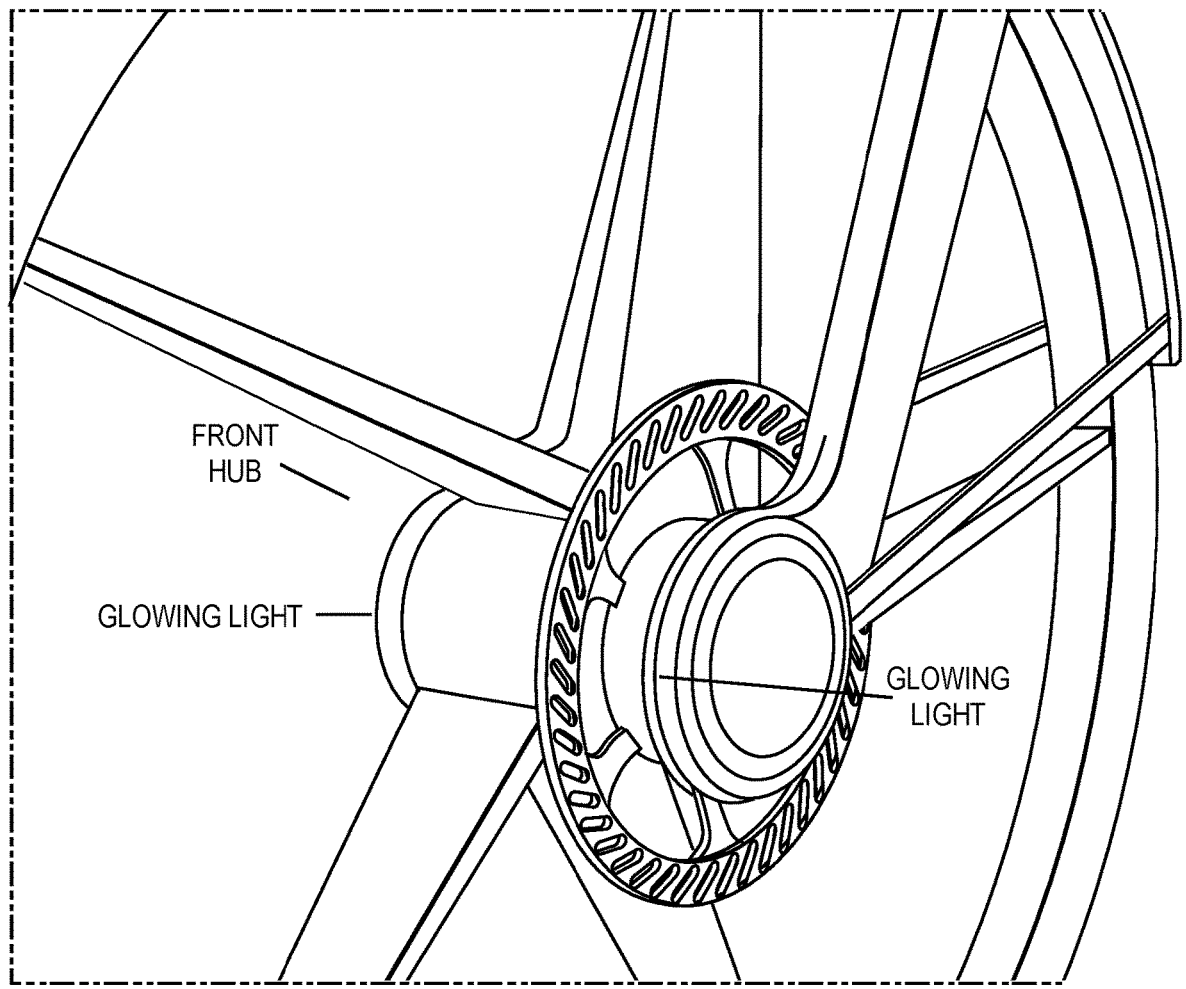
FIG. 44 shows an example of a front hub which includes a first light on a left side of the hub and a second light on a right side of the hub.
Figure 45:
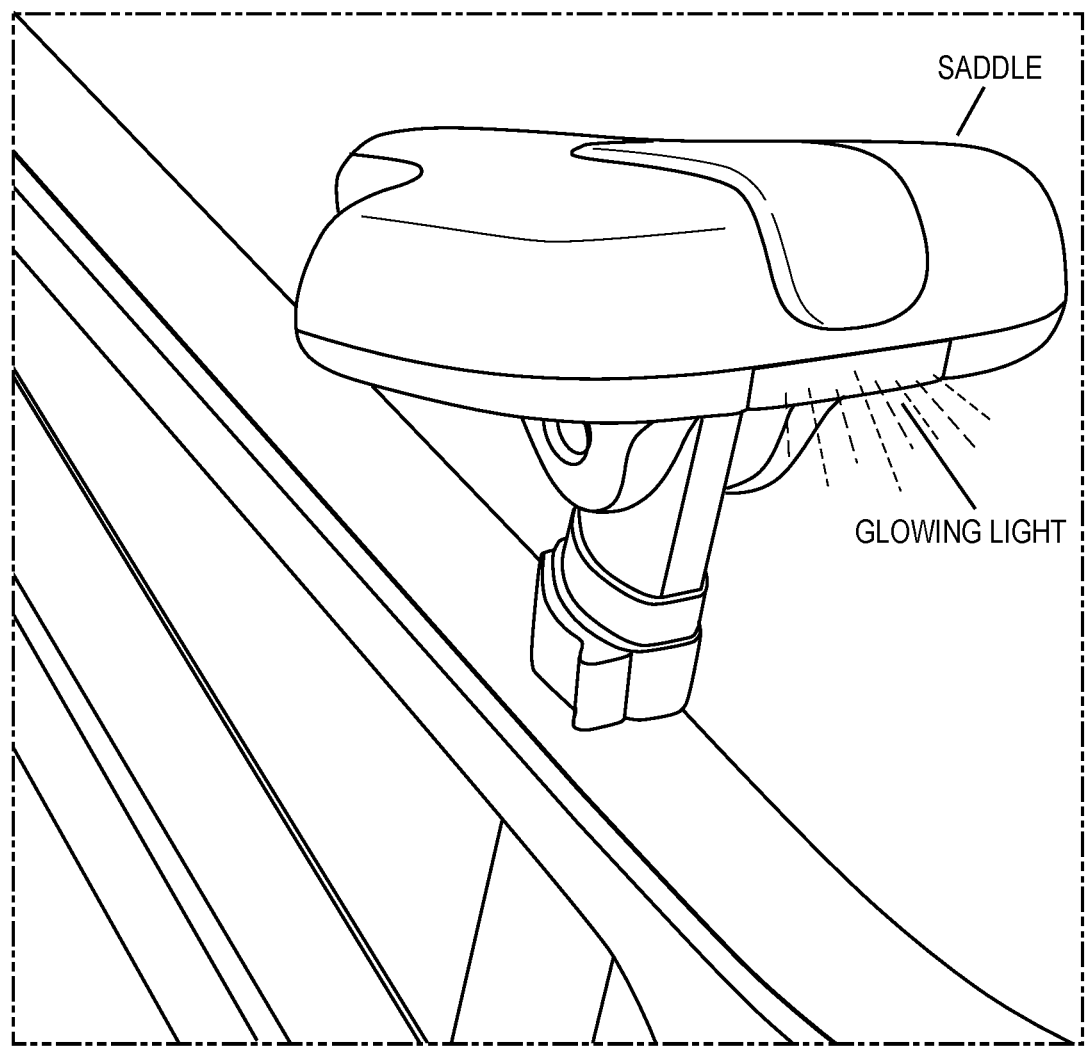
FIG. 45 shows an example of a saddle which includes a light on a rear of the saddle.
Figure 46:
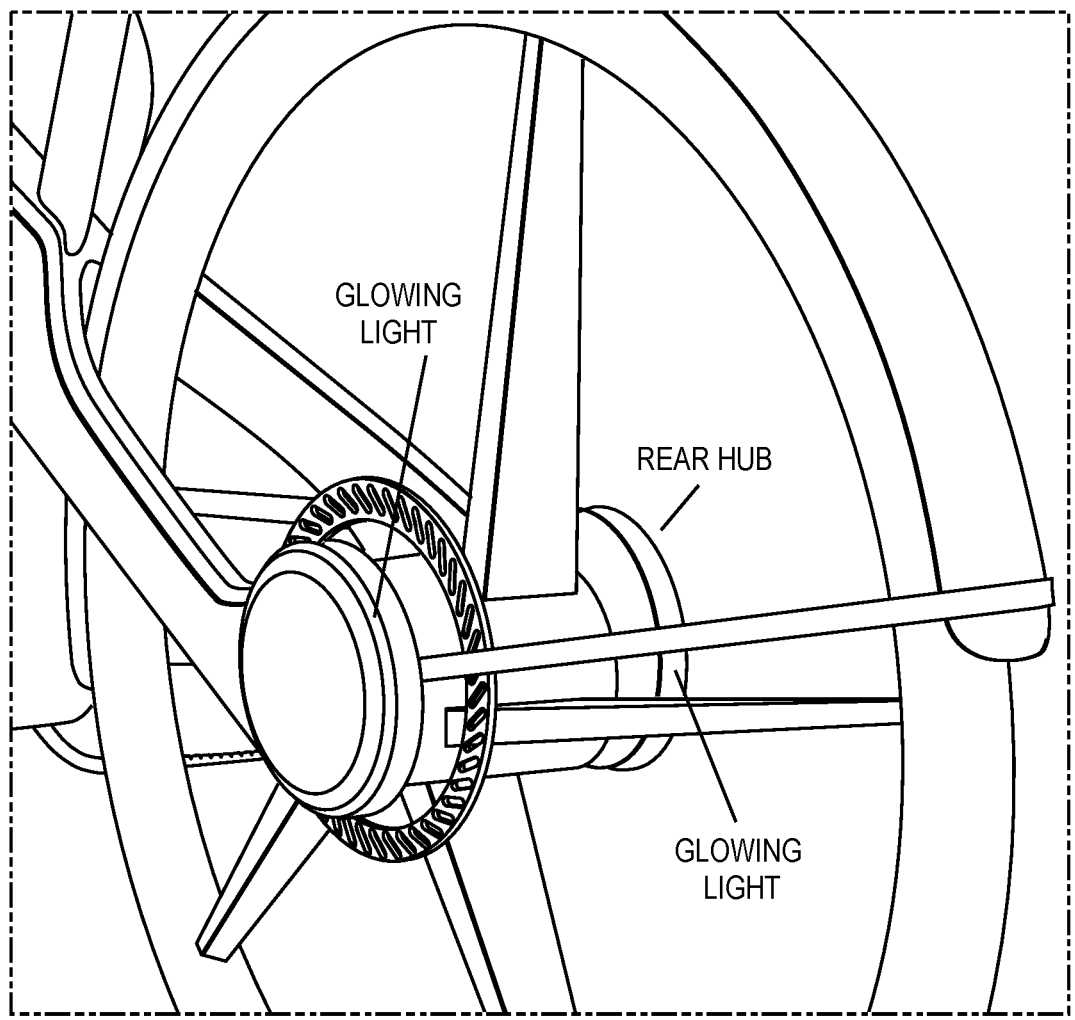
FIG. 46 shows an example of a rear hub which includes a first light on a left side of the hub and a second light on a right side of the hub.

A front hub may include a first light on a left side of the hub and a second light on a right side of the hub. An example is shown in FIG. 44. A saddle may include a light on a rear of the saddle. An example is shown in FIG. 45. A rear hub may include a first light on a left side of the hub and a second light on a right side of the hub. An example is shown in FIG. 46.

In an example, SpringBrite's indication lights ("Indicators") enable users to signal to others of impending actions. High intensity, handlebar-integrated, amber Indicators may provide flashing left/right turn signals to motorists, cyclists, and pedestrians. Turn Indicators are controlled via the bicycle system's left-side three-button switch.

Figure 47B:
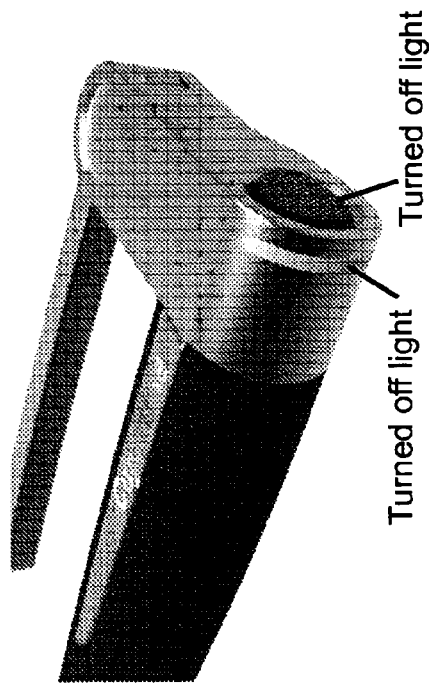
FIG. 47b shows an example of an unlit forward facing indicator and an unlit sideways facing indicator.
Figure 47A:
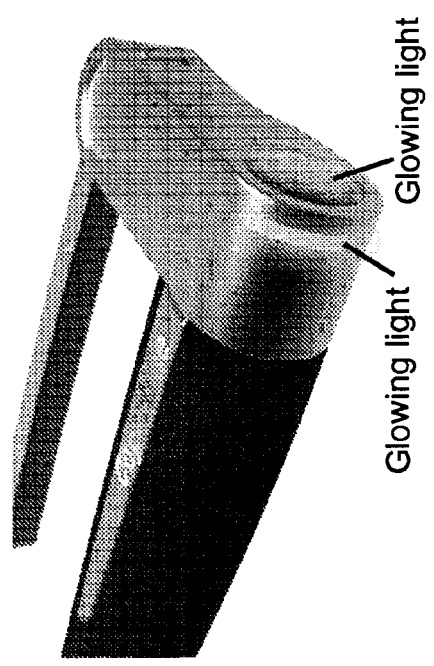
FIG. 47a shows an example of a lit forward facing indicator and a lit sideways facing indicator.

A handle bar may include an indicator on the front of the handlebar which when lit shines light in front of the bicycle system. A handle bar may include an indicator on a side of a handlebar which when lit shines light to the side of the bicycle system. An example of a lit forward facing indicator and a lit sideways facing indicator is shown in FIG. 47a. An example of an unlit forward facing indicator and an unlit sideways facing indicator is shown in FIG. 47b.

SpringBrite's speed reduction Indicator may automatically increase the brightness of the bicycle system's saddle integrated red NOP light to signal a user's reduction in speed.

Figure 48:
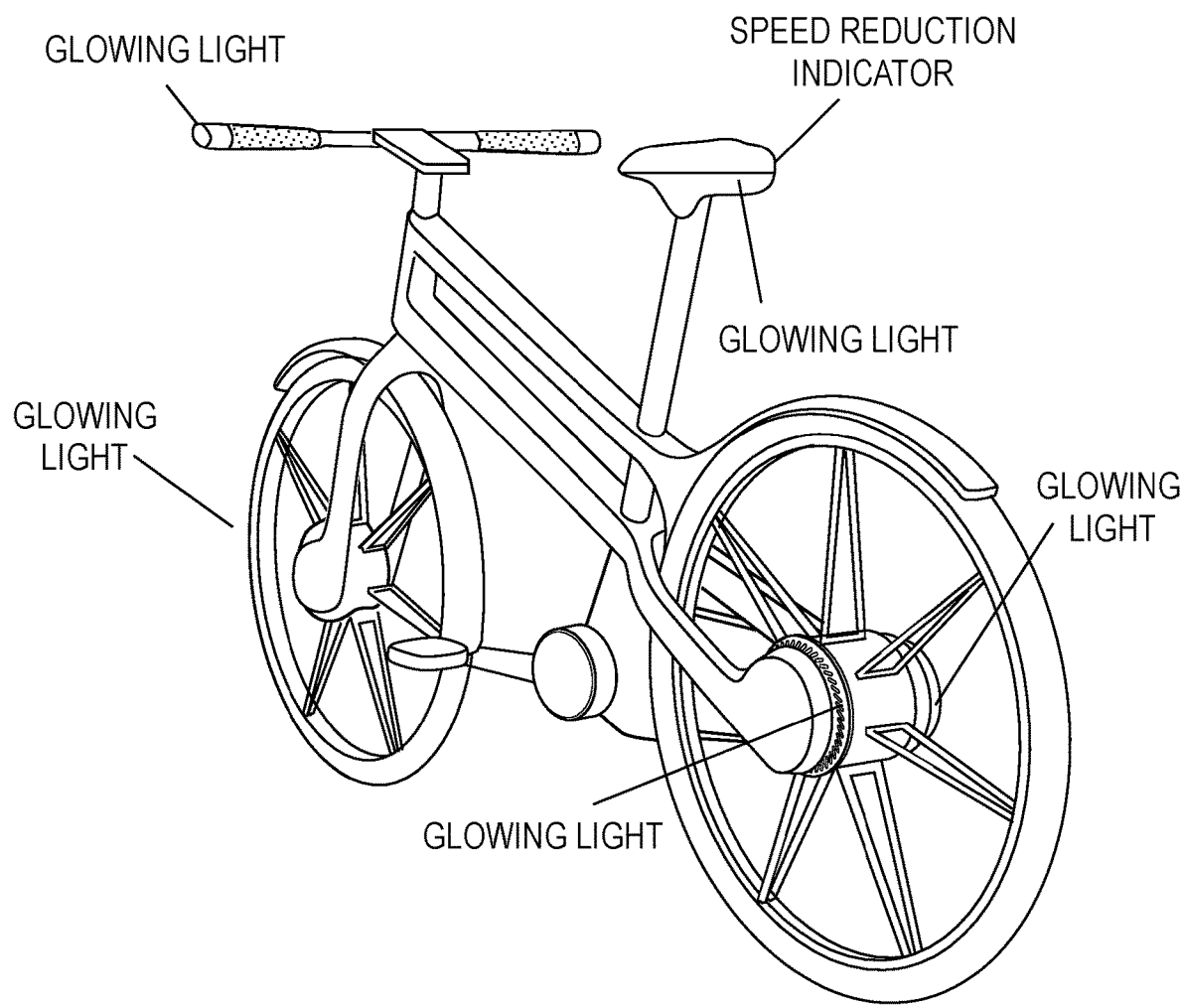
FIG. 48 shows an example of a bicycle system in which the front hub lights are lit, in which the rear hub lights are lit, and in which a saddle light, which is a speed reduction indicator, is lit.

An example of a bicycle system in which the front hub lights are lit, in which the rear hub lights are lit, and in which a saddle light, which is a speed reduction indicator, is lit, is shown in FIG. 48.

Health

Biking is universally acknowledged as being part of a healthy lifestyle; however, "bikers" are but a small portion of the overall population. By targeting the considerably larger LPACs segment, the bicycle system will bring biking's health benefits to a much broader audience.

Carbon Monoxide Alerts

SpringSmart may actively monitor ambient carbon monoxide ("CO") via SpringSense and provides alert notices of unhealthy levels via SpringApp. Examples of related screen output are shown in FIG. 23a, FIG. 23b, FIG. 23c, and FIG. 23d, Third Party Developers In an example, SpringSense derived electrocardiography (ECG), temperature, humidity, and CO data is available to third party developers for use in creating a variety of applications that will enhance riding experience and support efforts to adopt healthier lifestyles.

Security

Road and mountain bike enthusiasts often spend upwards of $30,000 on their bikes. City dwellers look for dependability at the lowest possible price. This disparity is primarily attributable to theft.

When a ride is completed, road and mountain bikers store their precious mounts in secure locations. Yet, for urban cyclists, a "ride" may occur 200+ times a year, and the vast majority will include a series of shorter "trips", many of which leave urban bikes exposed to theft. Furthermore, the more expensive the bike, the more likely it is to be stolen or stripped for parts.

SpringGuard™

In an example, the bicycle system's SpringGuard™ system eliminates theft as an objection to premium pricing. Its formidable theft deterrence arsenal may employ a layered system which may include the following features:

SpringLoc™

Figure 49B:
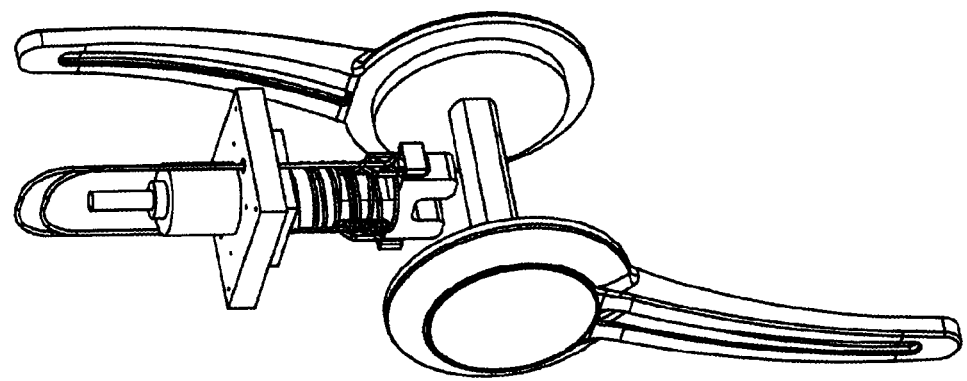
FIG. 49b shows an example of a disengaged locking system in which a lock has been released from a bicycle system's crank axle.
Figure 49A:
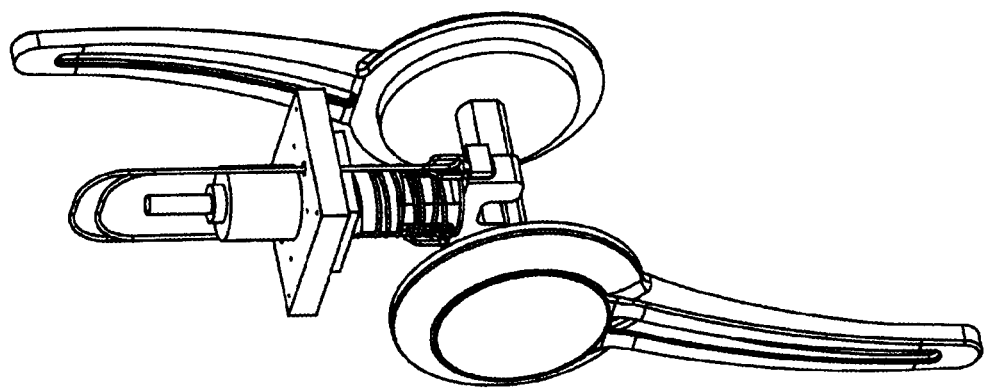
FIG. 49a shows an example of an engaged locking system in which a lock has disabled a bicycle system's crank axle.

Bolt lock integrated into the bicycle system's bottom bracket.
Deactivated when a user SpringPorts a Device, and activated when the Device is undocked.
Upon activation, SpringLoc:
Disables the bicycle system's crank axle and, consequently, immobilizes its pedals
Establishes the bicycle system's geo-position, after which, if motion exceeds a threshold eg. ten feet, SpringGuard:
Alerts user via SMS/SpringApp notification
Optionally, triggers SpringGuard's theft alarm An example of an engaged locking system in which a lock has disabled a bicycle system's crank axle is shown in FIG. 49a. An example of a disengaged locking system in which a lock has been released from a bicycle system's crank axle is shown in FIG. 49b.

Figure 50:
FIG. 50 shows an example of a retractable cable which has been used to secure a bicycle system to a bicycle stand.
Figure 51:
FIG. 51 shows an App for a bicycle system displaying an example of a status screen which shows maintenance data which relates to the bicycle system.
Figure 52A:
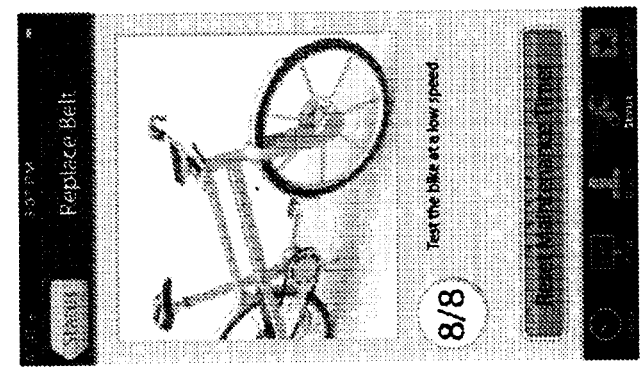
FIG. 52a and FIG. 52b show an example of a sample of a sequence of screen output provided in response to selection of a selectable touch screen icon relating to a bicycle system component in which maintenance instructions which relate to the bicycle system component are provided.
Figure 52B:
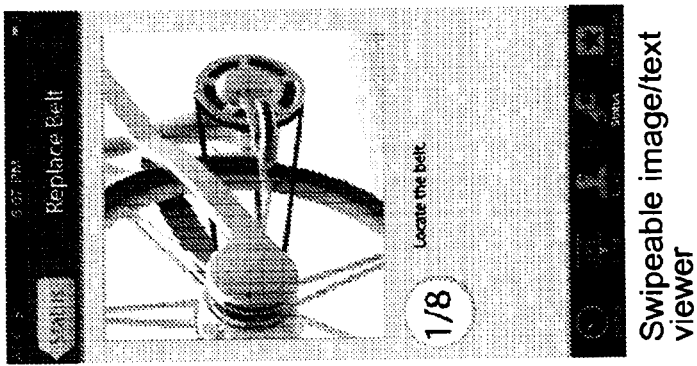
Figure 53A:
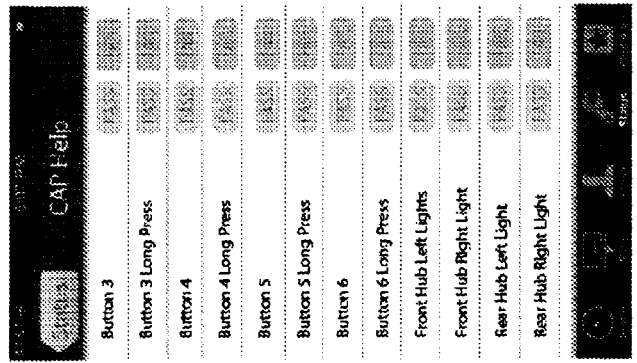
FIG. 53a, FIG. 53b, FIG. 53c, and FIG. 53d show examples of screen output provided in response to selection of a selectable touch screen icon, which if selected by a user provides further maintenance data which relates to the bicycle system.
Figure 53B:
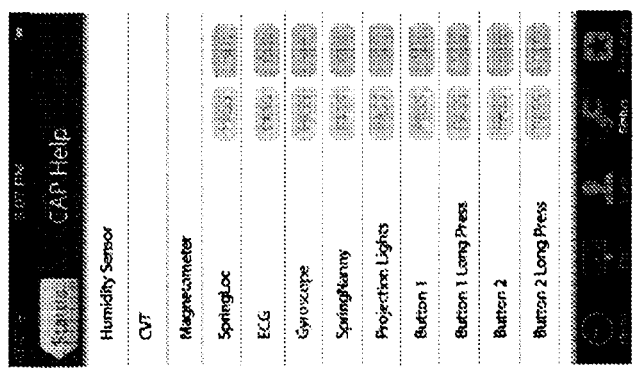
Figure 53C:
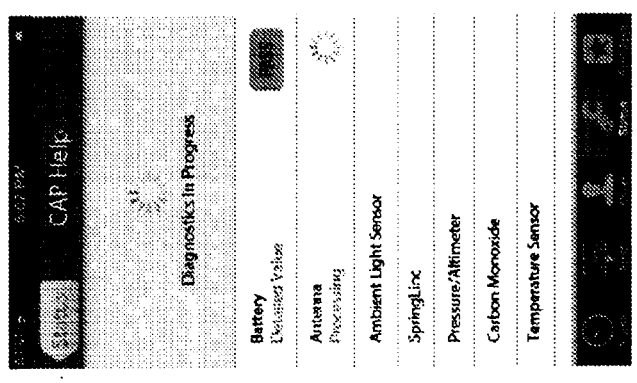
Figure 53D:
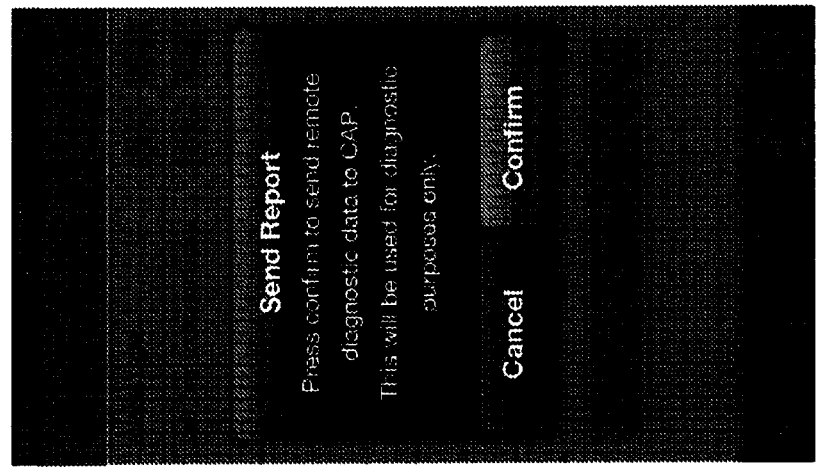
Figure 53E:
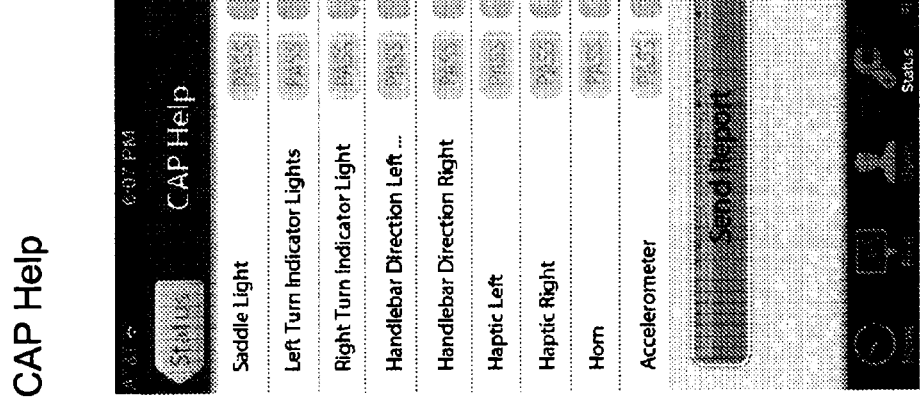
FIG. 53e shows an example of a confirmation screen for a user to confirm that the user wants to send a report to a central reporting server.
Figure 54:
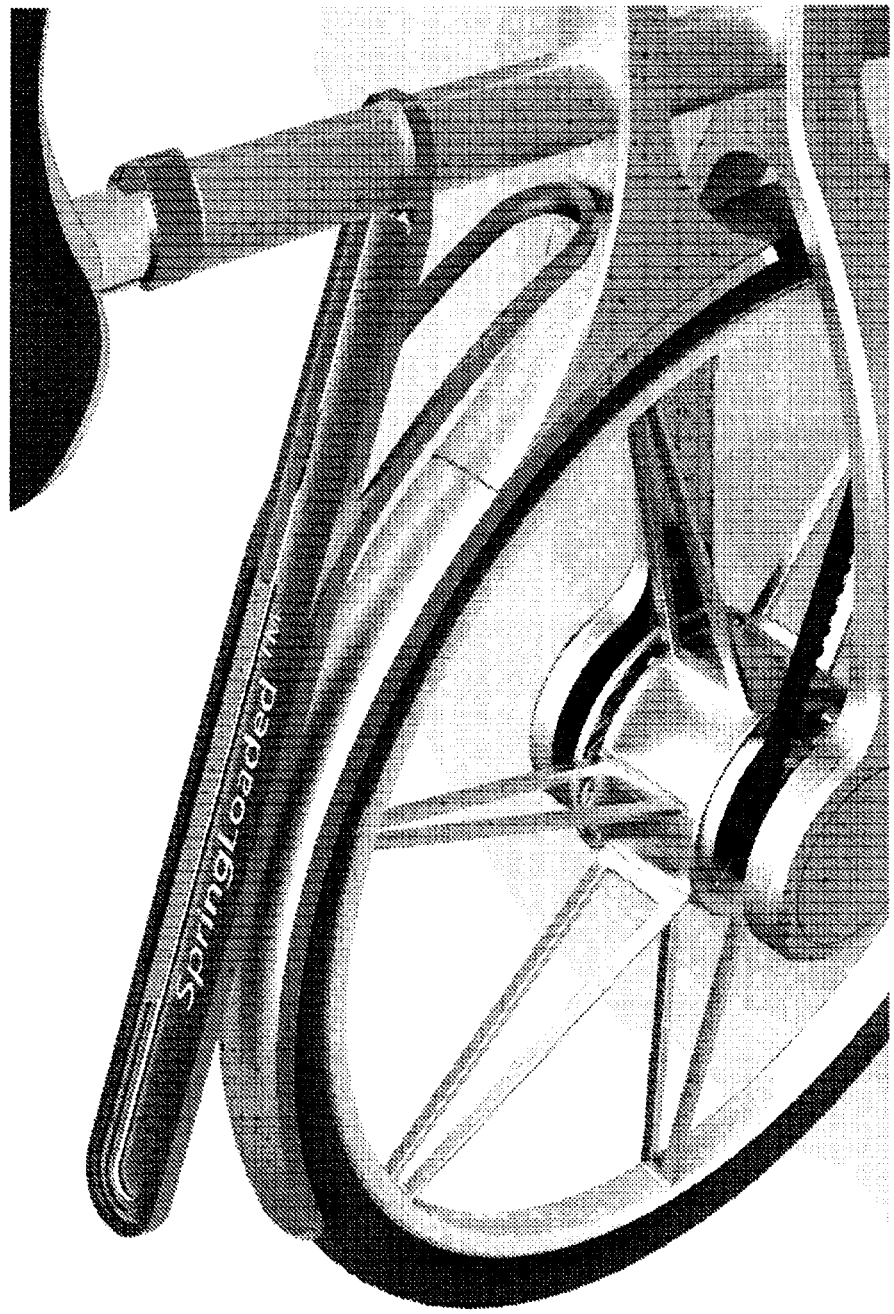
FIG. 54 shows an example of a platform for mounting accessories above a rear wheel of a bicycle system.
Figure 55B:
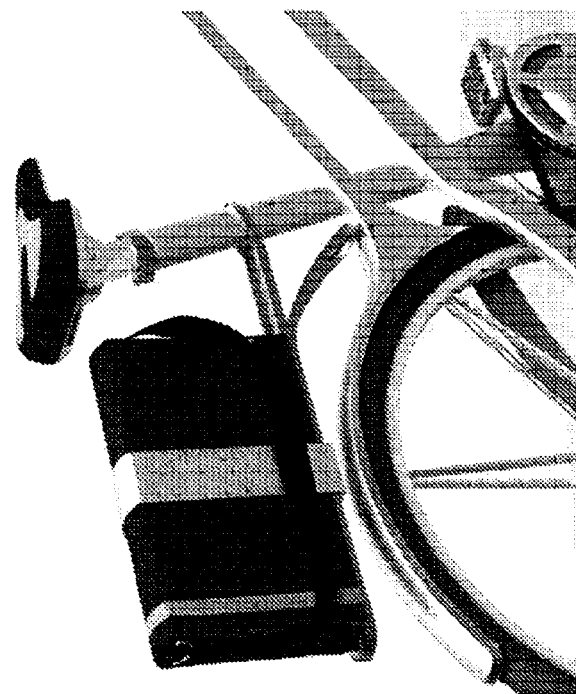
FIG. 55b shows an example of a platform for mounting accessories above a rear wheel of a bicycle system, in a loaded configuration.
Figure 55A:
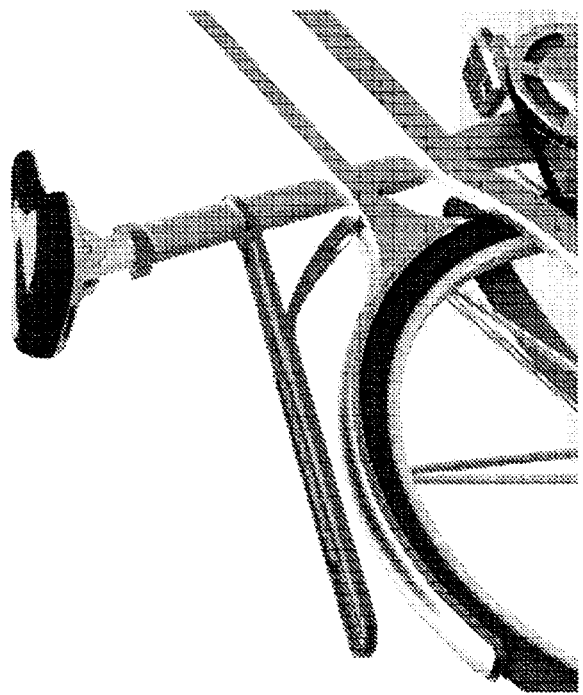
FIG. 55a shows an example of a platform for mounting accessories above a rear wheel of a bicycle system, in an unloaded configuration.

SpringLinc™
    Frame-integrated, retractable "smart cable" used to secure the bicycle system to bike racks, light poles, and other street furniture
    If severed, SpringGuard:
    Detects SpringLoc state and activates if required
    Alerts user via SMS/SpringApp notification
    Triggers theft alarm
    An example of a retractable cable which has been used to secure a bicycle system to a bicycle stand is shown in FIG. 50.
SpringApp's 'Find' feature
    Provides lost or stolen bicycle system location tracking, via SpringSmart's transceiver module, smartphone Maps, and other third party provider data.
    Enables users to remotely trigger SpringGuard's theft alarm.
    FIG. 24, FIG. 25, FIG. 26, FIG. 27a and FIG. 27b show examples of screen output which relate to lost or stolen bicycle system location tracking.
SpringNanny™
    SpringPorted Device monitoring.
    Sounds a series of short horn blasts via SpringBeep to alert a user who fails to remove his/her Device within a pre-established period of time after engaging the bicycle system's kickstand.
Industrial Design
    Integration and/or customization of the bicycle system high-value components deters thieves who specialize in stripping bikes, as components are both difficult to remove and will not readily fit models from other brands.
    SpringGuard's layered approach to theft deterrence is calculated to make the bicycle system the least desirable cycle amongst bike thieves. Successfully executing a bicycle system theft will involve a much higher level of risk than that associated with any other bicycle model. Additionally, if a bicycle system is stolen, the thief ends up with a bike that cannot be ridden; components that have little value; and markedly higher exposure to criminal prosecution due to 'Find''s tracking feature.
Maintenance
    Many of today's cyclists are unfamiliar or uncomfortable with performing routine maintenance and repairs on their bikes. They rely on third party bike shops to fulfill this function, often waiting until a component fails catastrophically to seek assistance, when performing maintenance in a more expeditious manner would have saved time and money.
    While some user interaction is still required on maintenance, repair, and replacement issues, in an example the bicycle system takes much of the stress of its upkeep out of users' hands by monitoring wear on essential components and providing notification if attention is required. Additionally, a user may contact SpringCycles for assistance via remote diagnosis, thus adding an additional layer of comfort that a user's bicycle system will be kept in top condition.
Status
    In an example, SpringApp's 'Status' feature is a user's primary source of maintenance-related information. 'Status' may leverage SpringSmart's algorithmic analysis of SpringSense-captured data to predict wear experienced by a bicycle system's CVT, brakes, wheels, tires, SpringPort, and electrical components. 'Status' may then utilize this predictive data to provide a user with detailed status reports on key components, along with maintenance recommendations for each. 'Status' may also track maintenance, repairs and replacements performed and auto-notify users of required or scheduled maintenance via SpringCom's notice lights and SMS notifications. Other than in cases of emergency, maintenance notifications may be batched and sent when a user's Device is not SpringPorted. 'Status' may additionally act as a repository for warranty eligibility reports generated by SpringSmart from SpringSense-captured data. Warranty reports accessed through SpringApp cover frame-stress levels experienced, distance traveled, and hours of usage. SpringApp's 'Status' feature may also allow a user experiencing system issues to request remote diagnosis from the SpringCycles' bicycle system Assistance Program ("CAP"). CAP personnel can then determine if and when components need to be serviced, replaced, or repaired.
SpringApp's 'Status' Feature
    An App running on a smartphone which is docked to the bicycle system may provide a status screen which shows maintenance data which relates to the bicycle system. A selectable touch screen icon may be provided which if selected by a user provides further maintenance data which relates to the bicycle system. A selectable touch screen icon relating to a bicycle system component may be provided which if selected by a user provides maintenance instructions which relate to the bicycle system component. An example of a status screen which shows maintenance data which relates to the bicycle system is shown in FIG. 51. An example of a sample of a sequence of screen output provided in response to selection of a selectable touch screen icon relating to a bicycle system component in which maintenance instructions which relate to the bicycle system component are provided is shown in FIG. 52a and in FIG. 52b. A swipeable sequence of screen output may be provided in response to selection of a selectable touch screen icon relating to a bicycle system component in which maintenance instructions which relate to the bicycle system component are provided. Examples of screen output provided in response to selection of a selectable touch screen icon, which if selected by a user provides further maintenance data which relates to the bicycle system, is shown in FIG. 53a, FIG. 53b, FIG. 53c, and FIG. 53d. A selectable touch screen icon may be provided to send a report to a central reporting server. An example is shown in FIG. 53d. A confirmation screen may be provided for a user to confirm that the user wants to send a report to a central reporting server. An example is shown in FIG. 53e.
Accessories
    While the bicycle system is loaded with features, many users will want to either personalize their bicycle system or better adapt certain features to their specific needs by adding certain accessories. SpringCycles may support users through its SpringLoaded™ licensing program.
SpringLoaded™
    The bicycle system's unique industrial design presents a robust platform for mounting a range of accessories. Third party developers committed to matching the bicycle system's elegance, functionality, and rigorous quality standards may receive a license to produce accessories carrying the SpringLoaded mark. SpringLoaded accessories may be available for purchase at launch.
    A platform for mounting accessories may be provided above a rear wheel of the bicycle system. The platform may be a platform which is elongate in the direction from the saddle to the rear of the bicycle system. The platform may include a recess for receiving an accessory, wherein the recess extends along the elongate platform. The platform may be in attachment with a saddle support. The platform may include a spur arranged to abut against a frame of the bicycle system, the spur providing support for the platform in a loaded configuration of the platform. An example is shown in FIG. 54. An example of a platform in an unloaded configuration is shown in FIG. 55*a*. An example of a platform in a loaded configuration is shown in FIG. 55*b*.

Packaging

"Unboxing" can be a delightful bonding moment between user and product. The bicycle system's packaging, Spring-Box™, is designed to provide that very experience.

SpringBox™

While sealed, SpringBox's premium materials, construction, and graphic design combine to powerfully signal that SpringBox contains something special. Users will also note that SpringBox is extremely easy to open—in an example, three turns with a medium-sized coin inserted into Spring-Box's quick-release locks is all that is required. SpringBox may then open from the top and one side to display its contents.

Figure 56:
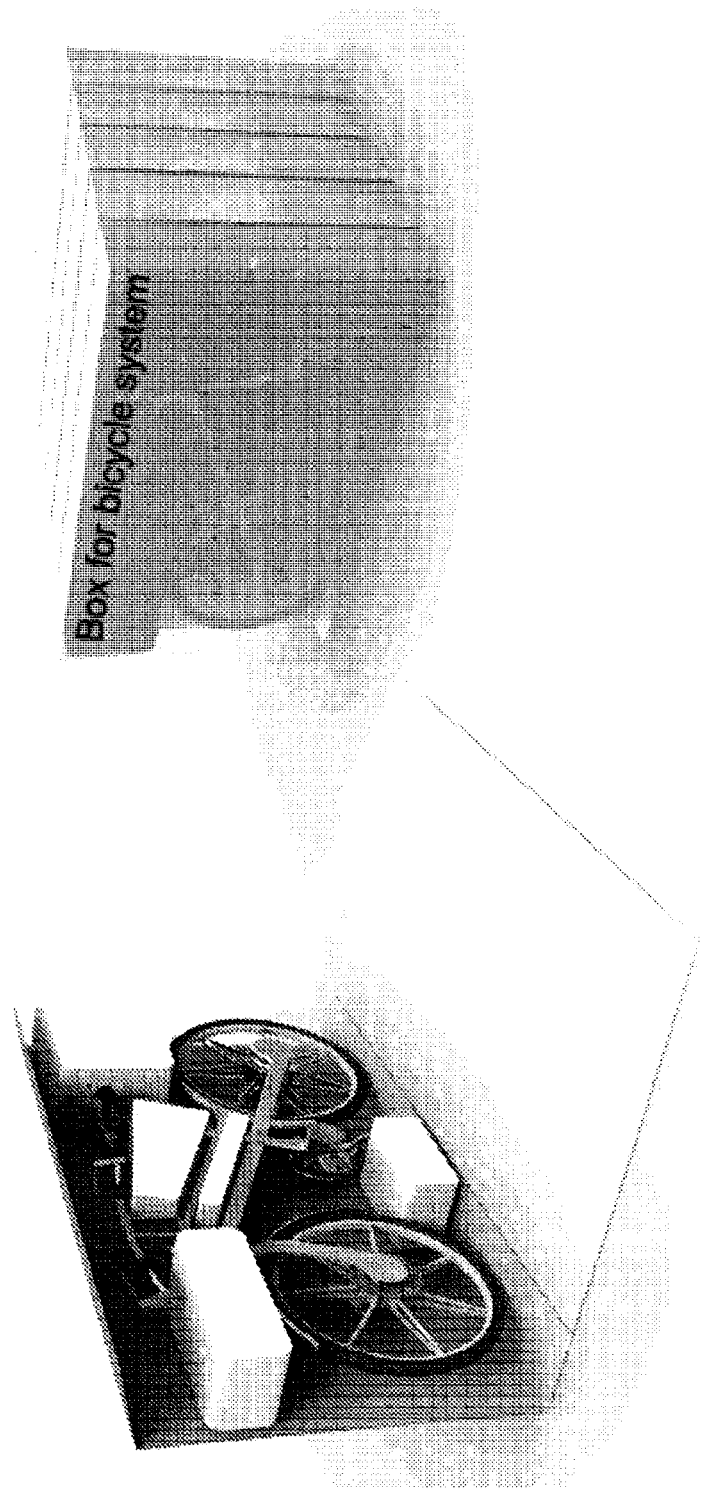
FIG. 56 shows on the left hand side an example of a bicycle system's packaging in an open configuration.

While the newly revealed bicycle system will understandably take center stage, users will, if only subconsciously, sense the care and attention to detail put into ensuring each bicycle system arrives in pristine, ready-to-ride condition. Users will note the precisely fitted bio-foam insets used to fully isolate and protect the bicycle system from even excessive mishandling during transport. They will also recognize that SpringBox is far more than mere packaging, that it is actually a valuable accessory intended to be used on an ongoing basis for storage and/or future transport needs. An example of a bicycle system's packaging in an open configuration is shown on the left hand side of FIG. 56. An example of a set of five bicycle systems' packaging in a closed configuration is shown on the right hand side of FIG. 56.

Users will be relieved to find an absence of zip-ties, twist-ties, and the virtually indestructible plastic packing materials so common in consumer products. In fact, the same coin used to open SpringBox may release its internal fastenings, allowing the bicycle system to be removed with a gentle tug. Initial setup may then proceed in the following manner:

- Adjust handlebars from "Stow" (parallel to frame) to either the "Speed" or "Comfort" position (both perpendicular to frame)
- Adjust pedals from their vertical shipping position to a horizontal ride position
- Adjust seat and handlebar height.
- Launch SpringApp's 'Synch' feature and follow its step-by-step, initial smartphone Device/bicycle system pairing instructions.

In an example, by delivering a fully assembled bicycle system (including nitrogen-filled tires and partially charged batteries), SpringBox ensures a user can enjoy their first ride within 30 minutes of beginning the unboxing process.

Remarks

Having reached this stage, we hope you agree that the bicycle system is the bike consumers want. We have shown how the bicycle system makes a smartphone integral to its unprecedented feature-set and, consequently, to how consumers will see it complementing and enhancing their lives. We have also demonstrated how navigation, security, and ride quality can all become groundbreaking innovations in their own right.

While innovation, artful design, and flawless integration all make us happy, we view them merely as footnotes to fantastic user experiences leading to healthier lifestyles. Our goal is simple—pure delight each and every time a user SpringPorts a smartphone device and rides away.

We look forward to providing the chance for you to take a ride of your own.

Defined Terms

Authenticated smartphone ("Device"), eg. an iPhone 4 or 5, running iOS 6.x or later,
Turn-by-turn navigation ("TBTN")
Electrocardiography ("ECG")
Continuously variable transmission ("CVT")
Carbon monoxide ("CO")
Notice-of-presence ("NOP")
In an example, SpringApp™ is a feature for Connectivity: a smartphone application enabling
  Sensor data and system alerts viewing
  Features execution
  'Synch'
  Device pairing/unpairing
  'Share'
  Guest user sharing
  'Find'
  TBTN
  Lost/stolen the bicycle system tracking
  Remote theft alarm activation
  'Status'
  Component status access
  Maintenance recommendations
  Remote assistance
In an example, SpringApp's™ 'Find' Feature is a feature for Navigation, TBTN via SpringCom, in which the following may occur:
  Arrows communicate direction
  Colors communicate pre-turn information
  Blue
  Displayable while the bicycle system is static
  Provides pre-trip instructions
  Green
  Displayable while the bicycle system is in motion
  Indicates user has progressed halfway or less to next turn
  Amber
  Displayable while the bicycle system is in motion
  Indicates user has progressed halfway or more to next turn
  Red
  Displayable while the bicycle system is in motion
  Indicates that user is to take next turn
  Direction and change in notice lighting color state indicated by haptic vibration in grip corresponding to direction of turn
In an example, SpringApp's™ 'Find' Feature is a feature for Safety: Warnings & Restrictions. Auto-displayed on-screen warnings regarding safe cycling. In-motion access to features restricted to those specifically designated for use while cycling.

In an example, SpringBeep™ is a feature for Safety: Horn & Theft Alarm. Battery-powered, frame-integrated speakers
  Provide audible NOP
  Enable
  SpringNanny
  SpringGuard theft alarm
In an example, SpringBox™ is a feature for packaging. Reusable shipping/storage box
  Coin-turn, quick release locks
  Opens from top and side
  Ensures pristine, ready-to-ride delivery
  Coin-turn, quick release internal fastenings Ensures first ride within 30 minutes, start-to-finish In an example, SpringBrite™ is a feature for Safety: Lighting. Comprehensive lighting system
- Projection § Auto-activated, constant-state path lighting § Frame-integrated
- NOP § Auto-activated, constant-state NOP lights § Integrated into front and rear hubs and rear of saddle
- Indicators § Turn
- Flashing left/right turn signals
- Handlebar-integrated
- Controlled via left-side three-button switch
- Speed reduction
- Automatic increase in brightness of saddle-integrated NOP light to signal reduction in speed.

In an example, SpringCom™ is a feature for Connectivity (Performance: Controls) with a user interface in which the following may be present:
- Handlebar-integrated, left and right side, three-button controls
- Activate/deactivate turn signal lights
- Trigger horn
- Manually activate/deactivate forward-facing projection light
- Regulate pedaling cadence
- Haptic feedback via handlebar grip-embedded vibration motors
- Notifications via SpringPorted Device In an example, SpringDrive™ is a feature for performance: drivetrain, in which the following may be present:
- Rear hub-integrated CVT
- Carbon fiber belt
- Custom, weather-resistant sprocket and pulley profiles
- Battery-powered, wireless, auto-manual CVT torque adjustment executed either via auto-adjustor unit mated to CVT or three-button switch integrated into right side of handlebar.

In an example, SpringFlex™ is a feature for Performance: Adjustability with Handlebar orientation adjustment, in which the following may be present:
- User-upright ("Comfort")
- User-forward ("Speed")
- Shipping/storage ("Stow")
- Handlebar height and saddle height/tilt adjustment In an example, SpringGuard™ is a feature for Security: Layered Theft Deterrence, a Layered theft deterrence system, in which the following may be present:
- SpringLoc
- Bottom bracket-integrated auto-lock
- Establishes geo-position upon activation and alerts user to movement greater than a threshold, eg. ten feet
- Optionally, triggers theft alarm
- SpringLinc
- Frame-integrated, retractable cable lock
- Alerts user if severed
- Auto-triggers theft alarm
- SpringApp's 'Find' feature
- Lost/stolen bicycle system tracking
- Enables remote triggering of theft alarm
- SpringNanny
- "SpringPorted" Device monitor
- Sounds horn if kickstand engaged without removal of Device within pre-established period
- Industrial design
- Frame-integrated components not easily removed
- Exposed components customized and will not fit other bike models In an example, SpringNanny is provided:
- "SpringPorted" Device monitor
- Sounds horn if kickstand engaged without removal of Device within pre-established period.

In an example, SpringPort™ is a feature for Connectivity: Device Docking in which a Handlebar-integrated Device docking station is provided. It may have the following characteristics:
- Adaptable for use with Devices via interchangeable polycarbonate trays
- "SpringPorting" Device may prompt a series of auto-executed tasks, including one or more of:
  - Discovering Device's unique identifying code
  - Deactivating theft deterrence system
  - Determining Device's battery state and initiating charging if required
  - Providing Device with access to the bicycle system's "nervous system"
  - Launching the bicycle system's companion smartphone application In an example, SpringSense™ is a feature for Connectivity: Sensors. It may include a battery-powered, frame/handlebar-integrated sensor array, with one or more of:
- Thermometer
- CO sensor
- ECG
- Humidity sensor
- Odometer
- Speedometer
- Accelerometer
- Magnetometer
- GPS
- Gyroscope
- Light sensor
- Wear monitor In an example, SpringSmart™ is a feature for Connectivity: "Nervous System". It may include a frame-embedded nervous system, comprising one or more of
- Processor
- Transceiver module
- Antennas
- System memory
- Flash memory
- Sensor array In an example, SpringSmart™ is a feature for Health: Freeze Alert. It may include temperature monitoring via SpringSense. Alert notices may be provided via SpringApp when ambient temperature drops below 37° F./3° C.

In an example, SpringSmart™ is a feature for Health: Carbon Monoxide Alerts. It may include Carbon monoxide monitoring via SpringSense. Alert notices via SpringApp may be provided.

In an example, SpringSmart™ is a feature for Health: Third Party Developers. SpringSense data may be made available to third party developers to encourage creation of health-related applications.

In an example, SpringSmart'sTM 'Status' Feature is a feature for Maintenance. Maintenance-related information may provide
- Predicts components wear
- Provides status reports and recommendations
- Tracks maintenance, repairs and replacements
- Stores warranty eligibility data
- Supports remote diagnosis In an example, SpringSparc™ is a feature for Power: Generation Charging & Storage. An energy generation, storage, and charging system may include one or more of:

50 W lithium ion primary battery
MFi-compliant 5 W lithium ion secondary battery
2 W lithium ion tertiary battery
On-frame DC charging point
Country-specific, AC/DC 12V/90 W charger Design Comments Relating to Example Bicycle Systems TechnoCraft The exploration of design themes and identification of vital focal points was required at inception in order for the design team to attain the balance of aesthetics, performance, and ergonomics called for in the bicycle system's design brief. The brief's requisite blend of modernism with traditionalism, technology with craft, was met through a harmonious interdisciplinary approach formed by design and engineering. Working together required each group to consider all major bike nodes (seating, pedaling, transmission, handlebars, steering tube, etc.) from the other's perspective. Moreover, it ensured that the bicycle system embodied what came to be known as "TechnoCraft".

Frame, Forks & Fenders

"Linear Fluency" informed the overall look and feel of the bicycle system's frame. The frame's strong linear lines "spill" onto fenders, integrating them visually into the frame.

Crank & Kickstand

The crank is the central hub for a number of the bicycle system's design elements. It is suspended from the frame to create an iconic silhouette. Careful consideration was also given to the type of kickstand to be used, and after extensive testing, a crank-stand was found to be the most effective from an engineering standpoint, while it also proved to be the most complementary with the bicycle system's frame design.

SpringCom

High content absorption and low distraction were the touchstones for SpringCom's user/bike interface. Device placement, therefore, was key, as were adjustability, comfort, and user stimulus. Careful attention was given to control switch manipulation and finger articulation. User interaction with the bicycle system was carefully considered and included ideas such as a combination of haptic feedback and light-based notices. "Notification fatigue" and distraction were also a concern, and various methods of stimuli to address, inform, and warn were considered.

Saddle & Seat Post

The bicycle system's saddle design balances intelligence and style. Moreover, due to the saddle's role as a key user/bicycle system interface, ergonomic analysis was required to create a design that would deliver all-day comfort as well.

The bicycle system's seat post design seamlessly integrates directly into the bicycle system's unique frame shape. This results in the seat post fitting the bicycle system exclusively and, consequently, making it less desirable to those thieves who specialize in stripping bikes of valuable components. The seat post also integrates a PTFE bearing material to reduce friction and wear, thus enhancing user experience by eliminating the aggravating sticking aspect of traditional systems.

The bicycle system may include a Frame-integrated accelerometer/magnetometer/GPS/gyroscope sensor module capturing location, velocity (i.e. direction and rate of travel) and acceleration data.

The bicycle system may include a Frame-integrated transceiver array, comprising General Packet Radio Service (GPRS), Enhanced Data rates for GSM Evolution (EDGE), Universal Mobile Telecommunications System (UMTS), GPS, and High Speed Packet Access (HSPA), and providing wireless connectivity.

The bicycle system may include Bike configuration adjustability enabled by:
1) Headset-integrated mechanism offering three handlebar positions:
    a) "Comfort" for upright, low-to-mid velocity riding.
    b) "Speed" for forward, higher-velocity riding
    c) "Stow" for shipping/storage, with handlebar arranged parallel to top tube.
2) Height adjustments on the handlebars and height/tilt adjustments on the seat.

The bicycle system may include Frame-integrated, customerized antennas enabling transceiver array.

The bicycle system may include a Quiet, durable, carbon fiber-based drive system providing efficiency of traditional chain system but without need for lubrication, adjustment, or other maintenance. Mechanical Elements may include a Carbon-fiber belt.

The bicycle system may include a Frame-integrated Battery-powered, Bluetooth/BluetoothLE module providing connectivity for torque adjustment, sensors, CVT, processor module, and app.

The bicycle system may include a Frame-integrated Battery-powered, retractable cable lock. May alert rider via SMS if severed while in locked position and auto-triggers theft alarm. Autoactivated/de-activated upon lock engagement/disengagement.

The bicycle system may include a SpringPort-integrated mirror/lens component leveraging Device camera for in-ride image/video capture.

The bicycle system may include a Frame-integrated Battery-powered, sensor capturing ambient carbon monoxide levels, reporting to processor module for display via app, and triggering warning alerts via handlebar.

The bicycle system may include a Rear hub-integrated Gearless, variable planetary drivetrain utilizing rotating/tilting balls positioned between the input component (from the belt drive) and the output component (the wheel) of the transmission, and/or CVT-integrated torque, speedometer, and odometer sensors provide data to processor module via Bluetooth low energy (BTLE) for processing and subsequent display via app.

The bicycle system may include handlebar-integrated Battery-powered controls integrated into left/right sides of handlebar. Left controls may activate/deactivate turn indication lighting, horn, as well as provides MFi-compliant app navigation and execution.

Right controls may provide:
1) Step-less up/down CVT torque adjustment.
2) Image/video capture via Device.

The bicycle system may include a Frame-integrated Battery-powered auto-lock located at bottom bracket. Auto-activated/deactivated upon Device insertion into/removal from dock.

The bicycle system may include a SpringPort, kickstand, Battery-powered, Device-left-in-SpringPort alert via horn-blast issued if kickstand is engaged without removal of SpringPorted Device within preestablished period.
1) Auto-enabled/disabled upon Device insertion into/removal from SpringPort.
2) Countdown auto-initiated by kickstand engagement.

The bicycle system may include a Handlebar-integrated Battery-powered, sensors capturing bioelectrical cardiac activity and reporting to processor module for display via app and/or use by third party apps.

The bicycle system may include a Frame-integrated power generation/storage system consisting of kinetic generators, batteries, female DC power port (with included AC/DC charger). Power budget managed by processor module, which activates/deactivates sensors according to app data requirements and ensures MFi-compliant Device charging. App displays battery state, charge progress, and time-to-depletion, along with Device battery level in standard upper-right position. Battery levels/condition accessible via remote diagnostics.

The bicycle system may include a Handlebar-integrated Battery-powered vibrator motors providing touch-based messaging in response to input from app and/or third party applications present on SpringPorted Device. May support turn-by-turn navigation, alerts, and Device notifications from third party applications.

The bicycle system may include a Frame-integrated Battery-powered sensor capturing ambient humidity, reporting to processor module for display via app.

The bicycle system may include an application eg. an iOS application e.g. Compatible with iPhone 4/5 running iOS 6.x or later.

The bicycle system may include a Handlebar-integrated Battery-powered, IP65-compliant (vibration, moisture, dust resistance) aluminum-bodied docking station, with touch-capacitive Lexan optical grade cover, silicone perimeter seal, and rider interchangeable iPhone 4/5/iPod Touch (4) compatible polymer-overlaid tray inserts.

The bicycle system may include a Frame-integrated Battery-powered sensor capturing ambient light levels and reporting data to processor module.

The bicycle system may provide SpringCom and Device-displayed alerts generated by processor module based on frame-integrated sensor array data.

The bicycle system may include a Battery-powered, high-intensity lighting system comprising:
 a) Handlebar-integrated, amber lights providing constant-state NOP to motorists, cyclists, and pedestrians in proximity to the bicycle system.
 i) Auto-enabled/disabled upon Device insertion into/removal from SpringPort.
 ii) Auto-activated by processor module when ambient light conditions fall below pre-established levels.
 b) Rear-facing, saddle-integrated red lights providing constant-state NOP to motorists, cyclists, and pedestrians in proximity to the bicycle system.
 i) Auto-enabled/disabled upon Device insertion into/removal from SpringPort.
 ii) Auto-activated by processor module when ambient light conditions fall below pre-established levels.
 c) Frame-integrated, front-facing white/rear-facing red lights providing constant-state NOP to motorists, cyclists, and pedestrians in proximity to the bicycle system.
 i) Auto-enabled/disabled upon Device insertion into/removal from SpringPort.
 ii) Auto-activated by processor module when ambient light conditions fall below pre-established levels.

Such a feature may be all or partly, SpringPort-integrated, Hub-integrated, Saddle-integrated or Handlebar-integrated.

The bicycle system may include a Handlebar-integrated Battery-powered, riderfacing, high-intensity multi-colored lights providing visual notifications in response to input from app and/or third party applications present on SpringPorted Device. Supports turn-by-turn navigation, ECG alerts, and device notifications from third party applications.

The bicycle system may include a Frame-integrated Battery-powered, rear hub-integrated sensor capturing trip and aggregate distance traveled and reporting to processor module for display via app.

The bicycle system may include Bike sharing via owner-configurable profiles.

The bicycle system may include a SpringPort-integrated Battery-powered, forward-facing, frame-integrated high-intensity white route lighting for low-light conditions.
 a) Auto-enabled/disabled upon Device insertion into/removal from SpringPort.
 b) Auto-activated by processor module when ambient light conditions fall below pre-established levels.
 c) Receives priority power supply over all other systems to ensure optimal lighting.

The bicycle system may include Rider-permissioned systems accessed by manufacturer to diagnose issues with battery, antenna, GSM functionality.

The bicycle system may include a Shipping box facilitating delivery of fully assembled units.

The bicycle system may include a Frame-integrated Battery-powered, frame-integrated speaker:
 1) Acts as extension of Device speakers allowing rider to safely listen to music.
 2) Provides rider with audible NOP capability (i.e., a horn).
 3) Enables forgotten Device alert.

The bicycle system may include a Frame-integrated Saddle-integrated, rear-facing, high-intensity flashing red light providing speed reduction indication to motorists, cyclists, and pedestrians in proximity to the bicycle system.
 a) Auto-enabled/disabled upon Device insertion into/removal from SpringPort.
 b) Activated via accelerometer-measure reduction of X % in speed over Y distance.

The bicycle system may include a Frame-integrated Battery-powered, front hub-integrated sensor capturing bike speed and reporting to processor module for display via app.

The bicycle system may include a Frame-integrated Battery-powered, frame-integrated sensor capturing ambient temperature, reporting to processor module for display via app, and triggering freeze warning alerts via handlebar.

The bicycle system may include a Handlebar-integrated Battery-powered, wireless, auto-manual CVT torque adjustment executed either via auto-adjustor unit mated to CVT or three-button switch integrated into right side of handlebar.

The bicycle system may include a Handlebar-integrated Battery-powered, high intensity amber lights providing flashing left/right turn indication to motorists, cyclists, and pedestrians in proximity to the bicycle system.
 a) Auto-enabled/disabled upon Device insertion into/removal from SpringPort.
 b) Activated via switch integrated into left-side of handlebar.

The bicycle system may include a Handlebar-integrated Battery-powered, handlebar-integrated, turn-by-turn navigation via synergistic combination of haptic feedback and SpringApp notification.

The bicycle system may include a SpringPort-integrated Battery-powered, USB connector enabling SpringPorted Device charging and connectivity to app and sensors.

The bicycle system may include a Frame-integrated Algorithmic wear prediction of CVT, brakes, battery, all electrical components by processor module based on frame-integrated sensor array data, with subsequent display via app and/or use by third party apps, and/or triggering warning alerts via handlebar.

Figure 57:
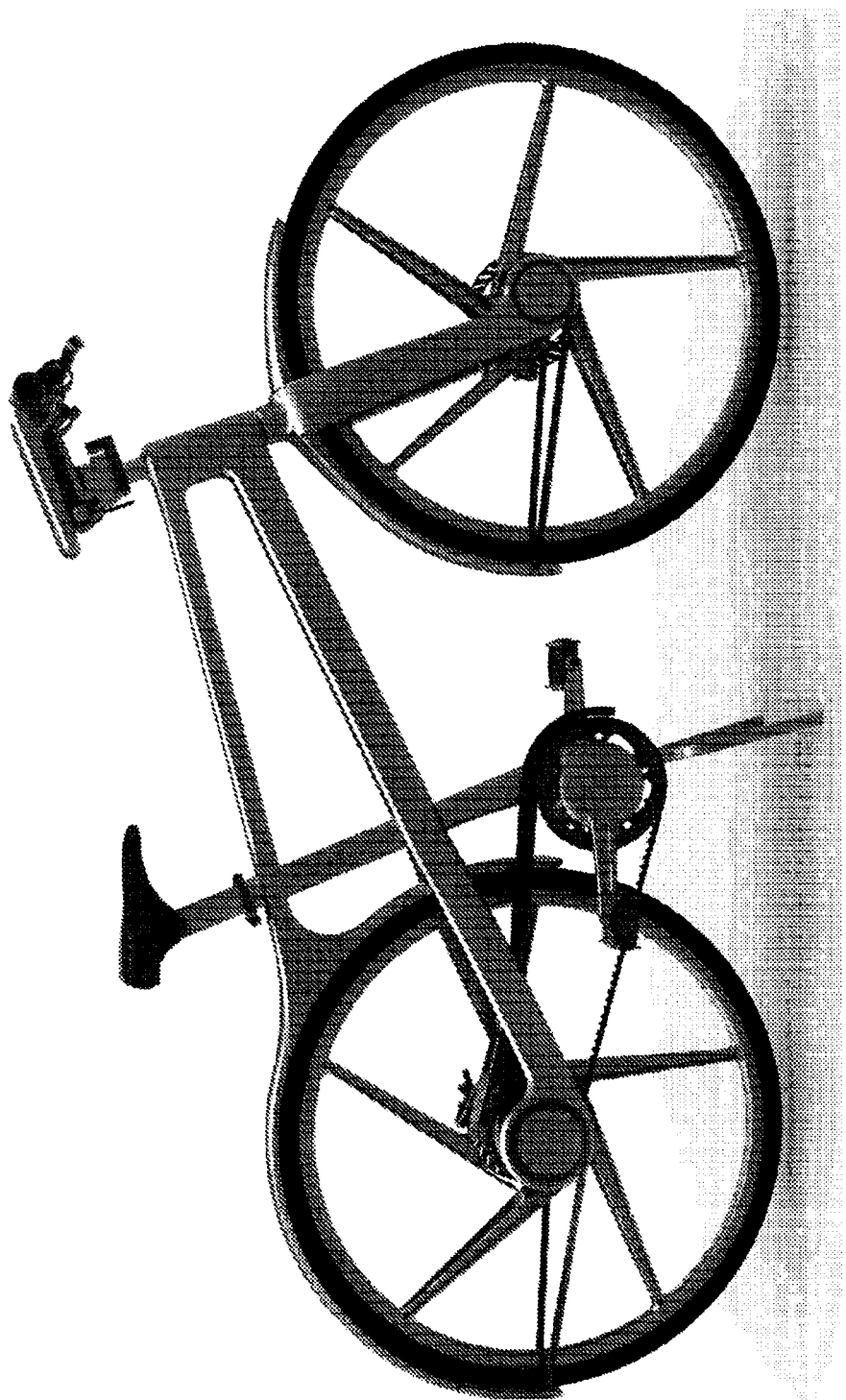
FIG. 57 shows an example of a bicycle system in a parked configuration.
Figure 58:
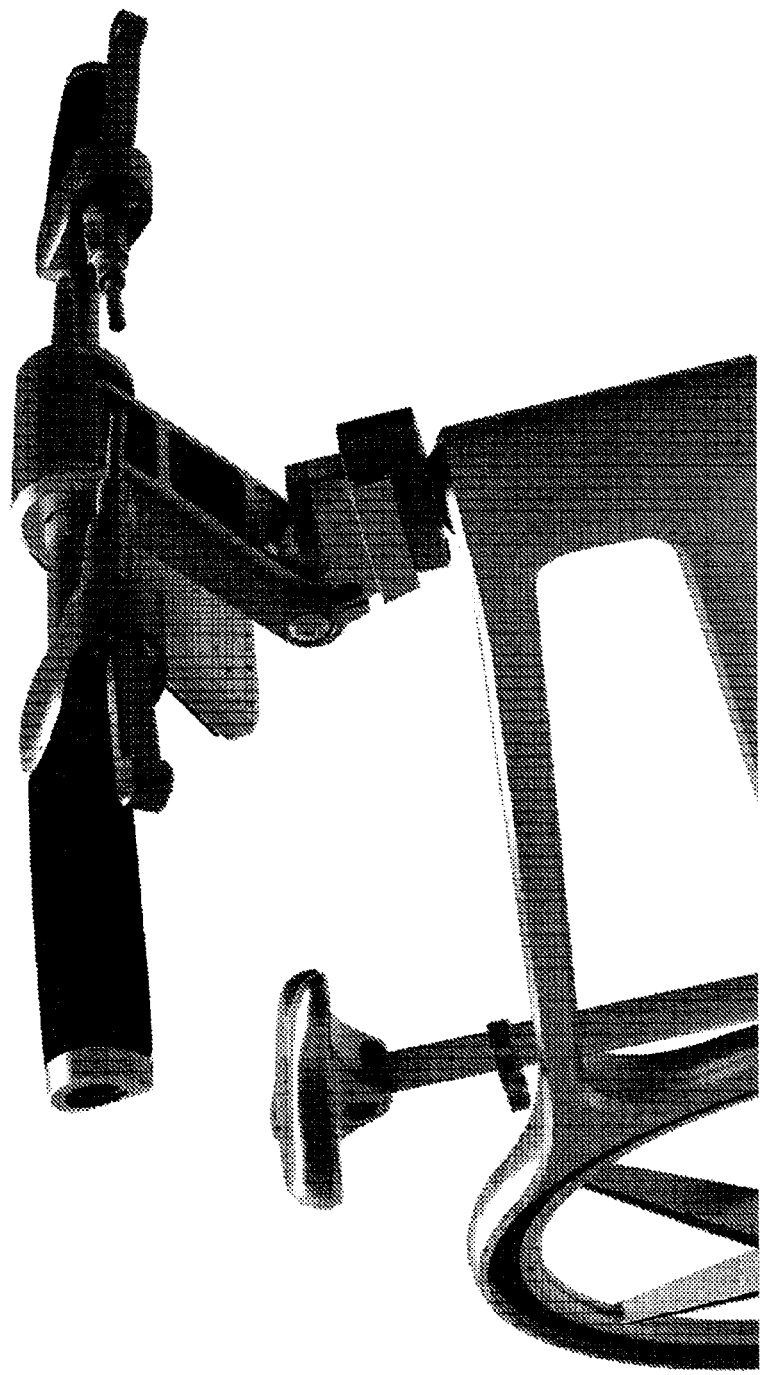
FIG. 58 shows a front right side view of an upper part of an example of a bicycle system.
Figure 59:
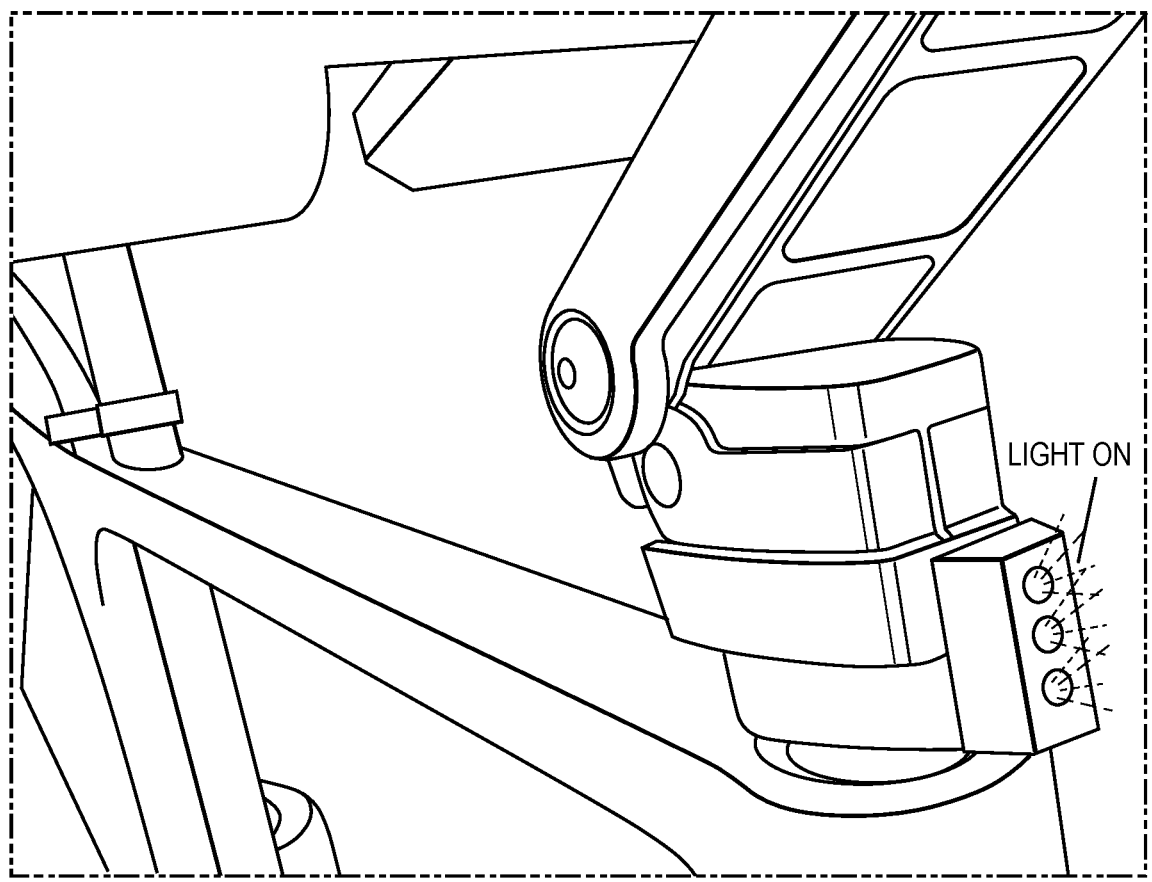
FIG. 59 shows an example of a front right side view of detail of a bicycle system, showing in particular an illuminated front light of the bicycle system.
Figure 60:
FIG. 60 shows detail of a left handlebar and a smartphone holder holding a smartphone of an example bicycle system.

A bicycle system may be parked using a rotatable stand in rotatable attachment with a frame of the bicycle system. An example is shown in FIG. 57 of the bicycle system in a parked configuration. FIG. 58 shows a front right side view of an upper part of an example of a bicycle system. An illuminated front light of a bicycle system may comprise illuminated LED lights. FIG. 59 shows a front right side view of detail of a bicycle system, showing in particular an illuminated front light of the bicycle system, the illuminated light comprising illuminated LED lights. FIG. 60 shows detail of a left handlebar and a smartphone holder holding a smartphone of an example bicycle system.

Figure 61:
FIG. 61 shows part of a bicycle system including handlebars and a smartphone holder with a lid in an open configuration, the smartphone holder arranged to receive a smartphone, of an example bicycle system.

A smartphone holder of a bicycle system may include a lid that is openable to receive a smartphone, and openable to remove a previously received smartphone. FIG. 61 shows part of a bicycle system including handlebars and a smartphone holder with a lid in an open configuration, the smartphone holder arranged to receive a smartphone, of an example bicycle system.

Bicycle Hubs and Hubcaps

A bicycle hubcap is a cover, such as a metal or plastic cover, for the hub of a bicycle's wheel. A bicycle system may include one or more bicycle hubcaps.

Figure 62:
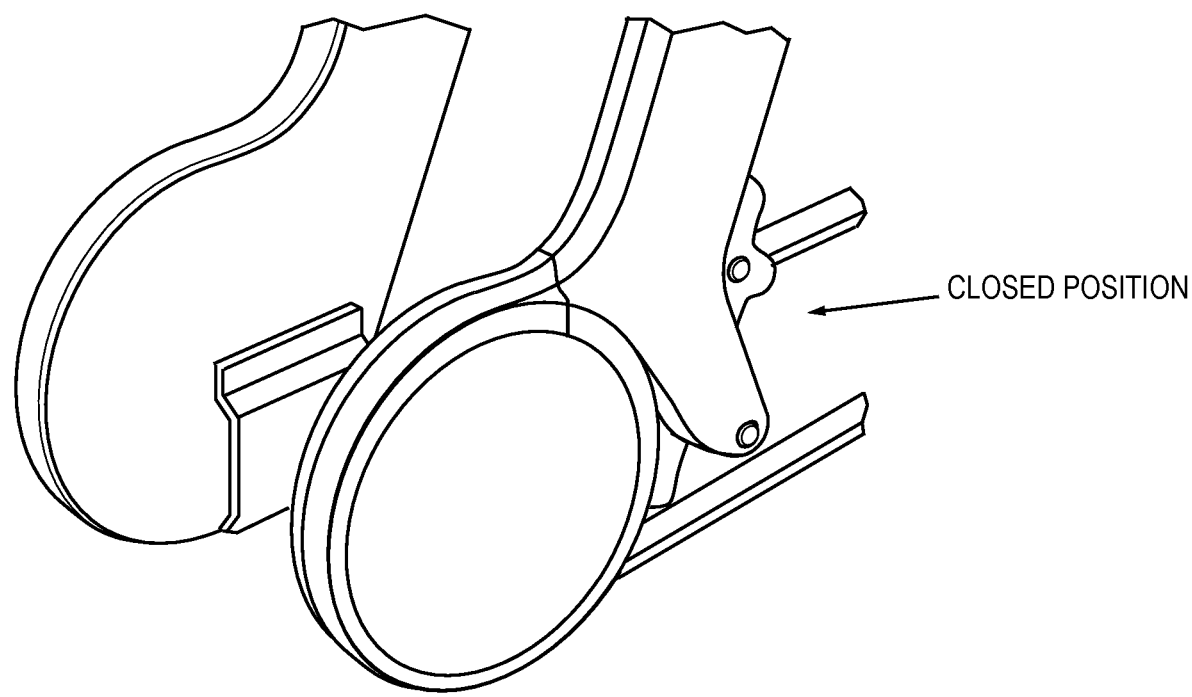
FIG. 62 shows an example of a bicycle hubcap in a closed position.
Figure 63:
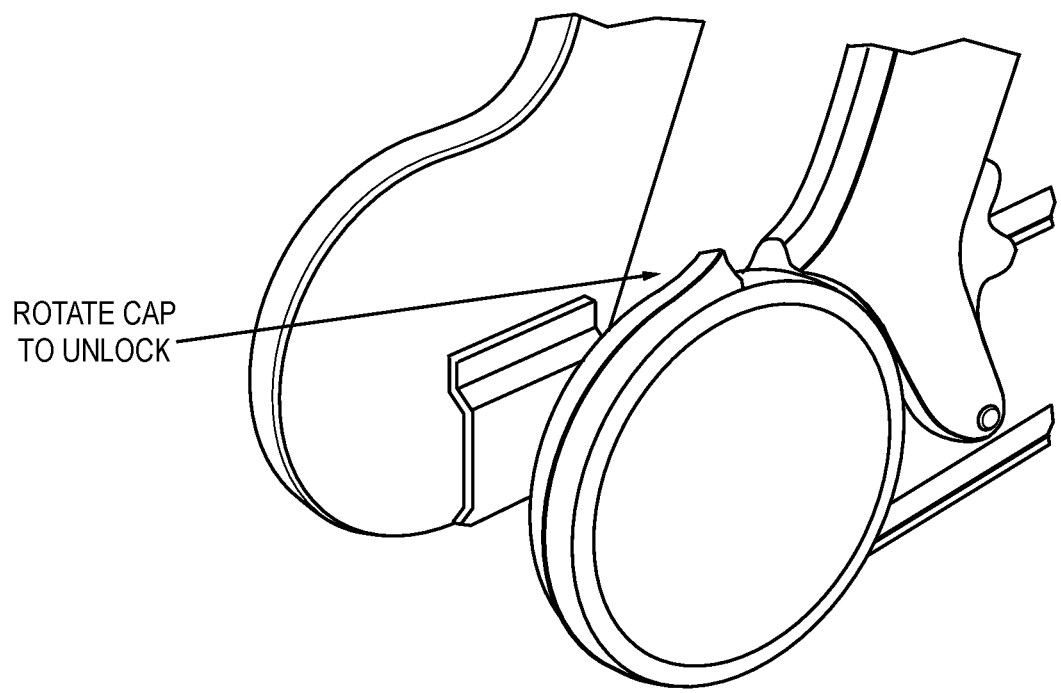
FIG. 63 shows an example of a bicycle hubcap in an unlocked configuration.

There is provided a bicycle hubcap. The bicycle hubcap may rotate around an axis of an axle of a bicycle wheel so as to lock to a hub. The bicycle hubcap may rotate around an axis of an axle of a bicycle wheel so as to unlock from a hub. An unlocked bicycle hubcap may be removable from a hub. A bicycle hubcap may be lockable to a hub. A hubcap can be removed after rotating to unlock. An example of a bicycle hubcap in a closed position is shown in FIG. 62. An example of a bicycle hubcap in an unlocked configuration is shown in FIG. 63.

Figure 64:
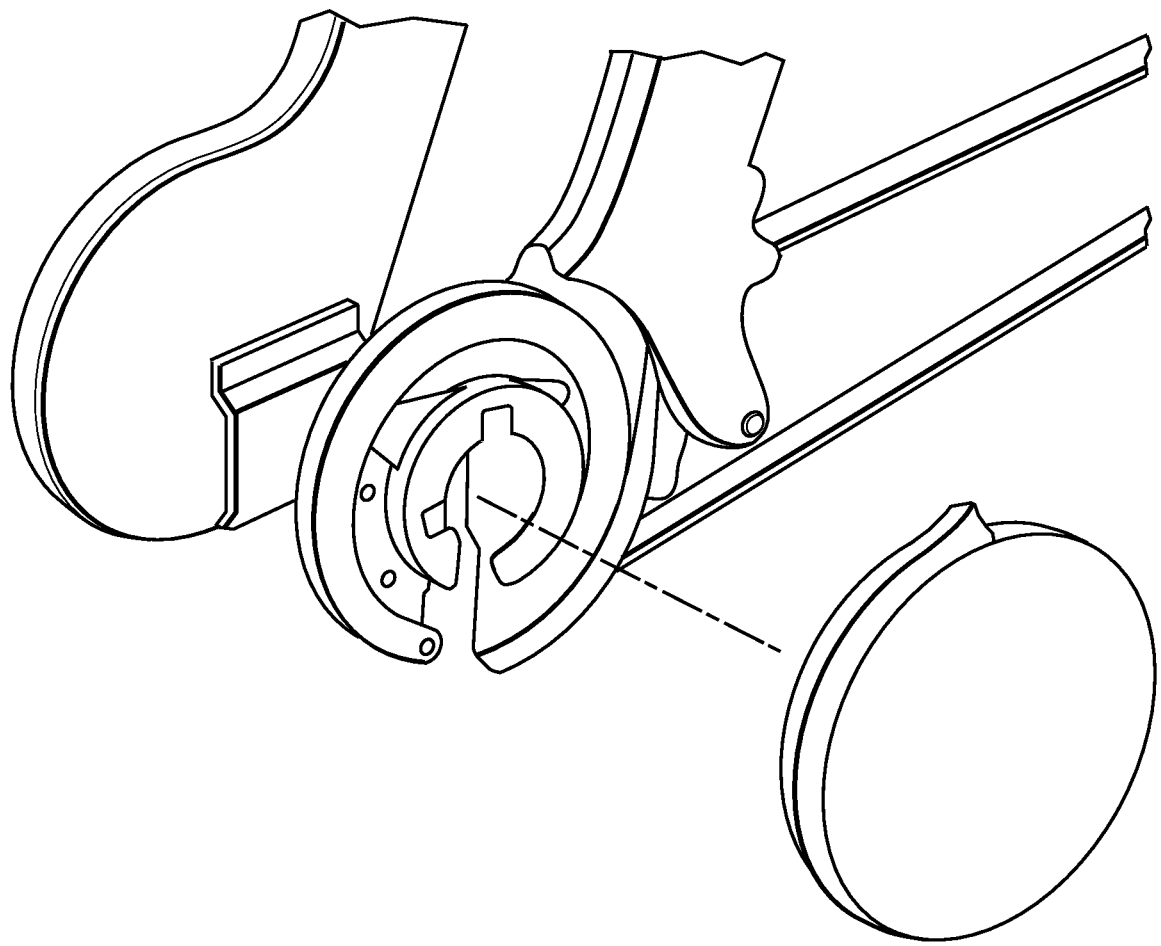
FIG. 64 shows an example of a bicycle hubcap in an unlocked and removed configuration.

A hubcap mounting point may also be an accessory mounting point. A hubcap mounting point may be configured to receive a mountable accessory. Accessories such as a package rack can be mounted directly in place of a hubcap or hubcaps. A complete look of the original part may be maintained. Simple tool-less replacement of the hubcap may be provided, and no extra parts may be needed. An accessory mount point may be available at the front hub or front hubs of the bicycle system. An accessory mount point may be available at the rear hub or rear hubs of the bicycle system. An example of a bicycle hubcap in an unlocked and removed configuration is shown in FIG. 64.

Waterproof Case

There is provided a waterproof case for use with the bike that becomes your everyday case, which is designed to uniquely attach to the bike. The rider won't have to take their phone out of its case, and also makes the bike/phone interface more generic to the model of phone.

Figure 65:
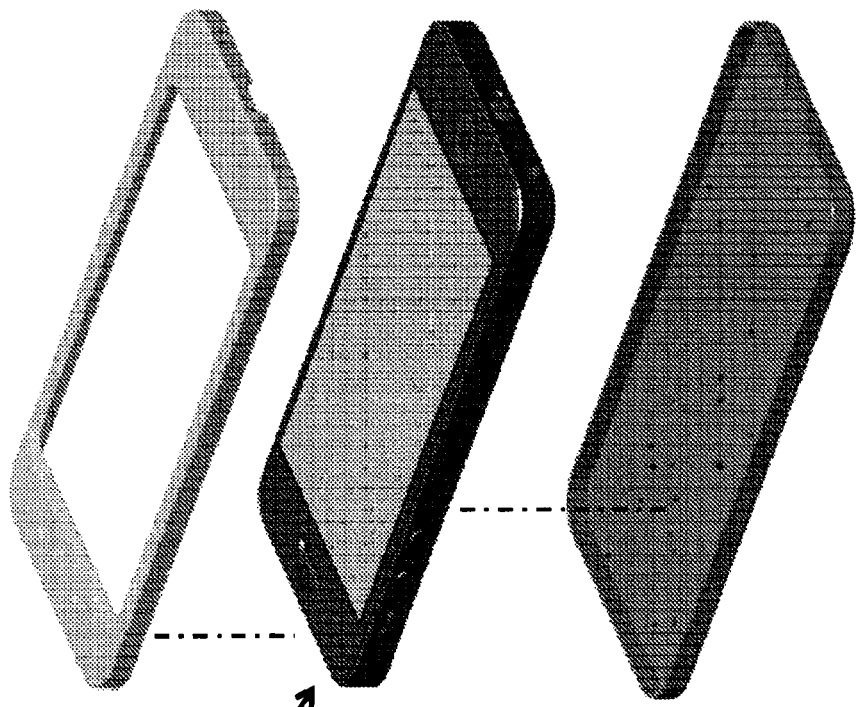
FIG. 65 shows an example of a custom protective carry case for everyday use, and of a handheld device which is insertable into the custom protective carry case for everyday use.
Figure 66:
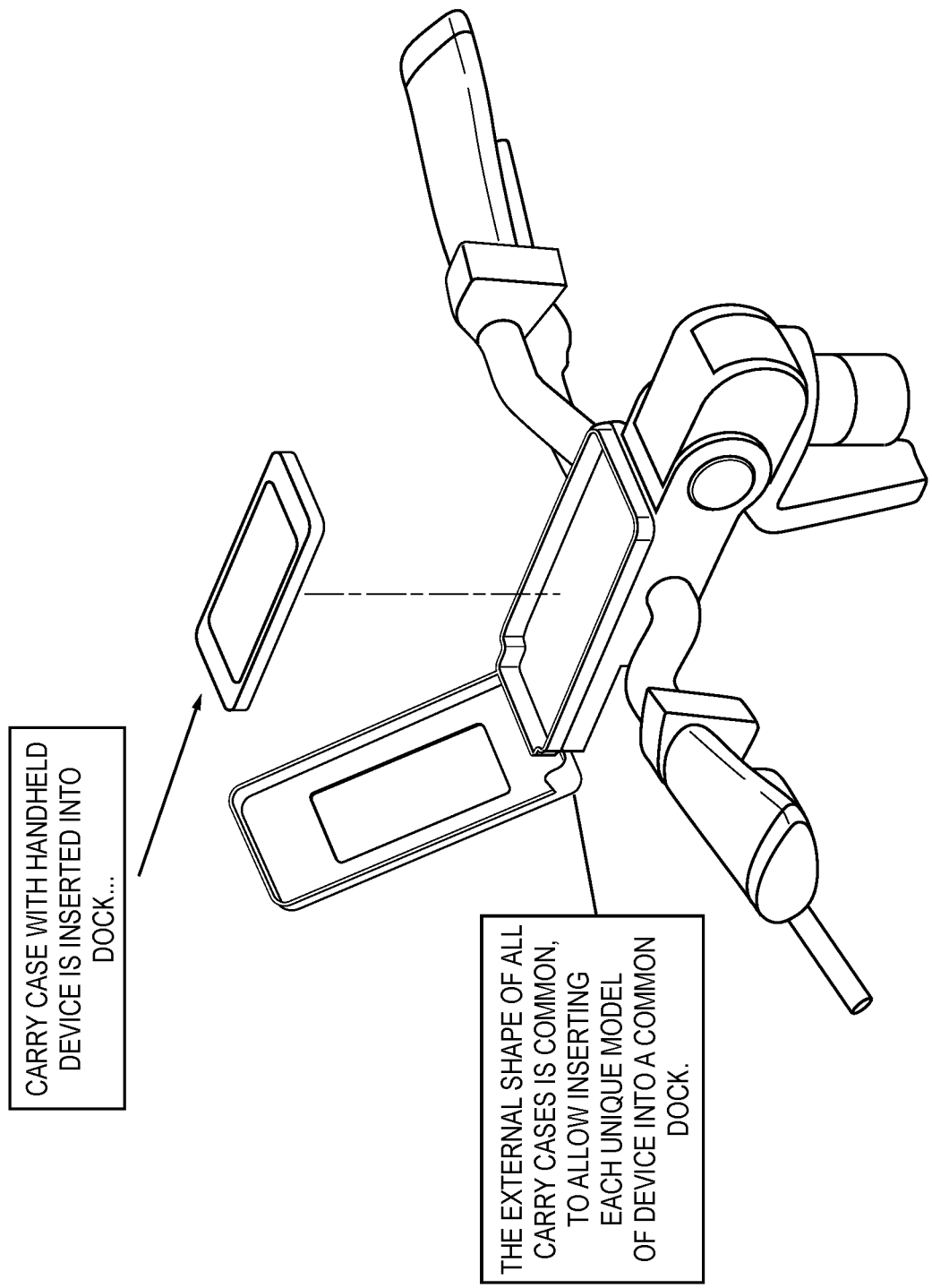
FIG. 66 shows an example of a carry case carrying a handheld device which is insertable into a dock of a bicycle system.

In an example, there is provided a custom protective carry case for everyday use. A handheld device inserts into the custom protective carry case for everyday use. A handheld device uses a unique case designed exclusively for each model of device. The inside of the case is unique to each model of device. An example is shown in FIG. 65. A carry case carrying a handheld device is insertable into a dock of a bicycle system. In this example, an external shape of all carry cases is common, to allow inserting each unique model of device into a common dock. An example is shown in FIG. 66.

Figure 67:
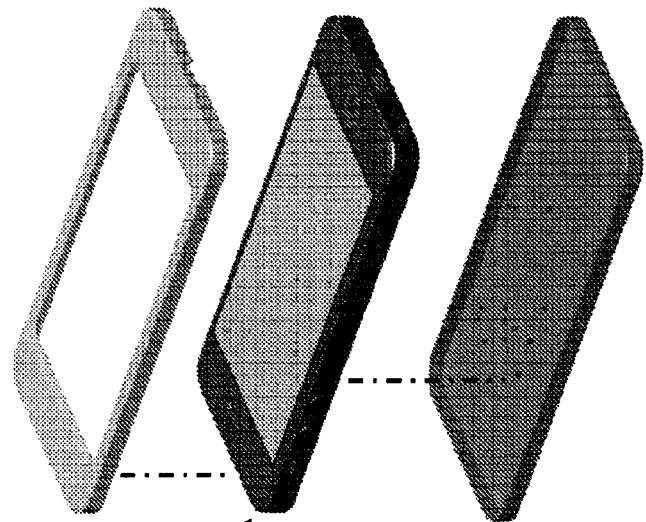
FIG. 67 shows an example of a custom protective carry case for everyday use, and of a handheld device which is insertable into the custom protective carry case for everyday use.
Figure 68:
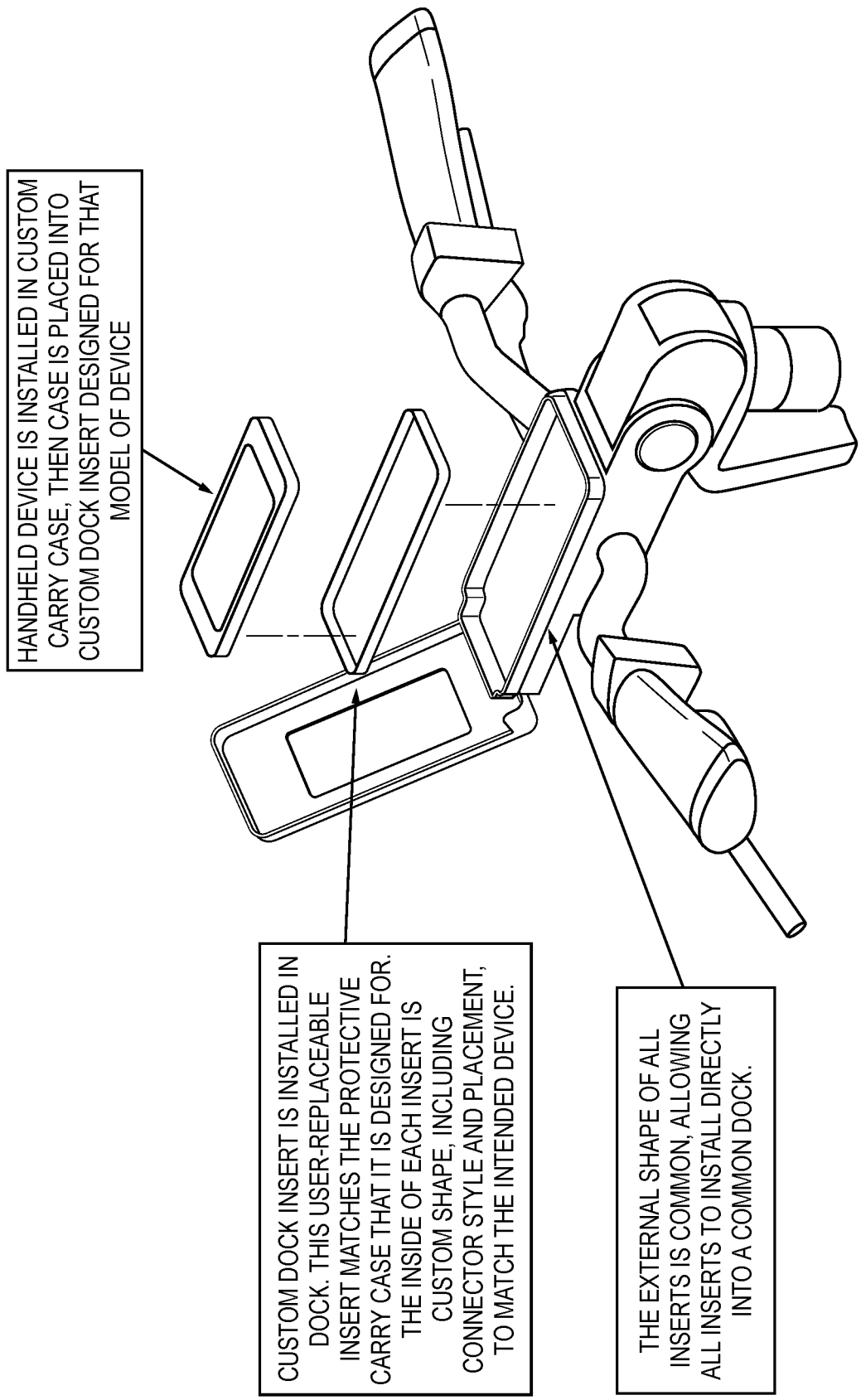
FIG. 68 shows an example of a handheld device installed in its custom carry case which is then placed into a custom dock insert designed for that model of device. The custom dock insert is installed in the dock of a bicycle system.

In an example, there is provided a custom protective carry case for everyday use. A handheld device inserts into the custom protective carry case for everyday use. A handheld device uses a unique case designed exclusively for each model of device. The entire case is unique to each model of device. An example is shown in FIG. 67. A handheld device is installed in its custom carry case, then the case is placed into a custom dock insert designed for that model of device. The custom dock insert is installed in the dock of a bicycle system. This user-replaceable dock insert matches the protective carry case that it is designed for. The inside of each dock insert is a custom shape, customized for connector style and placement, so as to match the intended device. In this example, the external shape of all dock inserts is common, allowing all dock inserts to install directly into a common dock of a bicycle system. An example is shown in FIG. 68.

Regardless of the option chosen, the intent is to provide a custom protective carry case for a handheld device for every-day use, that can mount directly in a common docking station, without having to purchase additional costly core equipment (eg. a new docking station) or make expensive alterations to accommodate a different handheld device, as well as to not require removal of a handheld device from a protective case before use in the docking station of a bicycle system.

Notes

This disclosure (including the written description, figures, claims, abstract, appendices, and/or the like) for the bicycle system shows various examples via which the claimed innovations may be practiced. It is to be understood that these examples and the features are a representative sample presented to assist in understanding the claimed innovations, and are not exhaustive and/or exclusive. As such, the various examples, implementations, examples, and/or the like are deemed non-limiting throughout this disclosure. Furthermore, alternate undescribed examples may be available (e.g., equivalent examples). Such alternate examples have not been discussed in detail to preserve space and/or reduce repetition. That alternate examples have not been discussed in detail is not to be considered a disclaimer of such alternate undescribed examples, and no inference should be drawn regarding such alternate undescribed examples relative to those discussed in detail in this disclosure. It is to be understood that such alternate undescribed examples may be utilized without departing from the spirit and/or scope of the disclosure. For example, the organizational, logical, physical, functional, topological, and/or the like structures of various examples may differ. In another example, the organizational, logical, physical, functional, topological, and/or the like structures of a bicycle system coordinator, bicycle system coordinator elements, bicycle system data stores, bicycle system components and their subcomponents, capabilities, applications, and/or the like described in various examples throughout this disclosure are not limited to a fixed operating order and/or arrangement, instead, all equivalent operating orders and/or arrangements are contemplated by this disclosure. In yet another example, a bicycle system coordinator, bicycle system coordinator elements, bicycle system data stores, bicycle system components and their subcomponents, capabilities, applications, and/or the like described in various examples throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same example. Accordingly, the various examples, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file provisional applications, nonprovisional applications, continuation applications, continuation-in-part applications, divisional applications, and/or the like. It is to be understood that while some examples discussed in this disclosure have been directed to a bicycle system, the innovations described in this disclosure may be readily applied to a wide variety of other fields and/or applications.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

We claim:

1. Method of communicating between a bicycle system and different smartphone models, the bicycle system including a bicycle frame, the bicycle system including a processor integral to the bicycle frame, the bicycle system further including a battery integral to the bicycle, wherein the processor is powerable by the battery, the bicycle system including a smartphone holder and at least one interchangeable smartphone tray in which the smartphone has been received, the method including the steps of inserting a smartphone tray corresponding to a smartphone model to be accommodated in the smartphone holder, and the bicycle system processor communicating with the smartphone which has been received by the smartphone tray in the smartphone holder.

2. Method of claim 1, the method further including the step of discovering the smartphone's unique identifying code.

3. Method of claim 2, the method further including the step of deactivating a theft deterrence system of the bicycle system.

4. Method of claim 1, the method further including the step of launching the bicycle system's companion smartphone application.

5. Method of claim 1, the method further including the step of determining the smartphone's battery state and initiating charging if required.

\* \* \* \* \*